United States Patent
Kim et al.

(10) Patent No.: US 11,361,404 B2
(45) Date of Patent: Jun. 14, 2022

(54) ELECTRONIC APPARATUS, SYSTEM AND CONTROLLING METHOD THEREOF

(71) Applicant: SAMSUNG ELECTRONICS CO., LTD., Suwon-si (KR)

(72) Inventors: Minho Kim, Suwon-si (KR); Wooseok Kang, Suwon-si (KR); Sangkwon Na, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/926,326

(22) Filed: Jul. 10, 2020

(65) Prior Publication Data
US 2021/0166346 A1    Jun. 3, 2021

Related U.S. Application Data

(63) Continuation of application No. 16/801,700, filed on Feb. 26, 2020.

(30) Foreign Application Priority Data

Nov. 29, 2019    (KR) .................. 10-2019-0157761

(51) Int. Cl.
*G06K 9/46* (2006.01)
*G06T 3/40* (2006.01)
(Continued)

(52) U.S. Cl.
CPC .......... *G06T 3/4046* (2013.01); *G06N 3/0445* (2013.01); *G06N 3/0454* (2013.01);
(Continued)

(58) Field of Classification Search
CPC ......... G06T 3/4046; G06T 2207/20081; G06T 2207/20084
See application file for complete search history.

(56) References Cited

U.S. PATENT DOCUMENTS

| | | | |
|---|---|---|---|
| 7,382,926 B2 * | 6/2008 | Joshi | H04N 19/147 375/240.19 |
| 8,681,866 B1 * | 3/2014 | Jia | H04N 19/14 375/240.13 |

(Continued)

FOREIGN PATENT DOCUMENTS

| | | |
|---|---|---|
| CN | 109495741 | 3/2019 |
| CN | 109919920 | 6/2019 |

(Continued)

OTHER PUBLICATIONS

Content-gnostic Bitrate Ladder prediction for Adaptive Video Streaming, Angeliki V. Katsenou et al., IEEE, 978-1-7281-4704-8, 2019, pp. 1-5 (Year: 2019).*

(Continued)

*Primary Examiner* — Jayesh A Patel
(74) *Attorney, Agent, or Firm* — Nixon & Vanderhye, P.C.

(57) ABSTRACT

Disclosed is an electronic apparatus. The electronic apparatus includes a processor configured to downscale an image using a trained first artificial intelligence (AI) model and to encode a downscaled image, and the processor is configured to control downscaling of the image based on quality information of the image obtained using a trained second AI model, and the second AI model may be trained using feature information of the image obtained from the first AI model.

16 Claims, 32 Drawing Sheets

(51) Int. Cl.
*G06N 3/04* (2006.01)
*G06N 3/08* (2006.01)
*H04L 43/08* (2022.01)

(52) U.S. Cl.
CPC .............. *G06N 3/08* (2013.01); *H04L 43/08* (2013.01); *G06T 2207/20081* (2013.01); *G06T 2207/20084* (2013.01)

(56) References Cited

U.S. PATENT DOCUMENTS

| | | | | |
|---|---|---|---|---|
| 8,780,976 B1* | 7/2014 | Jia | .................... | H04N 19/00575 375/240.02 |
| 8,780,987 B1* | 7/2014 | Jia | .................... | H04N 19/15 375/240.13 |
| 9,106,887 B1* | 8/2015 | Owen | .................... | H04L 41/22 |
| 9,125,073 B2 | 9/2015 | Oyman et al. | | |
| 9,936,208 B1* | 4/2018 | Brailovskiy | ........... | H04N 19/14 |
| 11,164,340 B2 | 11/2021 | Lee et al. | | |
| 2003/0118107 A1* | 6/2003 | Itakura | ............... | H04N 21/6375 375/240.19 |
| 2004/0039810 A1* | 2/2004 | Donescu | ................ | H04N 19/63 709/223 |
| 2004/0083488 A1* | 4/2004 | Fukuda | ............ | H04N 21/44209 725/38 |
| 2005/0238243 A1* | 10/2005 | Kondo | ................. | H04N 19/182 382/239 |
| 2005/0244070 A1* | 11/2005 | Itakura | ............... | H04N 21/6437 382/248 |
| 2007/0047639 A1* | 3/2007 | Ye | ........................ | H04N 19/147 375/240.1 |
| 2007/0263087 A1* | 11/2007 | Hong | .................... | H04N 19/61 348/14.13 |
| 2013/0268963 A1* | 10/2013 | Nugent | ................ | H04N 21/435 725/32 |
| 2015/0109406 A1* | 4/2015 | Carlsson | .............. | H04N 19/164 348/14.13 |
| 2017/0155924 A1* | 6/2017 | Gokhale | ........... | H04N 19/1883 |
| 2017/0220283 A1* | 8/2017 | Zhang | .................... | H04N 19/44 |
| 2018/0041788 A1 | 2/2018 | Wang et al. | | |
| 2018/0063549 A1* | 3/2018 | Amer | ..................... | H04N 19/59 |
| 2018/0176570 A1 | 6/2018 | Rippel et al. | | |
| 2018/0242015 A1* | 8/2018 | Katsavounidis | ..... | H04N 19/147 |
| 2019/0028745 A1* | 1/2019 | Katsavounidis | ....... | H04N 19/59 |
| 2019/0045168 A1 | 2/2019 | Chaudhuri et al. | | |
| 2019/0066265 A1 | 2/2019 | Lin et al. | | |
| 2019/0075301 A1* | 3/2019 | Chou | .................... | H04N 19/189 |
| 2019/0132591 A1* | 5/2019 | Zhang | ................. | H04N 19/136 |
| 2019/0281337 A1* | 9/2019 | Guionnet | ............. | G06F 21/606 |
| 2020/0021813 A1* | 1/2020 | Tanner | ................ | H04N 19/152 |
| 2020/0162789 A1* | 5/2020 | Ma | .................... | H04N 21/6547 |
| 2020/0296362 A1* | 9/2020 | Chadwick | ........... | H04N 19/177 |
| 2021/0125380 A1 | 4/2021 | Lee et al. | | |
| 2021/0174552 A1 | 6/2021 | Lee et al. | | |

FOREIGN PATENT DOCUMENTS

| | | | |
|---|---|---|---|
| EP | 3 145 201 | 3/2017 | |
| EP | 3 175 617 | 6/2017 | |
| EP | 3451672 A1 * | 3/2019 | ......... H04N 21/2662 |
| KR | 10-2004-0107850 | 12/2004 | |
| KR | 10-2009-0071873 | 7/2009 | |
| KR | 10-2009-0080830 | 7/2009 | |
| KR | 10-2287947 | 8/2021 | |
| WO | WO-2005093661 A2 * | 10/2005 | ........... H04N 19/129 |
| WO | 2016/015133 | 2/2016 | |
| WO | 2019/220095 | 11/2019 | |
| WO | 2020/067592 | 4/2020 | |

OTHER PUBLICATIONS

Encoder-Decoder Residual—Super-resolution, Guoan Cheng et al., CVF/CVPR, Jun. 2019, pp. 1-10 (Year: 2019).*
Performance comparison of video coding standards: an adaptive streaming perspective, Joel Sole et al., Dec. 2018, pp. 1-7 (Year: 2018).*
QARC: Video Quality—Learning, Tianchi Huang et al., ACM, 978-1-4503-5665-7, 2018, pp. 1-9 (Year: 2018).*
Dee Learning-Based video coding: A review—Study, Don Liu et al., arXiv, 1904.12462v1, Apr. 29, 2019, pp. 1-35 (Year: 2019).*
Content-Adaptive Resolution Control to Improve Video Coding Efficiency, Maryam Jenab et al., IEEE, 978-1-5386-1737-3, 2018, pages (Year: 2018).*
Deep video precoding, Eirina Bourtsoulatze et al., arXiv, Aug. 2, 2019, pp. 1-13 (Year: 2019).*
Huang et al., "QARC: Video Quality Aware Rate Control for Real-Time Video Streaming based on Deep Reinforcement Learning", MM '18: Proceedings of the 26th ACM international conference on Multimedia, Oct. 22-26, 2018, 9 pages.
Sole et al., "Performance Comparison of Video Coding Standards: An Adaptive Streaming Perspective", Netflix Tech. Blog, https://medium.com/netflix-techblog/performance-comparison-of-video-coding-standards-an-adaptive-streaming-perspective-d45d0183ca95 , Dec. 13, 2018, 7 pages.
Radhakrishnan, "Transfer Learning for Natural Language Processing", Hackemoon, https://hackernoon.com/transfer-learning-for-natural-language-processing-bb4669d1c1ff, Feb. 17, 2018, 4 pages.
Kim et al., U.S. Appl. No. 16/801,700, filed Feb. 26, 2020.
Search Report and Written Opinion dated Aug. 26, 2020 in counterpart International Patent Application No. PCT/KR2020/002678.
Extended Search Report dated Jul. 14, 2020 in counterpart European Patent Application No. 20158637.7.
Bourtsoulatze, Eirina et al., "Deep video Precoding," arxiv.org, Cornell University Library, 201 Olin Library Cornell University, Ithaca, NY 14853, Aug. 2, 2019, pp. 1-14.
Ma, Siwei et al., "Image and Video Compression with Neural Networks: A Review," arxiv.org, Cornell University Library, 201 Olin Library Cornell University, Ithaca, NY 14853, Apr. 7, 2019, pp. 1-16.
Liu, Dong et al. , "Deep Learning-Based Video Coding: A Review and A Case Study," arxiv.org, Cornell University Library, 201 Olin Library Cornell University, Ithaca, NY 14853, Apr. 29, 2019, 35 pages.
Sogaard, Jacob et al., "No-Reference Video Quality Assessment Using Codec Analysis," IEEE Transactions on Circuits and Systems for Video Technology, Institute of Electrical and Electronics Engineers, US, vol. 25, No. 10, Oct. 1, 2015, pp. 1637-1650.
Communication pursuant to Article 94(3) EPC dated Apr. 29, 2021 in counterpart European Patent Application No. 20158637.7.

* cited by examiner

FIG. 1B
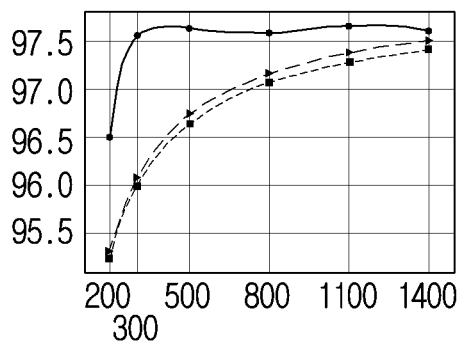
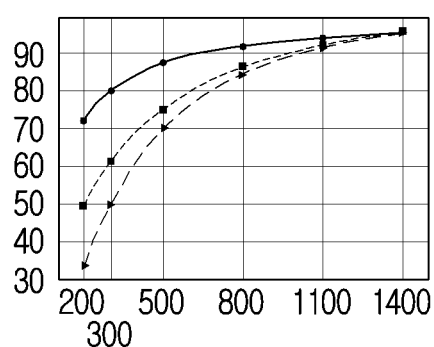

FIG. 1C
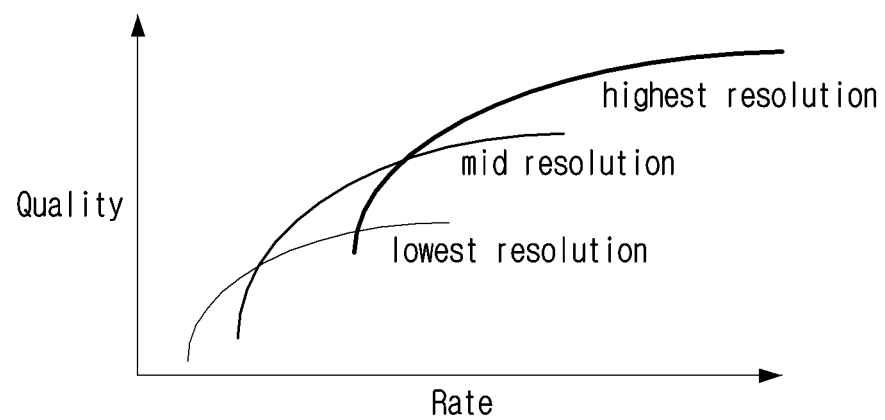
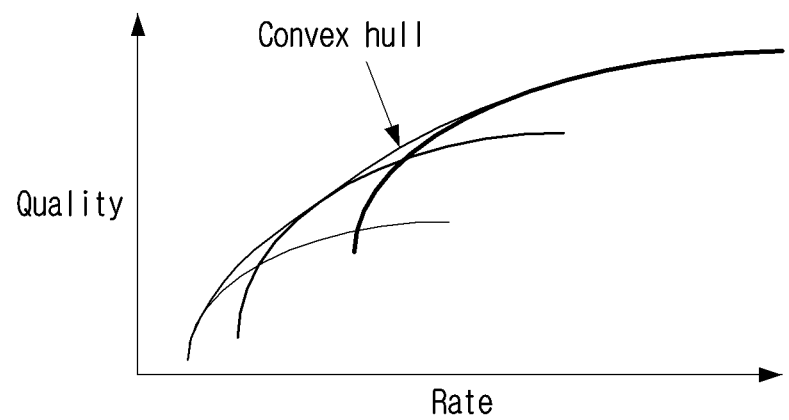

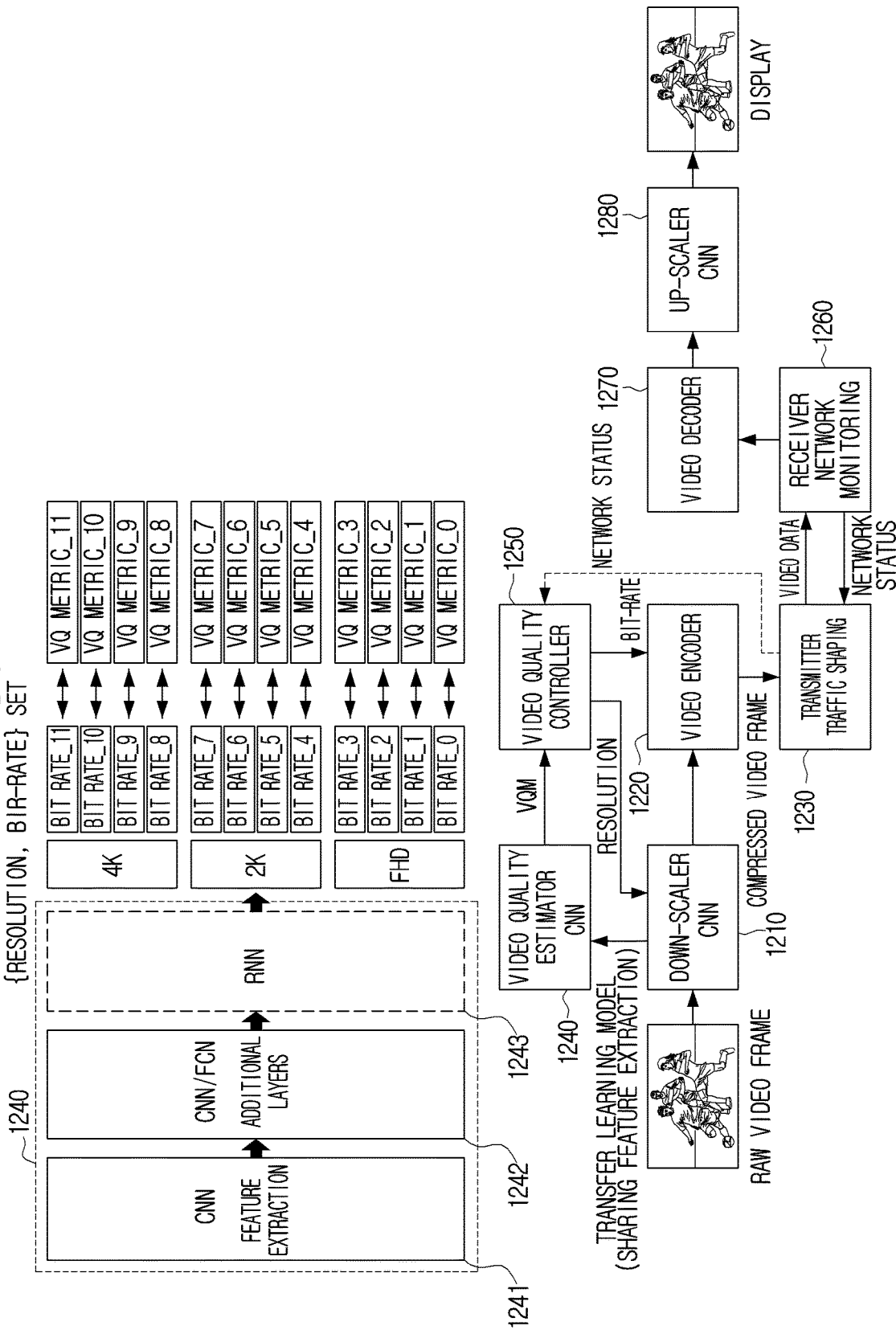

FIG. 19

| IMAGE-RELATED INFORMATION | DNN CONFIGURATION INFORMATION |
|---|---|
| SD, 10Mbps, AV1 | A DNN CONFIGURATION INFORMATION |
| HD, 15Mbps, H.264 | B DNN CONFIGURATION INFORMATION |
| Full HD, 20Mbps, HEVC | C DNN CONFIGURATION INFORMATION |
| Full HD, 15Mbps, HEVC | D DNN CONFIGURATION INFORMATION |

ELECTRONIC APPARATUS, SYSTEM AND CONTROLLING METHOD THEREOF

CROSS-REFERENCE TO RELATED APPLICATIONS

This application is a continuation of U.S. application Ser. No. 16/801,700, filed on Feb. 26, 2020, which claims priority to Korean Patent Application 10-2019-0157761, filed on Nov. 29, 2019. The contents of each of these applications are incorporated herein in their entirety.

BACKGROUND

1. Field

The disclosure relates to an electronic apparatus and a controlling method thereof and, for example, to an electronic apparatus performing image processing using an artificial intelligence (AI) model, system, and a controlling method thereof.

2. Description of Related Art

With the development of electronic technology, various types of electronic apparatuses have been developed and distributed. Display apparatuses, used in various places such as a home, an office, a public place, and the like, have been increasingly developed in recent years.

With the increasing proliferation of cord-cutting trend to cut traditional paid broadcasting, such as terrestrial/cable/IPTV/satellite broadcasting, over-the-top (OTT) services such as Netflix/Amazon Prime over the public Internet network, and the proliferation of single media broadcasting platforms such as YouTube/Twitter/Facebook, customer demands for real-time live streaming applications are increasing.

The OTT service providers provide a live streaming service for content such as real-time broadcasting or sports events for which real-time is important, and in the future, an extension to a service requiring interaction with a viewer, such as a real-time betting, is being prepared. The single person media broadcasting platform is providing a service to enable interaction with a viewer through a chat window, and is evolving into a platform capable of a multi-party video call/video conference.

In this real-time live streaming application, a highly important factor that influences the felt quality of the viewer is the quality and latency of an image. For example, since services are provided using a public Internet network, such as a Supply Chain (Live event>Capturing>Encoding>First-Mile Delivery>CDN propagation>Last-Mile Delivery>User Device), streaming should be performed with optimal image quality in a given network environment, and since the service has importance on the real-time, a consumer's felt latency should be minimized or reduced. For example, a service such as a sports event should minimize or reduce a spoiler effect by making a latency to be less than or equal to one second, and in an interactive service such as a video call, the service must be serviced with a latency of less than or equal to 200 ms at the minimum so that a consumer does not feel latency.

Not only a mobile device such as a mobile phone or a tablet PC but also a notebook PC, a smart TV, or the like, are provided with a communication module such as Wi-Fi capable of Internet protocol (IP) communication due to proliferation of a service through the Internet and an Internet of things (IoT)/All-IP trend. In a house, an application scenario for direct streaming between devices is being developed.

Screen mirroring is a representative example of the inter-device direct streaming application scenario, in which a content which has been reproduced in a relatively small screen, such as a mobile phone and a tablet, is transmitted to a large screen, such as a TV for watching. In a TV industry, a large volume part, such as a power supply part, a cable connector, etc., is divided into an external box to maintain a thin display form factor. Here, complicated cable connection between an external box and a display may be replaced with direct data streaming using a wireless communication module.

When comparing the data path in the inter-device direct streaming application and the supply chain of the real-time live streaming application over the Internet, the technical similarity of the end system is very high with only a different network environment, and the requirement of a viewer for the felt quality is relatively higher. For example, the image quality of the wireless TV scenario should be close to visually lossless, and the latency should be at a level within 10 ms to prevent or reduce degradation of the felt quality of the consumer.

SUMMARY

Embodiments of the disclosure may address the above problems, and may provide an electronic apparatus including a processor configured to downscale an image using a trained first artificial intelligence (AI) model and encode a downscaled image, and the processor is configured to control downscaling of the image based on quality information of the image obtained using a trained second AI model, and the second AI model may be trained using feature information of the image obtained from the first AI model.

According to an example embodiment, a system including a transmitting apparatus and a receiving apparatus includes: a transmitting apparatus comprising circuitry configured to downscale an image using a trained first artificial intelligence (AI) model and to encode a downscaled image; and a receiving apparatus comprising circuitry configured to decode an image received from the transmitting apparatus and obtain an output image by upscaling the encoded image, wherein the transmitting apparatus is configured to control downscaling of the image based on quality information of the image obtained using a trained second AI model, and the second AI model is configured to be trained using feature information of the image obtained from the first AI model.

BRIEF DESCRIPTION OF THE DRAWINGS

The above and other aspects, and advantages of certain embodiments of the present disclosure will be more apparent from the following detailed description, taken in conjunction with the accompanying drawings, in which:

FIG. 1B is a diagram illustrating an example artificial intelligence neural network-based image processing method according to an embodiment;

FIG. 1C is a diagram illustrating an example artificial intelligence neural network-based image processing method according to an embodiment;

FIG. 12 is a diagram illustrating an example operation of a transmitting and receiving system according to an embodiment;

FIG. 19 is diagram illustrating an example mapping relation between various image-related information and DNN configuration information according to an embodiment;

The same reference numerals may be used to represent the same (or similar) elements throughout the drawings.

DETAILED DESCRIPTION

Figure 1A:
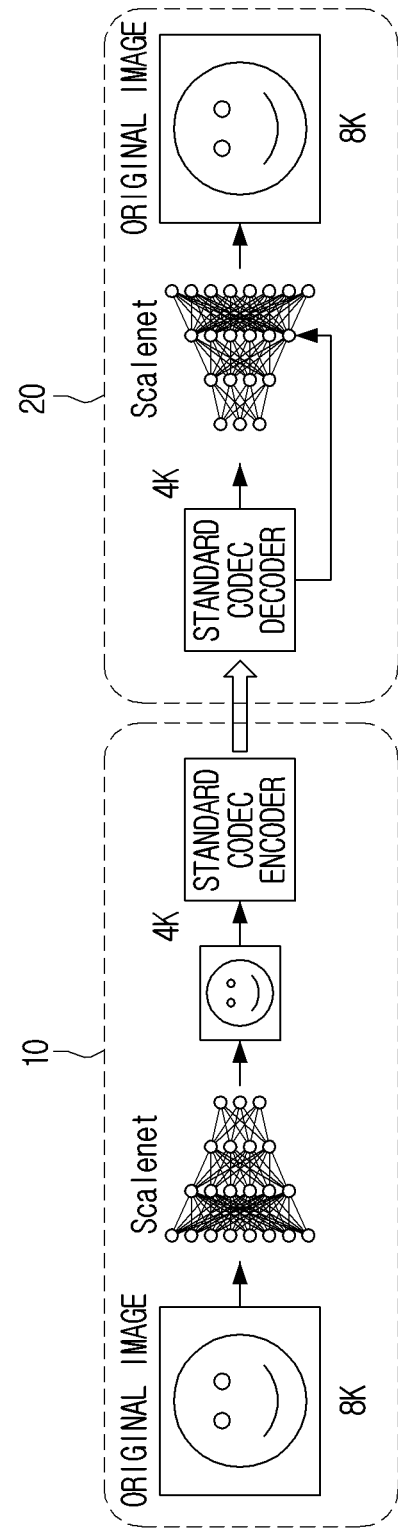
FIG. 1A is a diagram illustrating an example artificial intelligence neural network-based image processing method according to an embodiment.

The disclosure provides an electronic apparatus, a system, and a controlling method thereof capable of predicting the quality of an image streamed in real time and processing the image at an optimal and/or improved resolution and bitrate.

The disclosure may include various modifications and embodiments, and specific embodiments thereof have been shown by way of example in the drawings and are herein described in greater detail. It should be understood, however, that this disclosure is not intended to be limited to the embodiments of the disclosure, and instead, the intention is to cover all modifications, equivalents, and alternatives falling within the spirit and scope of the various embodiments and the disclosure.

In the following description, a detailed description of the related art may be omitted when it is determined that the subject matter of the disclosure may obscure the gist of the disclosure. Also, the number (e.g., first, second, etc.) used in the description herein is only an identifier for distinguishing one component from another.

In addition, when an element is referred to herein as being "connected to" or "connected to" another element, it is to be understood that the element may be directly connected or connected to the other element, but may be connected or connected via another element in between, unless otherwise specified.

In the disclosure, elements represented by "~ portion (unit)," "module," or the like, may be divided into two or more components, or one component may be divided into more than two components for each more detailed function. In addition, each of the components described below may additionally perform the functions of some or all of the functions responsible for the other components in addition to the main functions that the components are responsible, and it is understood that some of the functions that each of the components are responsible may be carried out by other components.

In the disclosure, an "image" or a "picture" may represent a still image, a moving picture including a plurality of consecutive still images (or frames), or a video.

In addition, the term "deep neural network (DNN)" is a non-limiting illustrative example of an artificial neural network model simulating brain nerves, and is not limited to an artificial neural network model using a specific algorithm.

In the disclosure, the "parameter" may refer, for example, to a value used in an operation process of each layer forming a neural network, and may include, for example, a weight value used in applying an input value to a predetermined equation. In addition, the parameter may be represented in a matrix form. The parameter may be set as a result of training and may be updated via separate training data as needed.

In the disclosure, "first deep neural network (DNN)" may refer, for example, to a DNN used for AI-downscaling of an image, "second DNN" may refer, for example, to a DNN used for AI-upscaling of an image.

In the disclosure, "DNN configuration information" may refer, for example, to information related to a component forming DNN and may include a parameter described above. Using the DNN configuration information, first DNN or second DNN may be set.

In the disclosure "image" may refer, for example, to an image subject to AI encoding, and "a first image" may refer, for example, to an image acquired as a result of AI-downscaling in the AI encoding process. In addition, "a second image" may refer, for example, to an image acquired through a first decoding process during an AI decoding process, and "a third image" may refer, for example, to an image acquired by AI-upscaling a second image in the AI decoding process.

In the disclosure, "AI-downscale" may refer, for example, to a process of reducing the resolution of an image based, for example, on AI, and "first encoding" may refer, for example, to an encoding process by a frequency conversion-based image encoding method. The "first decoding" may refer, for example, to a decoding process by a frequency conversion-based image reconstruction method, and "AI-upscale" may refer, for example, to a process of increasing the resolution of an image based, for example, on AI.

FIGS. 1A, 1B and 1C are diagrams illustrating an example artificial intelligence (AI) neural network-based image processing method according to an embodiment.

In order to stream high-definition/high-resolution images such as 4K and 8K over a network, image encoding techniques and up/down scaling techniques that can reduce network request bandwidth are important. For image encoding techniques, standard codecs such as H.264/265 AVC, VP8/9, and AV1 algorithm, or the like, are widely used, and for OTT service providers, a 4K may, for example, be compressed to about 15 Mbps with respect to H.265 for services. In order to provide a service in accordance with different network environments for each user, the technique used for compression at various combinations of image resolutions and bitrates is an up/down scaling technique. For example, when the 8K image is to be transmitted at a level of about 15 Mbps, a transmitting end 10 may perform downscaling of the image to 4K and may transmit the image to a codec encoder, and a receiving end 20 may perform upscaling in order to restore the 4K output of the codec decoder to the 8K image. Although a simple interpolation such as a bi-linear or bi-cubic is used in the up/down scaling, a recent study indicates that a customer's felt quality can be enhanced further by up/downscaling using, for example, a convolutional neural network (CNN). For example, the method is easily compatible with any compression codec, and thus can be easily scaled by applying to H.265/VP9 standard codec that is widely used currently.

In general, the compression efficiency is different according to the image resolution and the type of the image. For example, if two images having different features are compressed at the same resolution and bitrate, as shown, for example, in FIG. 1B, it is more likely that the degradation in the customer's felt quality is more sensitive for a case of lower image that looks relatively complex. On the other hand, in the example of an upper image which looks relatively less complex, compression efficiency is good and thus, transmitting the image with lowered bitrate may reduce unnecessarily wasted network bandwidth.

The resolution is also considered when the bitrate is optimized according to the types of an image, since it is helpful to improve user's felt quality to increase the bitrate, as the resolution is higher as shown in the upper graph of FIG. 1C. As shown in the lower graph of FIG. 1C, the content provider finds an optimal point for various resolutions and bitrate combinations for encoding to provide a service with an optimal quality for a given network environment of each user.

In the example of image on demand (VoD) service, an image has been encoded in advance and stored in a server for servicing and image quality may be optimized offline by investing sufficient time and computing power, but in real-time live streaming application, this method may not be used due to latency and a restriction in a computing resource.

Hereinbelow, various embodiments of providing a content with the optimal and/or improved quality in real-time streaming of a content will be described in greater detail.

Figure 2A:
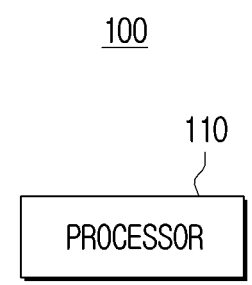
FIG. 2A is a block diagram illustrating an example configuration of an electronic apparatus according to an embodiment.
Figure 2B:
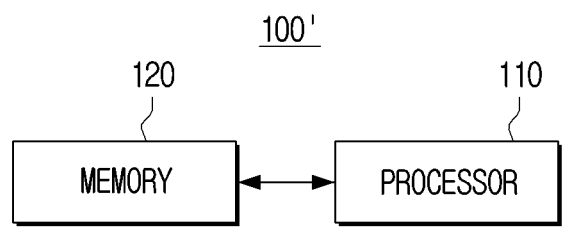
FIG. 2B is a block diagram illustrating an example configuration of an electronic apparatus according to an embodiment.

FIGS. 2A and 2B block diagrams illustrating example configurations of an electronic apparatus according to an embodiment.

Referring to FIG. 2A, the electronic apparatus 100 includes a processor (e.g., including processing circuitry) 110 and referring to FIG. 2B, the electronic apparatus 100 includes the processor (e.g., including processing circuitry) 110 and a memory 120.

Information on an AI model according to an embodiment may be stored in an internal memory of the processor 110 or in an external memory, for example, the memory 120, and thus, FIG. 2A and FIG. 2B are separately illustrated. Hereinbelow, the embodiment will be described with reference to FIG. 2B.

The electronic apparatus 100 may be implemented as various types of apparatuses that may provide a content such as a server, for example, and without limitation, a content providing server, personal computer (PC), or the like. The electronic apparatus 100 may be a system itself in which clouding computer environment is established, but is not limited thereto. The electronic apparatus 100 may be implemented as various types of image processing apparatuses that process and transmit an image to an external electronic apparatus, such as, for example, and without limitation, a set-top box, a digital image disc (DVD) player, a game console (for example: Xbox™, PlayStation™), virtual reality (VR) device, a tablet PC, mobile phone, e-book, desktop PC, laptop PC, netbook computer, personal digital assistant (PDA), portable multimedia player (PMP), MP3 player, a mobile medical device, a home appliance such as a refrigerator, a camera, a camcorder, an electronic frame, a wearable device (for example, head-mounted-device (HMD) smart watch, electronic garment, electronic bracelet, electronic necklace, glass, or the like), a near eye display (NED), or the like.

According to an example, the electronic apparatus 100 may transform an image into images with various resolutions and various compressed images and transmit the images. The image processed by the electronic apparatus 100 may, for example, be an image prepared by a content provider, but is not limited thereto and may be an image additionally processed on the image. Hereinafter, for convenience of description, it is assumed that the image is processed by the electronic apparatus 100.

For example, the electronic apparatus 100 may transform an image (or input image) to at least one image an image to not only an image of standard definition (SD) of 720×480, high definition (HD) of 1280×720, full high definition (FHD) of 1920×1080, quad high definition (QHD) of 2560× 1440, 4K ultra high definition (UHD) of 3840×2160, 8K UHD of 7680×4320, but also an image of a higher resolution (e.g., 16K, 32K) and transmit the image. The electronic apparatus 100 may compress an image in a compressed form such as Moving Picture Experts Group (MPEG) (for example, MP2, MP4, MP7, or the like), joint photographic coding experts group (JPEG), Advanced Image Coding (AVC), H.264, H.265, High Efficiency Image Codec (HEVC), VC-1, VP8, VP9, AOMedian image 1 (AV1), or the like, but the disclosure is not limited thereto.

The memory 120 may store data necessary for various embodiments of the disclosure. The memory 120 may be implemented as a memory embedded in the electronic apparatus 100, or may be implemented as a detachable memory in the electronic apparatus 100, according to the data usage purpose. For example, data for driving the electronic apparatus 100 may be stored in a memory embedded in the electronic apparatus 100, and data for an additional function of the electronic apparatus 100 may be stored in the memory detachable to the electronic apparatus 100. A memory embedded in the electronic apparatus 100 may be a volatile memory such as a dynamic random access memory (DRAM), a static random access memory (SRAM), a synchronous dynamic random access memory (SDRAM), or a nonvolatile memory. (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD), or the like, and in the case of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multimedia card (MMC), etc.), an external memory (for example, a USB memory) connectable to the USB port, or the like, but the disclosure is not limited thereto.

According to an embodiment, the memory 120 may store a computer program including at least one instruction or instructions for controlling the electronic apparatus 100.

According to another example, the memory 120 may store information about an AI model that includes a plurality of layers. Storing information about the AI model may refer, for example, to storing various information related to the operation of the AI model, for example, information about a plurality of layers included in the AI model, information about parameters (for example, filter coefficients, bias, etc.) used in each of the plurality of layers, and the like. For example, the memory 120 may store information about the first AI model trained to downscale the image in accordance with an example embodiment. The memory 120 may store information about a second AI model trained to obtain quality information of the image in accordance with an example embodiment. However, it is understood that information on the AI model may be stored in the internal memory of the processor 110 according to the implementation of the processor 110 described below. For example, if the processor 110 is implemented in dedicated hardware, information about the AI model may be stored in the internal memory of the processor 110.

According to another embodiment, the memory 120 may store an image received from an external server, an external device, an external storage medium (for example, universal serial bus (USB), external server (for example, a web hard). Herein, the image may be a digital moving image but is not limited thereto.

According to another example, the memory 120 may, for example, and without limitation, store information necessary for down scaling, information necessary for compression, various information necessary for image quality processing for performing at least one of, for example, noise reduction, detail enhancement, tone mapping, contrast enhancement, color enhancement, frame rate conversion, or the like. The memory 120 may store a final output image generated by image processing.

According to an example embodiment, the memory 120 may be implemented as a single memory that stores data generated in various operations in accordance with the disclosure. However, according to another embodiment, the memory 120 may be implemented to include a plurality of memories, each storing different types of data, or storing data generated in different steps, respectively.

It has been described in the example that various data are stored in the external memory 120 of the processor 110, but at least one of the data above may be stored in the internal memory of the processor 110 according to at least one example.

The processor 110 may include various processing circuitry and is electrically connected to the memory 120 to control the overall operation of the electronic apparatus 100. The processor 110 may be configured with one or a plurality of processors. For example, the processor 110 may perform the operation of the electronic apparatus 100 according to various embodiments of the disclosure by executing at least one instruction stored in the memory 120.

The processor 110 according to an embodiment may be implemented with, for example, and without limitation, a digital signal processor (DSP) for image-processing of a digital image signal, a microprocessor, a graphics processor (GPU), an AI (AI) processor, a neural processor (NPU), a time controller (TCON), or the like, but this is not limited thereto. The processor 110 may include, for example, and without limitation, one or more among a central processor (CPU), a micro controller unit (MCU), a microprocessor (MPU), a controller, an application processor (AP), a communication processor (CP), an advanced reduced instruction set computing (RISC) machine (ARM) processor, a dedicated processor, or may be defined as a corresponding term. The processor 110 may be implemented in a system on chip (SoC) type or a large scale integration (LSI) type which a processing algorithm is built therein, application specific integrated circuit (ASIC), or in a field programmable gate array (FPGA) type.

Further, the processor 110 for executing the AI model according to an example embodiment may be a general-purpose processor such as a central processor (CPU), an application processor (AP), a digital signal processor (DSP), a dedicated processor, or the like, a graphics-only processor such as a graphics processor (GPU), a vision processing u (VPU), an AI-only processor such as a neural network processor (NPU), or the like, but is not limited thereto. The processor 110 may perform control to process the input data according to a predefined operating rule or AI model stored in the memory 120. If the processor 110 is an AI-only processor, it may be designed with a hardware structure specialized for the processing of a particular AI model. For example, hardware specific to the processing of a particular AI model may be designed into a hardware chip, such as an application specific integrated circuit (ASIC), a field programmable gate array (FPGA), or the like.

The processor 110 processes the input data to obtain output data. The input data may include, for example, and without limitation, at least one of text, image, user voice, or the like. For example, the input data may be input via a user input, such as a communicator (e.g., including communication circuitry) capable of communicating with an external device, a keyboard or a touch pad, a camera, a microphone, or the like. The output data may be in various forms depending on the type of AI model. For example, the output data may be an image with improved resolution, object-related information included in the image, text corresponding to voice, or the like.

According to an example, the processor 110 may image-process the image to obtain an output image. The image may include a still image, a plurality of consecutive still images (or frames), or an image. The image may be an original image, but is not limited thereto. The image processing may be digital image processing including at least one of image enhancement, image reconstruction, image transformation, image analysis, image understanding, or image compression, or the like, but is not limited thereto.

According to an example embodiment, the processor 110 may perform image processing of an image, for example, an original image, using an AI model. For example, the processor 110 may load and use the AI model related information stored in memory 120, for example, an external memory, such as dynamic random-access memory (DRAM), to use an AI model.

According to an example embodiment, the processor 110 may downscale the image and encode (or compress) the downscaled image. Further, the processor 110 may control at least one of a downscaling of the image or encoding of the downscaled image based on the quality information of the image. Downscaling of the image may be performed using the first AI model. The quality information of the image may be obtained through a second AI model. In this case, the second AI model can be learned based on the feature information of the image obtained from the first AI model.

Figure 3:
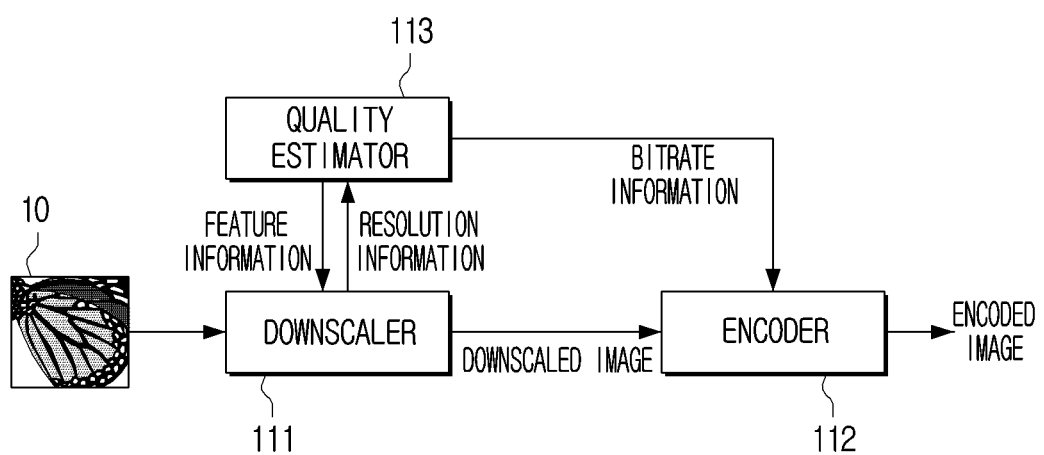
FIG. 3 is a block diagram illustrating an example operation of a processor according to an embodiment.

FIG. 3 is a diagram illustrating an example operation of the processor 110 according to an embodiment.

According to an example embodiment, the processor 110 may include a downscaler (e.g., including processing circuitry and/or executable program elements) 111, an encoder (e.g., including processing circuitry and/or executable program elements) 112, and a quality estimator (e.g., including processing circuitry and/or executable program elements) 113. The downscaler 111, the encoder 112, and the quality estimator 113 distinguish the functions of the processor 110 for convenience of description, and the downscaler 111, the encoder 112, and the quality estimator 113 may be implemented with at least one software, at least one hardware, or a combination thereof within the processor 110.

According to an example embodiment, the downscaler 111 may include various processing circuitry and/or executable program elements and downscale the image using the first AI model. The output of the first AI model can be a downscaled image. In addition, the first AI model may be joint-trained connectively with an AI model for upscaling of an image included in a receiving device (FIGS. 1 and 20) for receiving the processed image from the electronic apparatus 100.

That the AI model is trained may refer, for example, to a basic AI model (for example, an AI model including any random parameter) being trained using a plurality of training data by a learning algorithm, so that a predefined action rule or AI model set to perform a desired property (or purpose) is made. The learning may be accomplished through a separate server and/or system, but is not limited thereto and may be implemented in an electronic apparatus. Examples of learning algorithms include, but are not limited to, supervised learning, unsupervised learning, semi-supervised learning, or reinforcement learning.

The first AI model may be implemented, for example, and without limitation, as convolutional neural network (CNN), recurrent neural network (RNN), restricted Boltzmann machine (RBM), deep belief network (DBN), bidirectional recurrent deep neural network (BRDNN), deep Q-networks, or the like, but is not limited thereto.

As for the downscaling, for example, at least one interpolation such as, for example, and without limitation, bilinear interpolation, nearest neighbor interpolation, bicubic interpolation, deconvolution interpolation, subpixel convolution interpolation, polyphase interpolation, trilinear interpolation, linear interpolation, or the like, may be used.

According to an embodiment, the encoder 110 may include various processing circuitry and/or executable program elements and encode (or compress) the downscaled image by the downscaler 111. For example, the processor 110 may encode the downscaled image using one of the various compression methods such as, for example, and without limitation, Moving Picture Experts Group (MPEG) (for example, MP2, MP4, MP7, or the like), joint photographic coding experts group (JPEG), Advanced Image Coding (AVC), H.264, H.265, High Efficiency Image Codec (HEVC), VC-1, VP8, VP9, AOMedian image 1 (AV1), VC-1, VP8, VP9, AOMedian image 1 (AV1), or the like.

The quality estimator 113 may include various processing circuitry and/or executable program elements and estimate the quality of the image and control at least one of the downscaler 111 or the encoder 112 based on the estimated quality. For example, the quality estimator 113 may obtain the quality information of the image and control at least one of the downscaling process of the downscaler 111 or the encoding process of the encoder 112 based on the obtained quality information. The quality information may include a quality indicator corresponding to at least one of resolution information or bitrate (or compression strength) information. However, the quality information may be implemented with other types of information that can control at least one of the downscaler 111 or the encoder 112, but is not necessarily limited thereto. For example, the quality information may include a quality indicator corresponding to at least one of downscaling information (for example, a downscaling ratio) or bitrate (or compression strength) information.

When the resolution information and the bitrate information corresponding to the quality information which are optimal for an image are obtained in the image, the quality estimator 113 may provide the obtained resolution information to the downscaler 111 and provide the obtained bitrate information to the encoder 112. That is, the processor 110 may control the optimal resolution and the bitrate of the image based on the image quality in real time.

According to an embodiment, the quality estimator 113 may obtain the quality information of the image using the second AI model trained to obtain the quality information of the image, and may control at least one of the downscaling of the image or the encoding of the downscaled image based on the obtained quality information. The second AI model can be trained to obtain the quality information of the image using the feature information of the image obtained from the first AI model. As an example, the second AI model may estimate and output an image quality indicator for a pre-defined resolution and bitrate combination in a vector form. The vector form may refer, for example, to various quality indicators obtained for a pre-defined resolution and bitrate combination. However, in another example, the second AI model may estimate and output an image quality indicator for a pre-defined downscaling ratio and a bitrate combination in a vector form.

Figure 4:
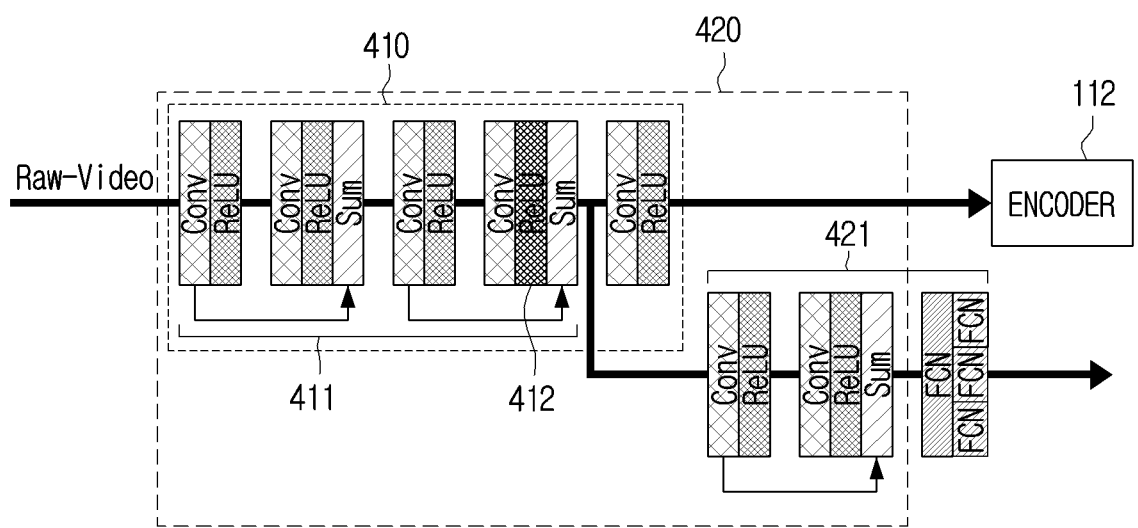
FIG. 4 is a diagram illustrating an example relationship between a first artificial intelligence model and a second artificial intelligence model according to an embodiment.

FIG. 4 is a diagram illustrating an example relationship between a first artificial intelligence model and a second artificial intelligence model according to an embodiment.

As illustrated in FIG. 4, a first AI model 410 may include a plurality of neural network layers and each of the plurality of neural network layers may include a plurality of parameters. The first AI model 410 may perform neural network operation through the operation result of a previous layer and operation among a plurality of parameters.

According to an example, operation data may be output through activation function, for example, rectified linear unit (ReLU) operation after applying the convolution filter in an arbitrary layer. In this case, the operation data output from the layer is multi-channel data, for example, 64 feature map (or activation map) data may be output and provided to a next layer. According to an example, the feature map data may be stored in a memory (internal buffer or external memory) and then provided to a next layer. However, the configuration is not shown in FIG. 4. The parameter may refer, for example, to a weight (or coefficient) of the filter. In this case, the first AI model 410 may perform operations using various types of activation functions such as, for example, and without limitation, an identity function, a logistic sigmoid function, a hyperbolic tangent (tanh) function, a ReLU function, a leaky ReLU function, or the like.

As illustrated in FIG. 4, a second AI model 420 may include a plurality of neural network layers and each of the plurality of neural network layers may include a plurality of parameters. At least one layer 421 included in the second AI model 420 may be trained in connection with at least one layer 411 included in the first AI model 410.

As an example, the second AI model 420 may be implemented to share at least one layer 411 with the first AI model 420. As another example, the second AI model 420 may be implemented to include only one layer 421 that uses the feature information output from the first AI model 420. However, for convenience of description, it is assumed that the second AI model 420 is implemented to share at least one layer 411 with the first AI model 420.

For example, the second AI model 420 may include at least one layer 421 for receiving the feature map data output from a specific layer 412 among the plurality of layers included in the first AI model 420. Accordingly, the second AI model 420 may be embodied in a form that includes at least some of the layers 411 and the added at least one layer 421 included in the first AI model 410. The specific layer 412 may be a layer belonging to an original resolution domain. For example, the first AI model 410 may perform downscaling through an interpolation operation, for example, bicubic, where feature map data output from the layer of the domain may be provided to the second AI model 420, since the resolution information of the quality information output from the second AI model 420 is fed back to the first AI model 410 to control downscaling of the first AI model 410. Accordingly, the feature map data before the downscaling is performed should be provided to the second AI model 420.

Figure 5:
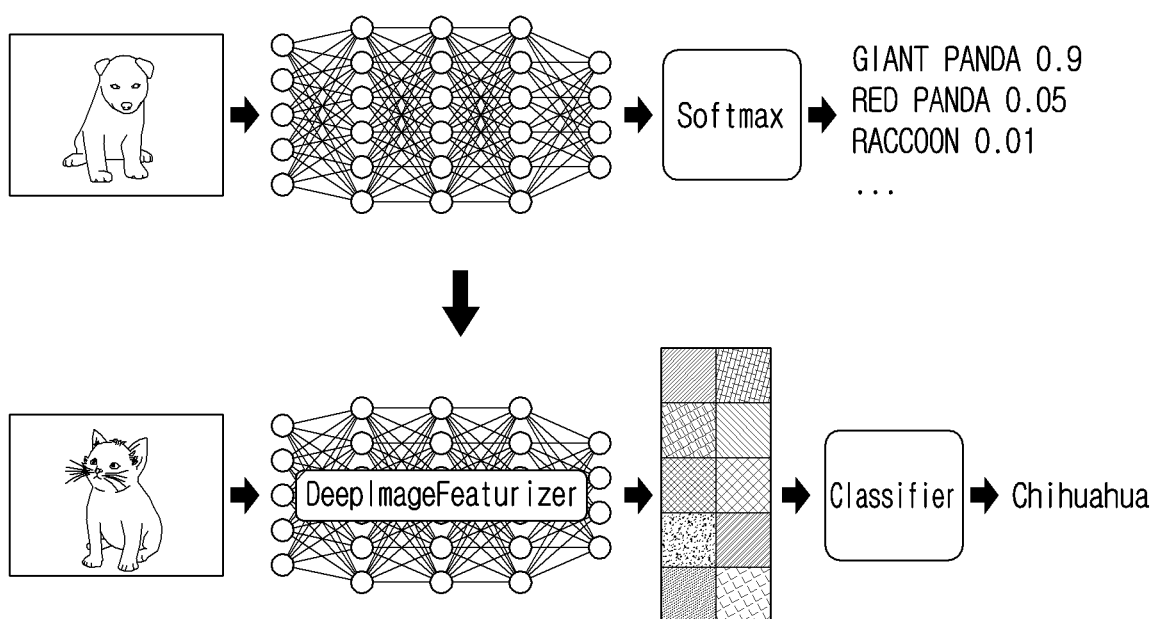
FIG. 5 is a diagram illustrating an example learning method of a second artificial intelligence model according to an embodiment.

According to an example embodiment, the second AI model 420 may be implemented to fix the parameters of at least one layer 411 shared with the first AI model 410, and train parameters of the remaining layers 421 which do not share with the first AI model 410. For example, transfer learning may be used to train the second AI model 420. Transfer learning may refer, for example, to a method of reusing and learning a model well trained for a specific application in another application. For example, suppose that there is a well-trained model for classifying animals in an image as shown in the upper part of FIG. 5. When generating a model with more types of animals as shown in the lower part of FIG. 5, existing trained models may be reused without need to re-training from the beginning and only a classifier part may be additionally trained to generate a new model. The transition learning method has an advantage of rapidly learning data with a small amount of data, and is known to be excellent in terms of performance. This is an efficient method when there is already a well-trained model, and when attempting to solve a problem similar to that model. As such, the second AI model 420 may be implemented to use at least some layer 411 of the first AI model 410 that is well-trained for downscaling, and further training only the remaining additional layers 421.

However, even if the second AI model 420 is implemented to include only one layer 421 for receiving feature map data output from at least one layer included in the first AI model 410, the parameters of the at least one layer 421 included in the second AI model 420 may be trained jointly with parameters of at least some layers 411 included in the first AI model 410, as described above.

By implementing the second AI model 420 to share the feature information of the image obtained from the first AI model 410, it is possible to train the second AI model 420 efficiently and minimize and/or reduce H/W implementation complexity.

According to an example embodiment, the second AI model 420 may include a convolutional neural network (CNN) for extracting feature information of the input image, and a full connected network (FCN) for converting the two-dimensional image into one-dimensional quality information. In some cases, the second AI model 420 may further include a recurrent neural network (RNN) layer for predicting temporal variations for each frame of the image. As such, the second AI model 420 may be implemented to include various types of AI models suitable for predicting the quality of an image.

According to an embodiment, the quality information of the image output from the second AI model 420 may include a plurality of quality indicators corresponding to different combinations of the plurality of bitrate information and the plurality of resolution information associated with the image. The combination of the plurality of resolution information and the plurality of bitrate information may be pre-defined for learning of the second AI model 420.

According to an embodiment, the quality information of the image may include a quality index corresponding to the resolution information and the bitrate information. For example, resolution information may include, for example, and without limitation, standard definition (SD), high definition (HD), full high definition (FHD), quad high definition (QHD), ultra-high definition (4K UHD), ultra-high definition (8K UHD), or others, but is not limited thereto. In addition, the bitrate information may be in the form of bit rate information of an image, for example, Bit Rate_0, Bit Rate_1, Bit Rate_2, . . . , Bit Rate_N. In addition, the quality indicator may be in the form of VQ Metric_0, VQ Metric_1, VQ Metric_2, . . . , VQ Metric_N. VQ Metric may be implemented as various quality metrics that may measure the quality of images such as, for example, and without limitation, Peak Signal to Noise Ratio (PSNR), Image Multimethod Assessment Fusion (VMAF), Structural Similarity (SSIM), Naturalness Image Quality Evaluator (NIQE), MSAD, Mean Squared Error (MSE), or the like.

According to an example, the quality information of the image output from the second AI model 420 may be in the form of a pair of data types including resolution, bitrate, and quality indicator. For example, the second AI model 420 may be trained to output a quality indicator for a predefined resolution and bitrate combination.

For example, the quality information of the image output from the second AI model 420 may include a plurality of quality indicators corresponding to different resolution information and different bitrate information such as, for example, and without limitation, (FHD, Bit Rate_0, VQ Metric_0), (FHD, Bit Rate_1, VQ Metric_1), (FHD, Bit Rate_2, VQ Metric_2), (FHD, Bit Rate_3, VQ Metric_3), (2K, Bit Rate_4, VQ Metric_4), (2K, Bit Rate_5, VQ Metric_5), (2K, Bit Rate_6, VQ Metric_6), (2K, Bit Rate_7, VQ Metric_7), (4K, Bit Rate_8, VQ Metric_8), (4K, Bit Rate_9, VQ Metric_9), and (4K, Bit Rate_10, VQ Metric_10), (4K, Bit Rate_11, VQ Metric_11). 1 to N are only numerical values for identifying the bit rate and the VQ metric, and the bit rate and the VQ metric may be represented by various values.

According to an embodiment, the second AI model 420 may be trained based on a difference between a plurality of first sample quality indicators corresponding to different combinations of the plurality of bitrate information and a plurality of resolution information associated with the sample image, and a plurality of second quality indicators output by inputting the sample image to the second AI model 420. The first sample quality indicator may be an actual quality indicator of the reconstructed image reconstructed by the receiving apparatus 200 from the image processed by the electronic apparatus 100.

Figure 6:
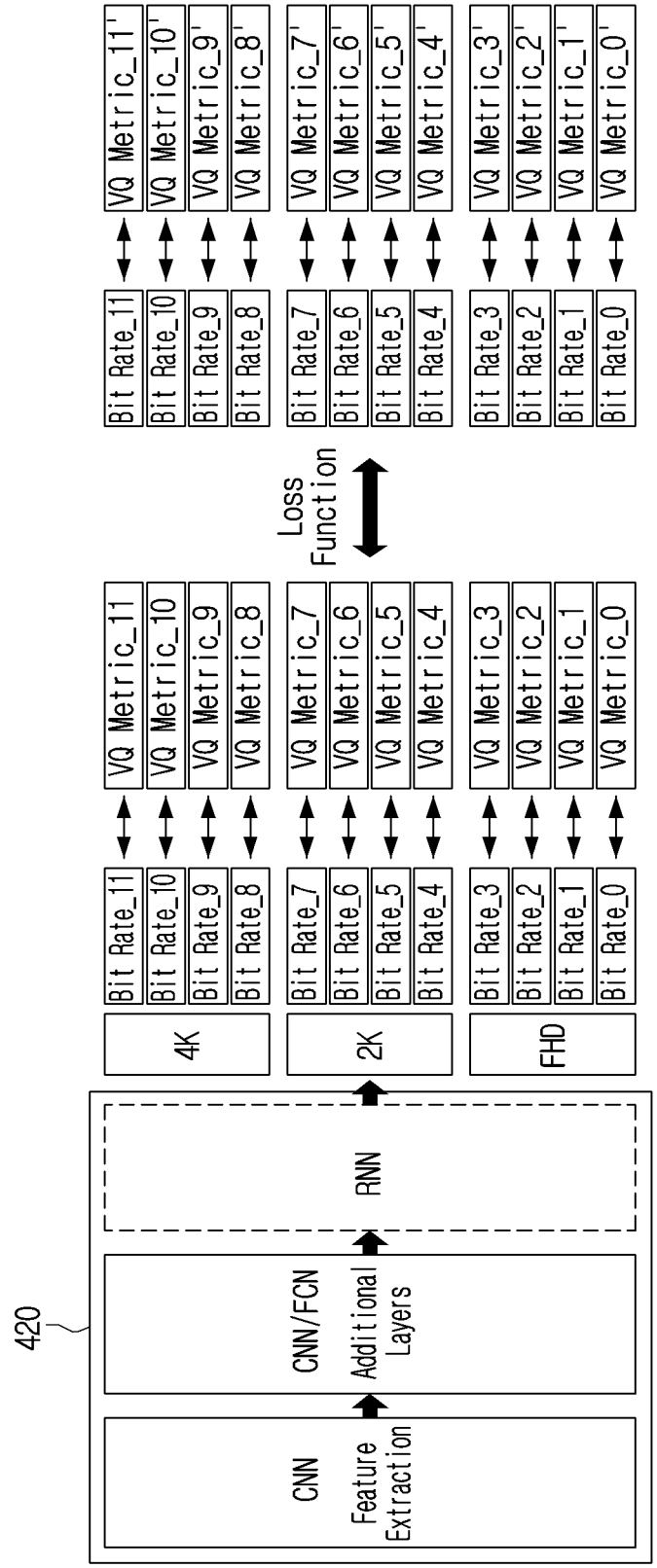
FIG. 6 is a diagram illustrating an example learning method of a second artificial intelligence model according to an embodiment.

According to an embodiment, as illustrated in FIG. 6, the second AI model 420 can be trained of the difference between the quality information output from the second AI model 420 and the quality information of the actual image using a loss function by the supervised learning. The quality information of the actual image may be obtained by downscaling and encoding an original training image in the electronic apparatus 100 according to an example, transmitting the image to the receiving apparatus 200 through the network, and then decoding and upscaling the image received from the receiving apparatus 200 to compare the reconstructed image with the original training image. As illustrated in FIG. 6, the second AI model 420 may include a convolutional neural network (CNN) for extracting feature information of the input image, and a full connected network (FCN) for converting the two-dimensional image into one-dimensional quality information. In some cases, the second AI model 420 may further include a recurrent neural network (RNN) layer for estimating temporal changes for each frame of the image.

For example, when the actual image quality indicator is implemented as the PSNR, the PSNR indicating the actual image quality indicator may be calculated based on Equations 1 and 2 as shown below.

$$PSNR = 10 * \log_{10} \frac{255^2}{MSE} \quad \text{[Equation 1]}$$

$$MSE = \frac{1}{X*Y} \sum_{i=1}^{Q} \sum_{j=1}^{Q} = |C(i,j) - R(i,j)|^2 \quad \text{[Equation 2]}$$

Here, $C(i, j)$ is an image and $R(i, j)$ is a reconstructed image.

Returning to FIGS. 2A and 2B, the processor 110 may determine a downscaling ratio of an image and a bitrate of the downscaled image based on the resolution information and the bitrate information corresponding to any one of a plurality of quality indicators output from the second AI model 420.

According to an example, the processor 110 may determine a down scaling ratio of the image and a bitrate of the downscaled image based on a best quality indicator of the plurality of quality indicators, for example, resolution information and bitrate information corresponding to the first quality indicator. For example, the processor 110 may control the downscale operation of the first AI model 410 based on resolution information corresponding to the first quality indicator, and control the compression strength of the downscaled image output from the first AI model 410 based on the bit rate information corresponding to the first quality indicator. However, the highest quality indicator is an example, and the processor 110 may utilize an average quality indicator among a plurality of quality indicators, or may use a quality indicator corresponding to a predefined threshold quality indicator (for example, a quality indicator corresponding to less than 10% from the highest).

According to another embodiment, the processor 110 may obtain network status information and control at least one of downscaling of the image or encoding of the downscaled image based on the status information of the network and the quality information of the image. The network state information may include, for example, and without limitation, at least one of an available bandwidth of a network, a packet loss rate, a round trip-trip time of a packet, a latency metric-gradient of a packet, received signal strength indicator (RSSI) information, communication channel information, link speed information, channel interference information, retry rate information, or the like. The network state information can be various network-related information affected by the congestion, the distance, and the transmission speed of the network. The round-trip time (or round trip latency) of the packet may refer, for example, to the time that is taken for a packet to reciprocate from the network to the receiving end. The latency-gradient of the packet may be the difference between the transmission time interval of the packets transmitted at the transmitting end and the reception time interval of the packets received at the receiving end. The communication channel information may include information about at least one of a channel and a frequency. The link speed information may include information on the rate of packets transmitted from the transmitting end to the receiving end. The channel interference information may be obtained based on an interference factor for each channel measured using various channel RF parameters, such as channel active time, channel busy time, and channel transmit time. The retry rate information may indicate a percentage of transmission packets (TX packets) that are retried in a unit of a second.

According to an example, network status information may be received from a content receiving device (or content output device) (for example, FIGS. 1A and 20) connected via a network with electronic apparatus 100 and 100'. In this example, the content receiving device (or content output device) (for example, FIGS. 1A and 20) may monitor the network status to collect network status information, and if there is a predetermined period or request by the electronic apparatuses 100 and 100', may transmit the collected network status information to the electronic apparatus 100 and 100'. For example, if the network is implemented with an Internet-based transmission control protocol (TCP)/Internet protocol (IP) communication protocol, the TCP/IP may be implemented as a link layer, an Internet layer, a transport layer, and an application layer. In this example, the network state information may be collected by monitoring the network state in real time in the application layer, but is not limited thereto. However, in this case, it is possible for the electronic apparatus 100, 100' to collect network state information by directly monitoring the network status.

According to an example, the processor 110 may control at least one of downscaling of an image or encoding of a downscaled image based on the status information of the network and the quality information of the image. For example, the processor 110 may determine at least one quality indicator of the plurality of quality indicators based on the status information of the network and determine a quality indicator of the at least one quality indicator based on the target quality indicator. In this case, the processor 110 may determine one quality indicator based on the bitrate that is currently available in the network state. The processor 110 can select a quality indicator of a lowest bitrate when there are a plurality of bit rates that can be transmitted in a current network state, that is, a plurality of quality indicators corresponding to a corresponding bit rate. Accordingly, network bandwidth can be reduced as much as possible.

The processor 110 may determine the down the downscaling ratio of an image and bitrate of the downscaled image based on the resolution information and bitrate information corresponding to the determined image quality indicator.

For example, if it is assumed that the quality indicator vector value of the image is called Image Quality Metric (VQM), the network status vector value is called Network Status (NS), and the target VQM value (maximum quality criterion, for example, PSNR 45dB or more) is set, the optimal resolution and bitrate may, for example, be determined by the following method: i) a VQM Set (VQM') that can be transmitted in a current network state among a plurality of VQMs output from the second AI model is estimated, ii) a set satisfying the Target VQM value among VQM' is obtained, and iii) if there is no set that satisfies the target VQM value (for example, the network condition is poor), lower the Target VQM by 10% and repeat steps i) and ii). If there is a set that satisfies the target VQM value, select the bitrate and resolution combination that has the lowest bitrate.

According to another example, the quality information of an image output from the second AI model 420 may additionally include pair data in a form including resolution, bit rate, and quality indicator and probability information of the data.

For example, the quality information output from the second AI model 420 may include a plurality of quality indicators corresponding to different bitrate information and different resolution information such as, for example, and without limitation, (FHD, Bit Rate_0, VQ Metric_0, probability_0), (FHD, Bit Rate_1, VQ Metric_1, probability 1), (FHD, Bit Rate_2, VQ Metric_2, probability_2), (FHD, Bit Rate_3, VQ Metric_3, probability_3), (2K, Bit Rate_4, VQ Metric_4, probability_4), (2K, Bit Rate_5, VQ Metric_5, probability_5), (2K, Bit Rate_6, VQ Metric_6, probability_6), (2K, Bit Rate_7, VQ Metric_7, probability_07), (4K, Bit Rate_8, VQ Metric_8, probability_8), (4K, Bit Rate_9, VQ Metric_9, probability_9), (4K, Bit Rate_10, VQ Metric_10, probability_10), and (4K, Bit Rate_11, VQ Metric_11, probability_11) and a probability value corresponding to each quality indicator. Herein, 1 to N are numbers for identifying the bit rate and VQ metric, and bit rate, VQ metric, and probability may be represented with various numbers.

The probability value may refer, for example, to a probability that it is the minimum bit rate that can provide the quality of the threshold range. For example, referring to FIG. 7, if the quality of the threshold range required by the electronic apparatus 100 is set as a range 710, a specific bit rate 720 may be the minimum bit rate satisfying the quality of the resolution threshold range. However, for convenience of description, it is assumed that the resolution is one. As such, the probability value may indicate the probability that a specific data pair corresponds to the minimum bit rate. If the electronic apparatus 100 provides similar quality and critical range quality even if it is compressed to bit rate A and bit rate B (A<B), it is advantageous to compress to small bit rate A rather than large bit rate B in terms of compression efficiency. Therefore, the probability value may be significant.

In this case, the second AI model may be trained to additionally output not only pair data in a format to include image quality information such as resolution, bit rate and quality indicator but also probability information of the data.

According to an embodiment above, network bandwidth may be used efficiently and user's felt quality may be maximized in a given network environment.

Returning to FIGS. 2A and 2B, according to an embodiment, the processor 110 may control at least one of downscaling or encoding of a current frame based on the predicted (or estimated) quality information from the current frame of the image. According to another embodiment, the processor 110 may control at least one of downscaling or encoding of the current frame based on quality information predicted from at least one previous frame of the image.

Figure 8A:
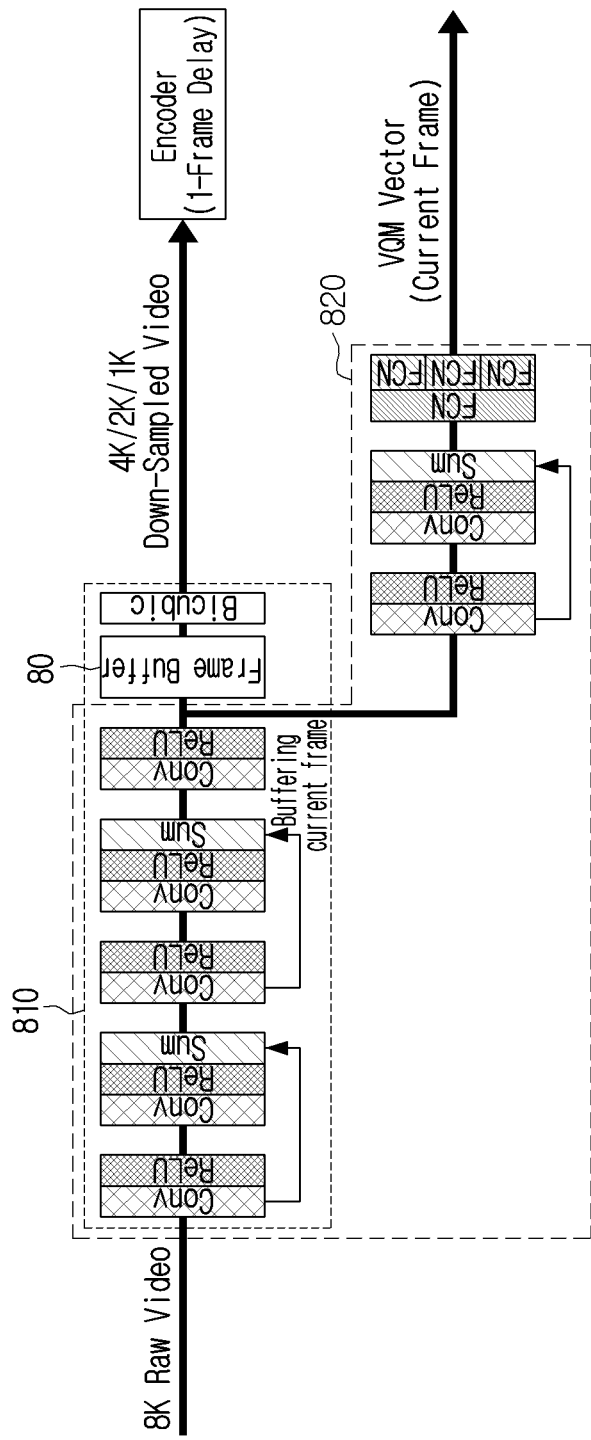
FIG. 8A is a diagram illustrating an example of using quality information of a current or previous frame according to various embodiments.
Figure 8B:
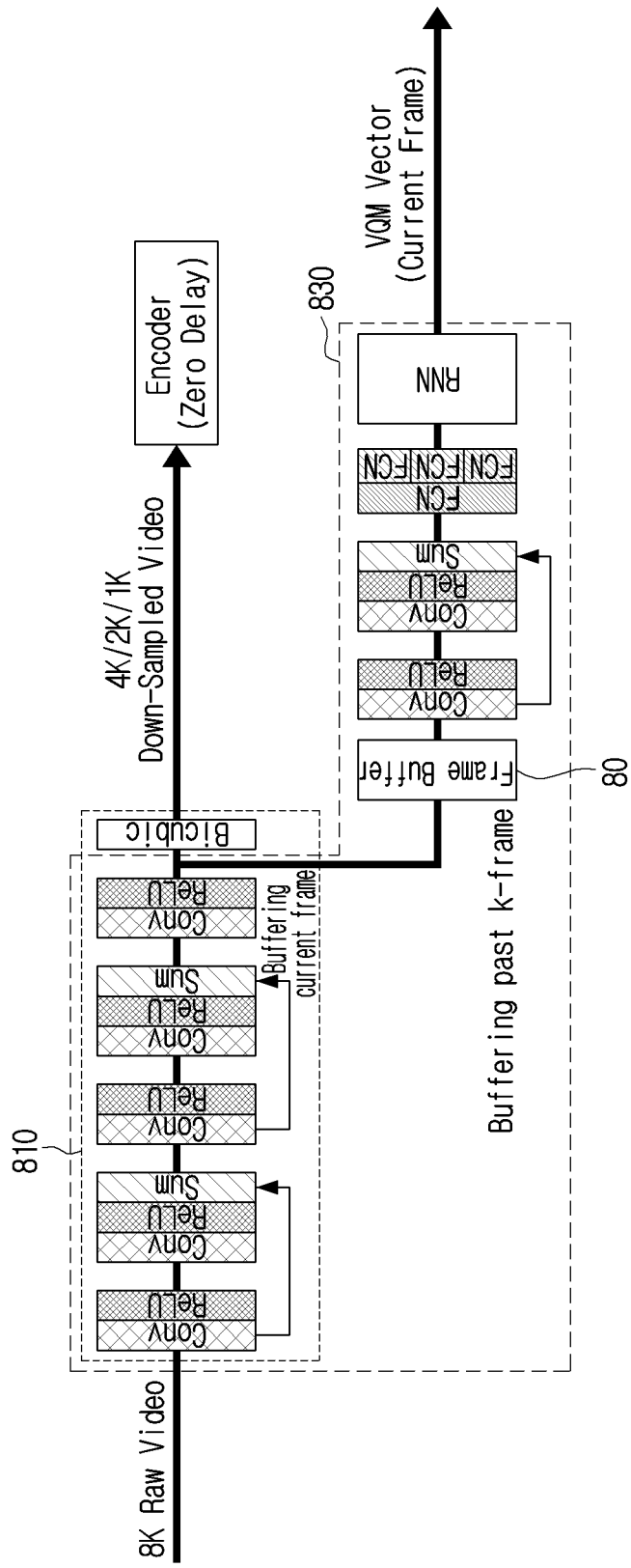
FIG. 8B is a diagram illustrating an example of using quality information of a current or previous frame according to various embodiments.

FIGS. 8A and 8B are diagrams illustrating examples using quality information of a current or previous frame according to various embodiments.

FIG. 8A is a diagram an example of controlling at least one of downscaling or encoding of a current frame based on quality information corresponding to a current frame by the processor 110 according to an embodiment.

Referring to FIG. 8A, when the first image frame (the current image frame) is input to the first AI model 810, the processor 110 may input image feature information output from a specific layer included in the first AI model 810, for example, the feature map data corresponding to the first image frame (the current image frame), to the second AI model 820. The specific layer may be a layer belonging to an original resolution domain, for example, a layer corresponding to a resolution before the interpolation process is performed. The processor 110 may store the feature information of the first image frame (the current image frame) output from the particular layer, for example, feature map data, in a frame buffer 80 and downscale the feature map data stored in the frame buffer 80 based on the quality information output from the second AI model 820 to obtain a downscaled frame. Accordingly, the downscaled frame may be one frame latency (e.g., approximately 16.7 ms based on 60 FPS) and input to the image encoder. However, it is possible to increase prediction accuracy and reduce complexity.

FIG. 8B is a diagram illustrating an example where the processor 110 controls at least one of downscaling or encoding of the current frame based on the quality information corresponding to the previous frame of the image according to another embodiment. For example, the processor 110 may predict the quality information of the N frame based on N1, N-2, . . . N-k frames and control at least one of downscaling or encoding of the N frame based thereon.

Referring to FIG. 8B, when the second image frame (previous image frame) is input to the first AI model 810, the processor 110 may input image feature information output from a specific layer included in the first AI model 810, for example, the feature map data corresponding to the second image frame (previous image frame), to the second AI model 820. The specific layer may be a layer that belongs to a resolution domain of an image before a substantial downscaling, for example, bicubic processing, is performed. The processor 110 may store feature information of a second image frame (previous image frame) output from a specific layer, that is, the feature map data, in a frame buffer 81 (for example, first in first out (FIFO)), and obtain quality information based on the feature map data stored in the frame buffer 81. When the third image frame (the current frame) is input to the first AI model 810, the processor 110 can perform downscaling for the third image frame (the current frame) based on the quality information predicted based on the at least one second image frame (previous image frame), for example, bicubic. Accordingly, the downscaled current frame may be input to the image encoder without latency.

For this purpose, the second AI model 830 may include at least one recurrent neural networks (RNN) layer that is trained to predict quality information of the current frame based on the feature information corresponding to at least one previous frame, as illustrated in FIG. 8B. This is because, in the embodiment of FIG. 8B, the quality information of the current image frame should be predicted based on the quality information of the previous image frame, since the RNN is a network suitable for analysis of data sequentially inputted with time difference and future prediction based on the analysis.

In FIGS. 8A and 8B, the full connected network (FCN) is divided into three FCNs in a last layer of the second AI model 820 to divide and represent different resolutions (for example, 4K, 2K, FHD of FIG. 6), but the FCN may be implemented as one FCN.

In the above embodiment, it has been illustrated that the bicubic processing in the first AI model 810 is performed at the rear end of the last neural network layer, but the bicubic processing may be performed at the rear end of the intermediate neural network layer, in which case the feature map data output from the neural network layer prior to the bicubic processing may be provided to the second AI model 820, 830.

In the embodiment above, interpolation processing (for example, bicubic) and the neural network layer included in the first and second AI models 810, 820, and 830 may be implemented as software, hardware, or combination thereof (e.g., processing circuitry and/or executable program elements).

The processor 110 may generate a packet (or frame) based on the encoded image, such as the method described above, and transmit the generated packet. According to one example, processor 110 may transmit a packet (or frame) including the encoded image to the receiving apparatus 200 (FIG. 1). In this example, the resolution information and the bitrate information may be included in the header area of the packet, and the encoded image can be included in the payload area of the packet. According to an embodiment, resolution and bitrate can be changed in at least one frame unit, and resolution and bitrate corresponding to at least one frame unit can be included in a header of the packet.

Figure 9:
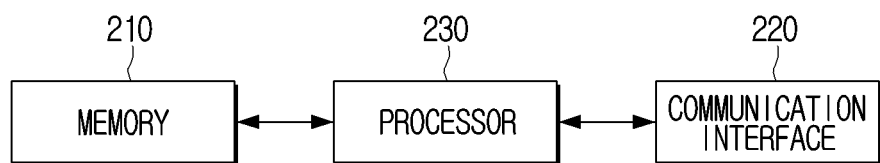
FIG. 9 is a block diagram illustrating an example configuration of an electronic apparatus according to an embodiment.

FIG. 9 is a block diagram illustrating an example configuration of an electronic apparatus according to an embodiment.

The electronic apparatus illustrated in FIG. 9 may be implemented as an apparatus for receiving a content from the electronic apparatus 100 and 100' illustrated in FIGS. 2A and 2B and outputting the content, and may be referred, for example, to a receiving apparatus to be distinguished from the electronic apparatus 100 and 100'.

Referring to FIG. 9, the receiving apparatus 200 includes a memory 210, a communication interface (e.g., including communication circuitry) 220, and a processor (e.g., including processing circuitry) 230.

The receiving apparatus 200 may be implemented, for example, as a television (TV) or a set-top box, but is not limited thereto, and may be implemented as various types of devices having a display function such as, for example, and without limitation, smartphones, tablet personal computer (PC)s, mobile phones, electronic book, desktop PCs, laptop PCs, netbook computers, a personal digital assistant (PDA), a portable multimedia player (PMP), a moving picture experts group phase 1 or phase 2 (MPEG-1 or MPEG-2) audio layer 3 (MP3) player, a mobile medical device, a camera, a camcorder, an electronic frame, a wearable device (e.g., a head-mounted-device (HMD), a smartwatch, an electronic garment, an electronic bracelet, an electronic necklace, or the like), a near eye display (NED), a large format display (LFD), a digital signage, a digital information display (DID), an image wall, a projector display, or the like, but is not limited thereto, and may be an apparatus that processes data using an AI model.

According to an example, images of various resolutions and various compression images may be received. For example, the receiving apparatus 200 may receive an image of at least one resolution among SD, HD, FHD, UHD, UHD or more. The electronic apparatus 100 may receive an image with a compressed form such as MPEG, JPEG, AVC, H.264, H.265, HEVC, VC-1, VP8, VP9, AV1 (AOMedian image 1), or the like. The received image may be an image encoded from the electronic apparatus 100 and 100'.

The memory 210 may store data necessary for various embodiments. The implementation format of the memory 210 is similar to the format of the memory 120 of FIG. 2B and will not be further described.

According to an example, the memory 210 may store at least one instruction or a computer program including instructions for controlling the receiving apparatus 200.

According to another example, the memory 210 may store information about an AI model including a plurality of layers. Storing information about the AI model may refer, for example, to storing various information related to the operation of the AI model, for example, information about a plurality of layers included in the AI model, information about parameters (for example, filter coefficients, bias, etc.) used in each of the plurality of layers, or the like. For example, the memory 210 may store information about an AI model trained to upscale an image in accordance with an example embodiment. The information regarding the AI model may be stored in the internal memory of the processor 230 according to the implementation of the processor 230 described below. For example, if the processor 230 is implemented as dedicated hardware, information about the AI model may be stored in the internal memory of the processor 230.

According to another example, the memory 210 may store an image received from an external server, external device, external storage medium (for example, USB), external server (for example, web hared). The image may be a digital moving image but is not limited thereto.

According to still another example, the memory 210 may store information, algorithm, image quality parameter, or the like, necessary for upscaling, information necessary for compression, various information necessary for image quality processing for performing at least one of, for example, noise reduction, detail enhancement, tone mapping, contrast enhancement, color enhancement or frame rate conversion. The memory 210 may store a final output image generated by image processing.

In the above embodiment, it has been described that various data is stored in the external memory 210 of the processor 230, but at least a part of the aforementioned data may be stored in an internal memory of the processor 230 according to at least one example of the receiving apparatus 200 or the processor 230.

The communication interface 220 may include various processing circuitry and receive various types of contents. For example, the communication interface 220 may receive an image signal by streaming or downloading from an external device (for example, a source device), an external storage medium (for example, a universal serial bus (USB) device), an external server (for example, a web server, etc.) through communication methods such as an access point (AP)-based Wi-Fi (wireless LAN network), Bluetooth, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like. According to an embodiment, the communication interface 220 may receive a real-time image from the electronic apparatus 100, 100' through the Internet communication network.

The processor 230 may include various processing circuitry and is electrically connected to the memory 210 and may control overall operation of the receiving apparatus 200. The processor 230 may include one or a plurality of processors. The processor 230 may perform an operation of the receiving apparatus 200 according to various embodiments by executing at least one instruction stored in the memory 210. The implementation format of the processor 230 is the same or similar to the format of the processor 110 of FIGS. 2A and 2B, and will not be further described.

The processor 230 may obtain output data by processing input data. The input data may include at least one of a text, an image, or a user voice. For example, the input data may be input through a communicator communicable with an external device, a user inputter such as a keyboard or a touch pad, a camera, a microphone, or the like. The output data may have various formats according to a type of an AI model. For example, the output data may be an image with improved resolution, information related to an object included in an image, a text corresponding to voice, or the like.

According to an embodiment, the processor 230 may image-process an input image to obtain an output image. The image processing may be digital image processing including at least one of image enhancement, image restoration, image transformation, image analysis, image understanding, or image compression. In one example, when the input image is a compressed image, the processor 230 may decode a compressed image and perform image processing.

According to an embodiment, when an input image, for example, an image that is encoded after being downscaled by the electronic apparatus 100, 100', is received, the processor 230 may obtain an output image by decoding (or releasing compression) a received image and upscaling the decoded image.

According to an example, the processor 230 may decode an image received based on a compression method of the received image. The processor 230 may upscale a decoded image using an AI model.

According to an embodiment, since the image resolution and the image bitrate can be changed in at least one frame unit, the processor 230 needs to know the resolution and the bitrate of the transmitted image. For example, when an input image of a packet type is received by the processor 230, the processor 230 may de-packetize the packet to obtain resolution information and bitrate information included in the header area, and obtain an encoded image included in the payload area. The resolution information and the rate information included in the header area may be the resolution information associated with the downscaling performed in the electronic apparatuses 100 and 100' and the bitrate information associated with the image compression.

The processor 230 may perform decoding of an image that is encoded based on the obtained bitrate information, and perform upscaling of a decoded image based on the obtained resolution information.

Figure 10A:
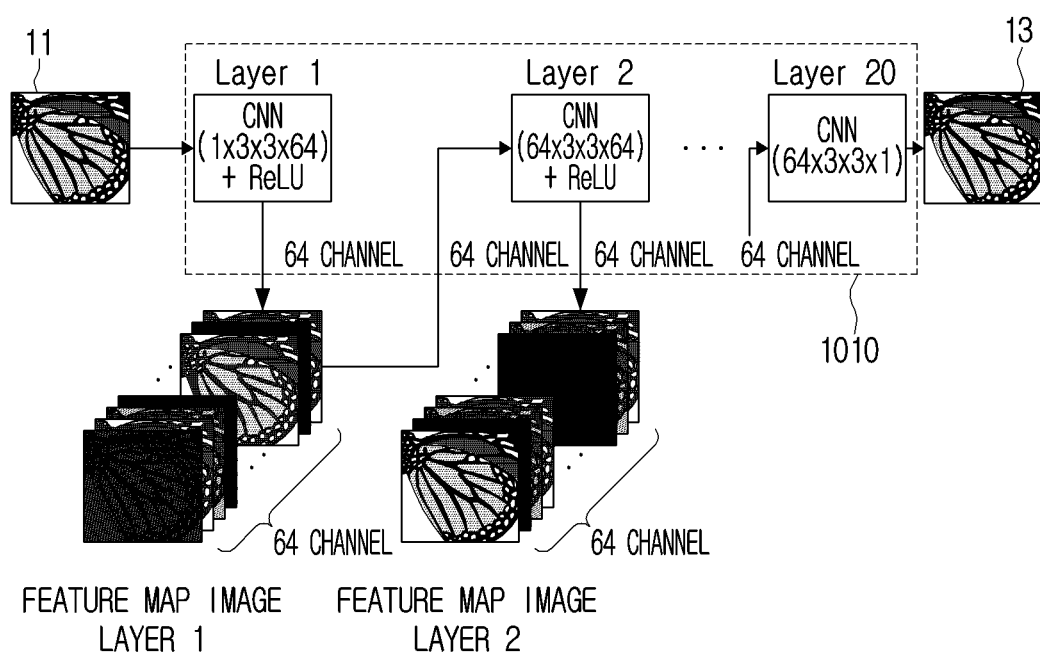
FIG. 10A is a diagram illustrating an example upscaling method using an artificial intelligence model according to an embodiment.
Figure 10B:
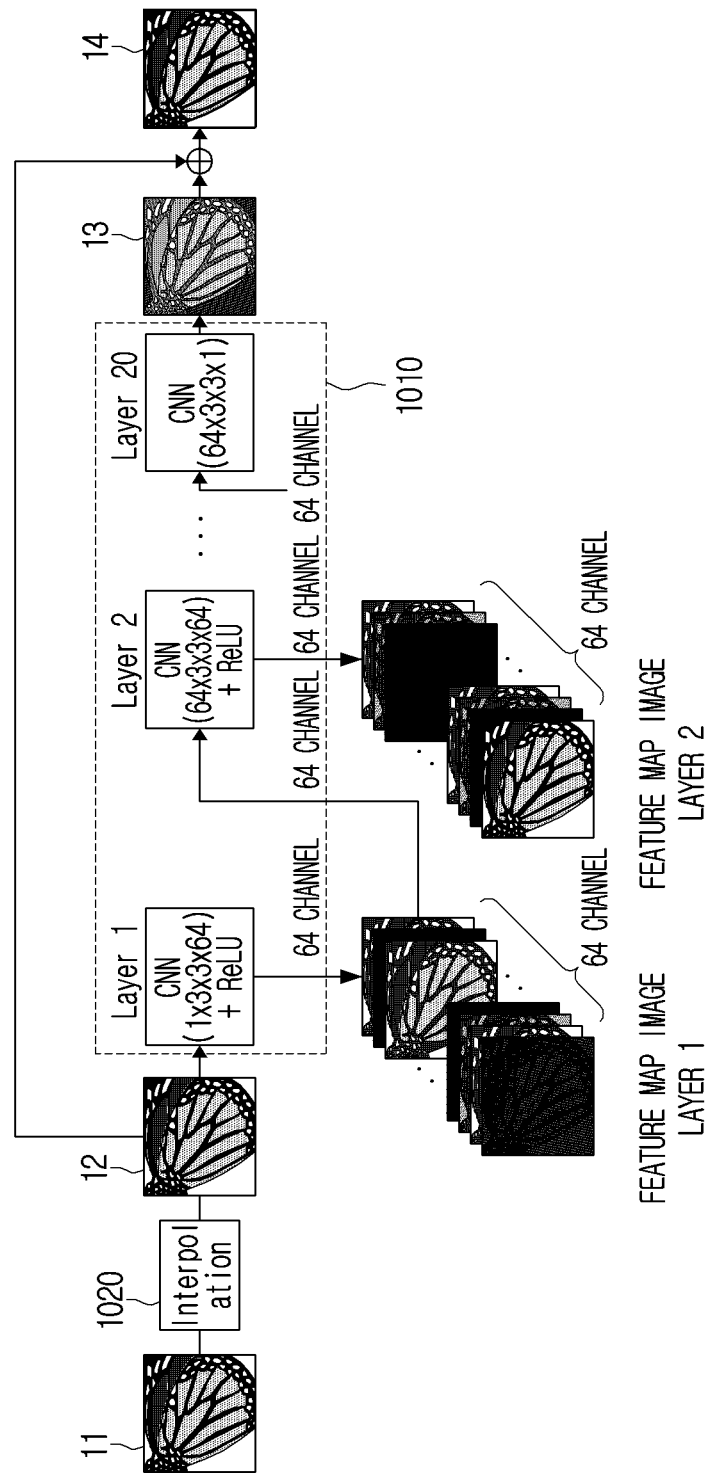
FIG. 10B is a diagram illustrating an example upscaling method using an artificial intelligence model according to an embodiment.
Figure 10C:
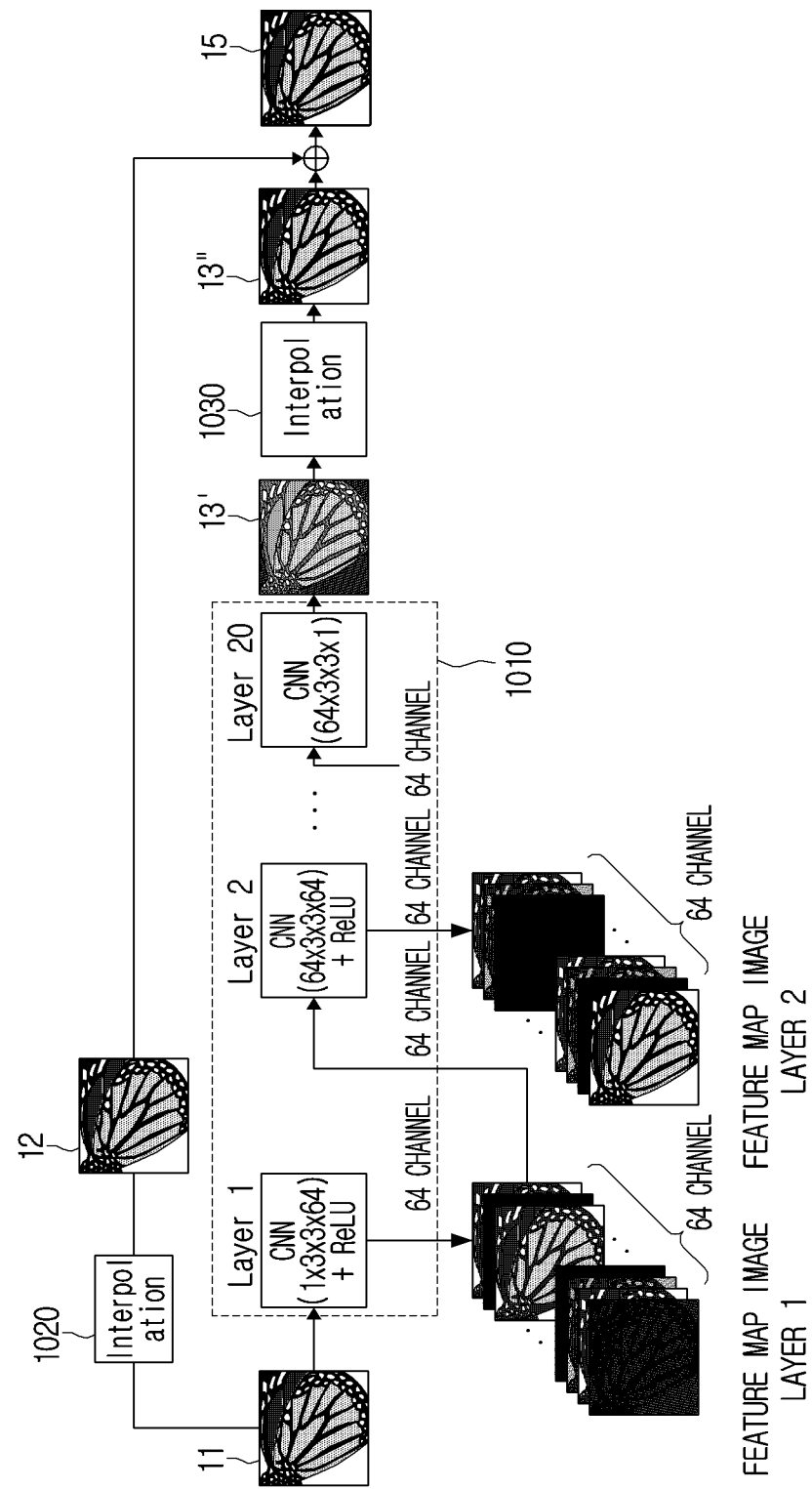
FIG. 10C is a diagram illustrating an example upscaling method using an artificial intelligence model according to an embodiment.

FIGS. 10A, 10B and 10C are diagrams illustrating an example upscaling method using an artificial intelligence model in greater detail according to an embodiment.

An AI model 1010 for upscaling according to an embodiment may be implemented as a learning network model for super resolution processing. Super resolution may refer, for example, to processing of transforming an image with a low resolution to a high resolution through a series of media processing.

According to an example, the processor 230 may upscale the decoded image 11 using the AI model 1010 including a plurality of neural network layers, as shown in FIG. 10A. Each of the plurality of neural network layers includes a plurality of parameters (or a plurality of weight values), and may perform a neural network operation through an operation between result of a previous layer and a plurality of parameters. The parameters included in the plurality of neural network layers may be optimized by learning results of the AI model. For example, the parameters may be updated such that a loss value or a cost value obtained by the AI model is reduced or minimized during the learning process. Artificial neural networks may include deep neural networks (DNNs), for example, and without limitation, Convolutional Neural Networks (CNNs), Recurrent Neural Networks (RNNs), Generic Adversarial Networks (GANs), Restricted Boltzmann Machines (RBMs), Deep Belief Network (DBN), Bidirectional Recurrent Deep Neural Network (BRDNN), Deep Q-Networks, or the like, but are not limited to the above examples.

According to another example, the processor 230 may perform an interpolation process 1020 on the decoded image 11 as shown in FIG. 10B, and input the interpolated image 12 to the AI model 1010 to obtain a residual image 13. For example, the AI model 1010 may be implemented as a residual neural network. Each of the plurality of layers of the residual neural network can generate a residual image for the interpolated image using a filter including different parameters. However, the AI model 1010 does not necessarily generate only the residual image, and may process the input image in various ways according to an implementation example of the AI model 1010, and output the processed image. In this case, the processor 230 may combine the interpolation-processed image 12 with the residual image 13 to obtain an output image 14, for example, a high resolution image. The interpolation process may, for example, include a process of scaling an image having a low resolution to a high resolution, and at least one interpolation technique may be used, for example, and without limitation, bilinear interpolation, nearest neighbor interpolation, bicubic interpolation, deconvolution interpolation, subpixel convolution interpolation, polyphase interpolation, trilinear interpolation, linear interpolation, or the like. The residual image may refer to an image including only residual information. The residual information may include, but is not limited to, at least one of an edge direction, an edge intensity, noise information, or texture information as information according to a difference between an input image and a reference image. According to another example, the residual information may include at least one of gray scale information, brightness information, or gamma information.

According to another example, the processor 230 may input the decoded image 11 to the AI model 1010 as shown in FIG. 10C to obtain a residual image 13', and interpolate 1030 the residual image 13' to obtain the interpolated residual image 13". The processor 230 may also perform the interpolation process 1020 on the decoded image 11 to obtain the interpolated image 12. The processor 230 may then combine the interpolated image 12 with the interpolated residual image 13" to obtain an output image 15, for example, a high resolution image. According to the embodiment shown in FIG. 10C, unlike the embodiment shown in FIG. 10B, the decoded image 11 may be input to the AI model 1010 to obtain the residual image 13'.

However, according to another embodiment, an AI model other than the AI model 1010 may be further included. In this example, the AI model 1010 and the other AI model can operate sequentially or operate in parallel. As an example, the processor 230 may input the decoded image 11 to the AI model 1010, input the output of the AI model 1010 to the other AI model, and then obtain an output image based on the image output from the other AI model. As another example, the processor 230 may input the decoded image 11 to each of the AI model 1010 and the other AI model, and obtain an output image based on a plurality of images output in parallel from the AI model 1010 and the other AI model. For example, the AI model 1010 may be a model that generates a first residual image, and the other AI model may include a model that generates a second residual image. The AI model 1010 may refer, for example, to a model for upscaling of resolution, and the other AI model can be a model for one of the various image processes described above (for example, noise reduction). The AI model 1010 may be a model for object area processing, and the other AI model can be a model for background area processing.

Figure 11A:
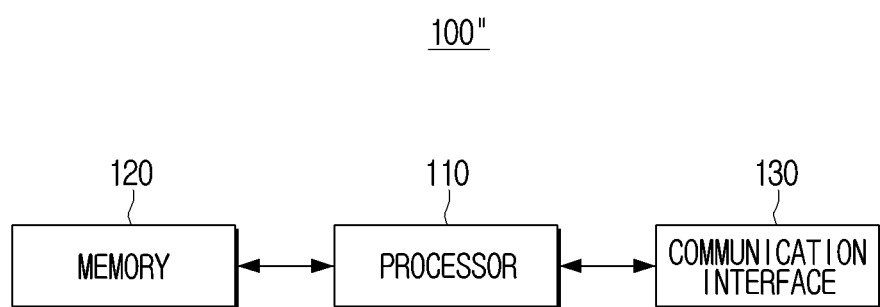
FIG. 11A is a diagram illustrating an example electronic apparatus and an example receiving apparatus according to an embodiment.
Figure 11B:
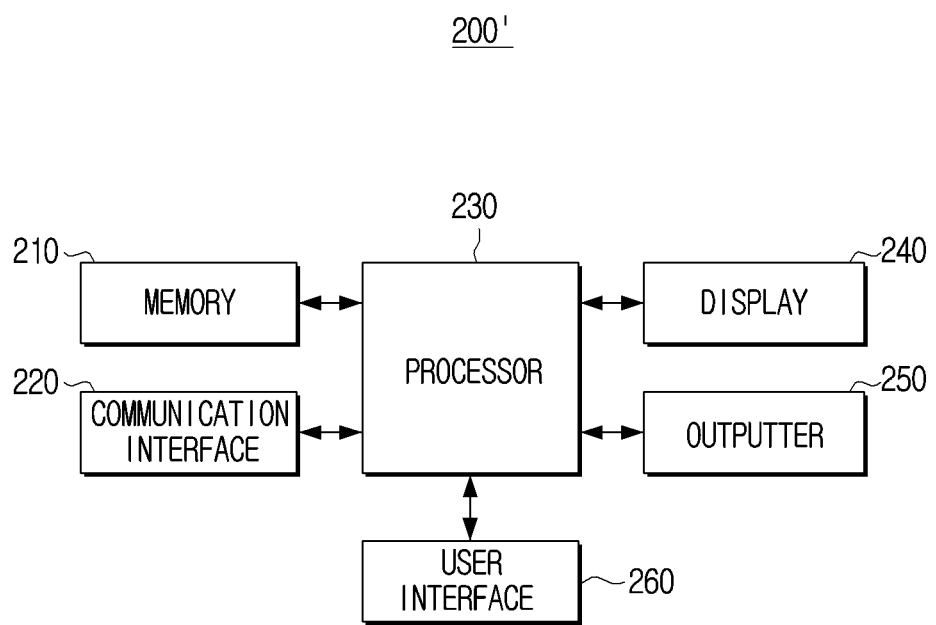
FIG. 11B is a block diagram illustrating an example electronic apparatus and an example receiving apparatus according to an embodiment.

FIGS. 11A and 11B are block diagrams illustrating examples of an electronic apparatus and a receiving apparatus according to an embodiment.

FIG. 11A illustrates an example of the electronic apparatus according to an embodiment. According to FIG. 11A, an electronic apparatus 100" includes the processor (e.g., including processing circuitry) 110, the memory 120, and the communication interface (e.g., including communication circuitry) 130. The processor 110 and the memory 120 are overlapped with the configurations of FIGS. 2A and 2B and will not be further described.

The communication interface 130 may include various communication circuitry and communicate with an external device. For example, the communication interface 130 may receive an image signal by streaming or downloading from an external device (for example, a source device), an external storage medium (for example, a universal serial bus (USB) device), an external server (for example, a web server, etc.) through communication methods such as, for example, and without limitation, an access point (AP)-based Wi-Fi (wireless LAN network), Bluetooth, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like. According to an embodiment, the communication interface 130 may transmit to the receiving apparatus 200 illustrated in FIG. 9 a real-time image through the Internet communication network.

FIG. 11B illustrates an example of a receiving apparatus according to an embodiment. Referring to FIG. 11B, a receiving apparatus 200' includes the memory 210, the communication interface (e.g., including communication circuitry) 220, the processor (e.g., including processing circuitry) 230, the display 240, the outputter (e.g., including output circuitry) 250, and a user interface 260. The memory 210, the communication interface 220, and the processor 230 are overlapped with the configurations of FIG. 9 and thus will not be further described.

The display 240 may be implemented as a display including a self-emitting element or a display including a non-self-limiting element and a backlight. For example, the display 240 may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 240, a backlight unit, a driving circuit which may be implemented as an a-si TFT, low temperature poly silicon (LTPS) TFT, organic TFT (OTFT), or the like, may be included as well. The display 140 may be implemented as a touch screen coupled to a touch sensor, a flexible display, a rollable display, a third-dimensional (3D) display, a display in which a plurality of display modules are physically connected, or the like. The processor 230 may control the display 240 to output an output image that is obtained according to various embodiments. Here, the output image may be a high-resolution image of 4K, 8K or more.

The outputter 250 may include various output circuitry and outputs a sound signal. For example, the outputter 250 may convert the digital sound signal processed by the processor 230 into an analog sound signal, amplify and output the analog sound signal. For example, the outputter 250 may include various output circuitry, such as, for example, and without limitation, at least one speaker unit, a D/A converter, an audio amplifier, or the like, capable of outputting at least one channel. According to an example, the outputter 250 may be implemented to output various multi-channel sound signals. The processor 230 may control the outputter 250 to process the input sound signal in accordance with the enhanced processing of the input image. For example, the processor 230 may convert an input two-channel sound signal into a virtual multi-channel (for example, 5.1 channel) sound signal, recognize a position where the receiving apparatus 200' is located to process the signal as a cubic sound signal optimized to a space, or provide an optimized sound signal according to the type of input image (for example, a content genre).

The user interface 260 may include various user interface circuitry and may be implemented as a device such as, for example, and without limitation, a button, a touch pad, a mouse, and a keyboard, a touch screen, a remote control transceiver capable of performing the above-described display function and operation input function, or the like. The remote control transceiver may receive a remote control signal from an external remote controller through at least one communication methods such as an infrared rays communication, Bluetooth communication, or Wi-Fi communication, or transmit the remote control signal.

The receiving apparatus 200' may further include a tuner and a demodulator according to an embodiment. A tuner (not shown) may receive a radio frequency (RF) broadcast signal by tuning a channel selected by a user or all pre-stored channels among RF broadcast signals received through an antenna. The demodulator (not shown) may receive and demodulate the digital intermediate frequency (IF) signal and digital IF (DIF) signal converted by the tuner, and perform channel decoding, or the like. The input image received via the tuner according to an example embodiment may be processed via the demodulator (not shown) and then provided to the processor 230 for image processing according to an example embodiment.

FIG. 12 is a diagram illustrating an example operation of an example transmitting and receiving system according to an embodiment.

In FIG. 12, a top left side in dotted lines may represent an operation of a transmitting apparatus (for example, electronic apparatus 100, 100', 100"), and a right side may represent an operation of a receiving apparatus (for example, receiving apparatus 200 and 200'). For convenient description, it is assumed that the operation of the left side is performed by the electronic apparatus 100 and the operation of the right side is performed by the receiving apparatus 200.

The electronic apparatus 100 may include a downscaler (e.g., including processing circuitry and/or executable program elements) 1210, a video encoder (e.g., including processing circuitry and/or executable program elements) 1220, a transmitter 1230, an image quality estimator (e.g., including processing circuitry and/or executable program elements) 1240, and a video quality controller (e.g., including processing circuitry and/or executable program elements) 1250, and the receiving apparatus 200 may include a receiver 1260, a video decoder (e.g., including processing circuitry and/or executable program elements) 1270, and an upscaler (e.g., including processing circuitry and/or executable program elements) 1280. Each configuration 1210 to 1280 may be implemented with IP for various processing. IP may refer, for example, to a reusable functional block and can be implemented as at least one hardware or software functional block or a combination of at least one software and at least one hardware. Each component 1210-1250 in the electronic apparatus 100 may be implemented within at least one processing chip, and each component 1260-1280 in the receiving apparatus 200 may also be implemented within at least one processing chip.

The downscaler 1210 may include various processing circuitry and/or executable program elements and downscale an image frame using a first AI model 410, 810. The image (e.g., video) encoder 1220 may include various processing circuitry and/or executable program elements and encode a downscaled image frame. A transmitter 1230 may include various transmitting circuitry and transmit an encoded image frame to the receiving apparatus 200.

In this example, the image quality estimator 1240 may include various processing circuitry and/or executable program elements and estimate the quality of the image frame based on the feature information of the image frame obtained in the downscaling process of the downscaler 1210. The feature information of the image frame may be, for example, feature map information output from a specific layer included in the first AI model 410 or 810.

Figure 13:
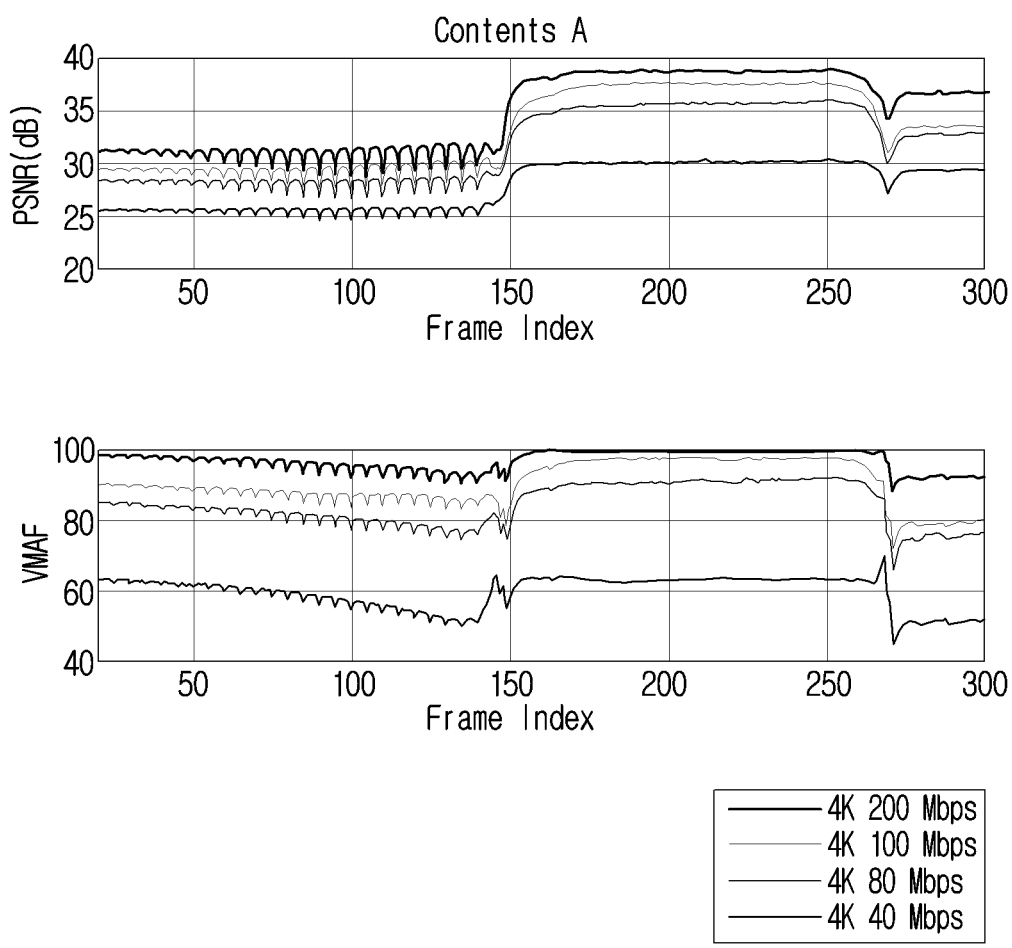
FIG. 13 is a diagram illustrating example quality information according to an embodiment.

For example, the image quality estimator 1240 may be implemented with the second AI model 420, 820. The second AI model 420, 820 may include at least some layers included with the first AI model 410, 810 and at least some layers 1241, and an additional layer 1242 for converting the feature information of the image frame to quality information. In some cases, as illustrated in FIG. 8B, an RNN layer 1243 for predicting temporal variation of an image may be further included. The quality information of the current image frame (or previous image frame) output from the second AI model 420, 820 may include a plurality of quality indicators (VQ Metric) corresponding to a plurality of resolution and bitrate sets. For example, as shown in FIG. 13, the quality information may be quality information corresponding to each frame index, for example, a resolution and a bitrate.

The image (e.g., video) quality controller 1250 may include various processing circuitry and/or executable program elements and select one quality indicator in consideration of the target quality index, network state, etc. of the electronic apparatus 100 among the plurality of quality indicators output from the second AI model 420, 820, and provide resolution information and bitrate information corresponding to the selected quality indicator to the downscaler 1210 and the image encoder 1220, respectively. The provided resolution information and the bitrate information may be obtained based on the current image frame, or may be information predicted based on the previous image frame.

The downscaler 1210 and the image encoder 1220 may perform downscaling and encoding based on the received resolution information and the bitrate information respectively.

The transmitter 1260 may include various circuitry and packetize an encoded image output from the image encoder 1220 and transmit the image to the receiving apparatus 200.

When a packet is received from the transmitting apparatus 100, the receiver 1260 included in the receiving apparatus 200 may de-packetize the received packet into a compressed image format. The image (e.g., video) decoder 1270 may include various processing circuitry and/or executable program elements and decode (or decompress) the image data output from the receiver 1260. An upscaler 1280 may include various processing circuitry and/or executable program elements and upscale the decoded image data to an output resolution to obtain an output image. The obtained output image can be displayed through a display. The header of the received packet may include the resolution information associated with the downscaling of the downscaler 1210 and the bitrate information associated with the encoding of the image encoder 1220. The image decoder 1270 may perform decoding based on the bitrate information included in the header, and the upscaler 1280 may perform the upscaling based on the resolution information included in the header.

In the embodiment shown in FIG. 12, learning of the second AI model 420, 820 can be trained with the supervised learning using the difference between the quality information output from the second AI model 420 and 820 and the quality information of the actual image as a loss function. The quality information of the actual image may be obtained by comparing the original training image and the image reconstructed via the downscaler 1210, the image encoder 1220, the transmitter 1230, the receiver 1260, the image decoder 1270, and the upscaler 1280 according to an example.

Figure 14:
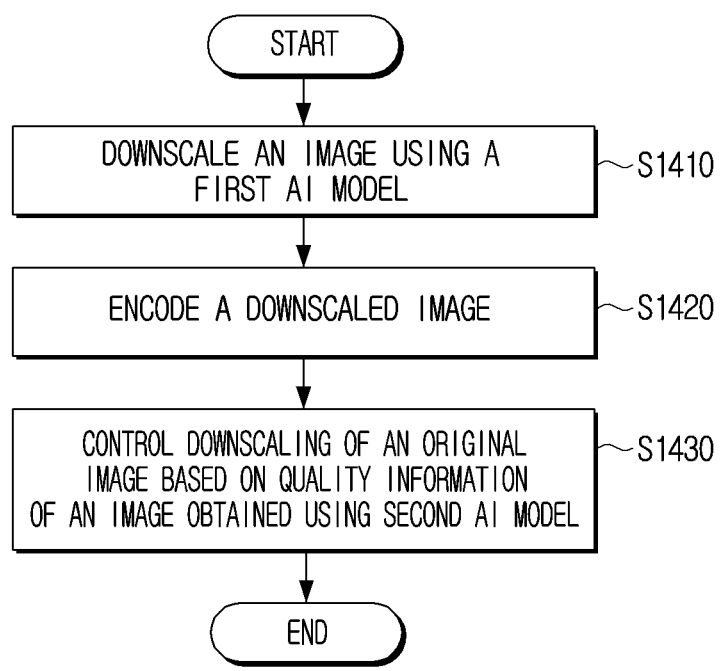
FIG. 14 is a flowchart illustrating an example method for controlling an electronic apparatus according to an embodiment.

FIG. 14 is a flowchart illustrating an example method for controlling an electronic apparatus according to an embodiment.

According to a controlling method of the electronic apparatus of FIG. 14, the electronic apparatus 100, 100', and 100" downscales an image using the trained first AI model in operation S1410. The electronic apparatus 100, 100', and 100" encodes the downscaled image in operation S1420.

In operation S1410, the downscaling of an image using the first AI model may be controlled based on quality information of the image obtained using the trained second AI model in operation S1430. The second AI model may be trained using the feature information of an image obtained from the first AI model.

In operation S1420, encoding of the downscaled image based on the quality information of an image obtained using the second AI model may be controlled.

The quality information of the image may include a plurality of quality indicators corresponding to different combinations of resolution information and bitrate information associated with the image. In step S1410, the downscaling ratio of the image can be determined based on the quality indicator of any one among the plurality of quality indicators, and the downscaling of the image can be controlled based on the determined downscaling ratio. In operation S1420, the bitrate of the downscaled image can be determined based on the quality indicator of any one of the plurality of quality indicators, and the encoding of the downscaled image can be controlled based on the determined bitrate.

In addition, the method of controlling the electronic apparatus 100, 100', 100" may further include obtaining status information of the network. In this case, in step S1410, the downscaling of the image can be controlled based on the state information of the network and the quality information of the image. In step S1420, the encoding of the downscaled image can be controlled based on the state information of the network and the quality information of the image.

The method of controlling the electronic apparatus 100, 100', 100" may further include determining at least one quality indicator of the plurality of quality indicators based on the status information of the network, and determining a quality indicator of the at least one quality indicator based on the target quality indicator. In step S1410, the downscaling of the image can be controlled based on the resolution information corresponding to the determined quality indicator. Further, in step S1420, the encoding of the downscaled image can be controlled based on the bitrate information corresponding to the determined quality indicator.

The second AI model may include, for example, at least one neural network layer and the parameter of at least one neural network layer may be trained in association with the parameter of at least some layers included in the first AI model.

In operation S1410, downscaling of the current frame may be controlled based on quality information obtained based on the current frame of the image, and downscaling of the current frame may be controlled based on quality information predicted based on at least one previous frame of the image.

The second AI model may include, for example, at least one RNN layer that is trained to predict quality information of the current frame based on the feature information corresponding to at least one previous frame.

The second AI model may be trained with the supervised learning with the differences between a plurality of quality indicators that are output by inputting a plurality of actual quality indicators corresponding to different combinations of a plurality of resolution information and a plurality of bitrate information related to the training image to the second AI model as the loss function. The actual quality indicators have been described in FIG. 6 and detailed description will not be repeated.

The method of controlling the electronic apparatus 100, 100', and 100" may further include generating a packet based on an encoded image and transmitting a generated packet. The resolution information and bitrate information of an image may be included in a header area of a packet.

According to various embodiments described above, the optimal resolution and bitrate may be controlled based on the image quality and the network state that are predicted on a real-time basis. Accordingly, the network bandwidth may be used efficiently and the customer's felt quality in a given network environment may be maximized. In particular, by controlling the resolution and bitrate of an image in real-time live streaming having a latency limitation in an optimal manner, the network bandwidth can be used efficiently.

By predicting an image quality by sharing the feature information of an image obtained during the downscaling process, efficient training of the AI model is available and H/W implementation complexity can be minimized and/or reduced.

The AI encoding and AI decoding processes according to an embodiment will be described with reference to drawings.

Figure 15:
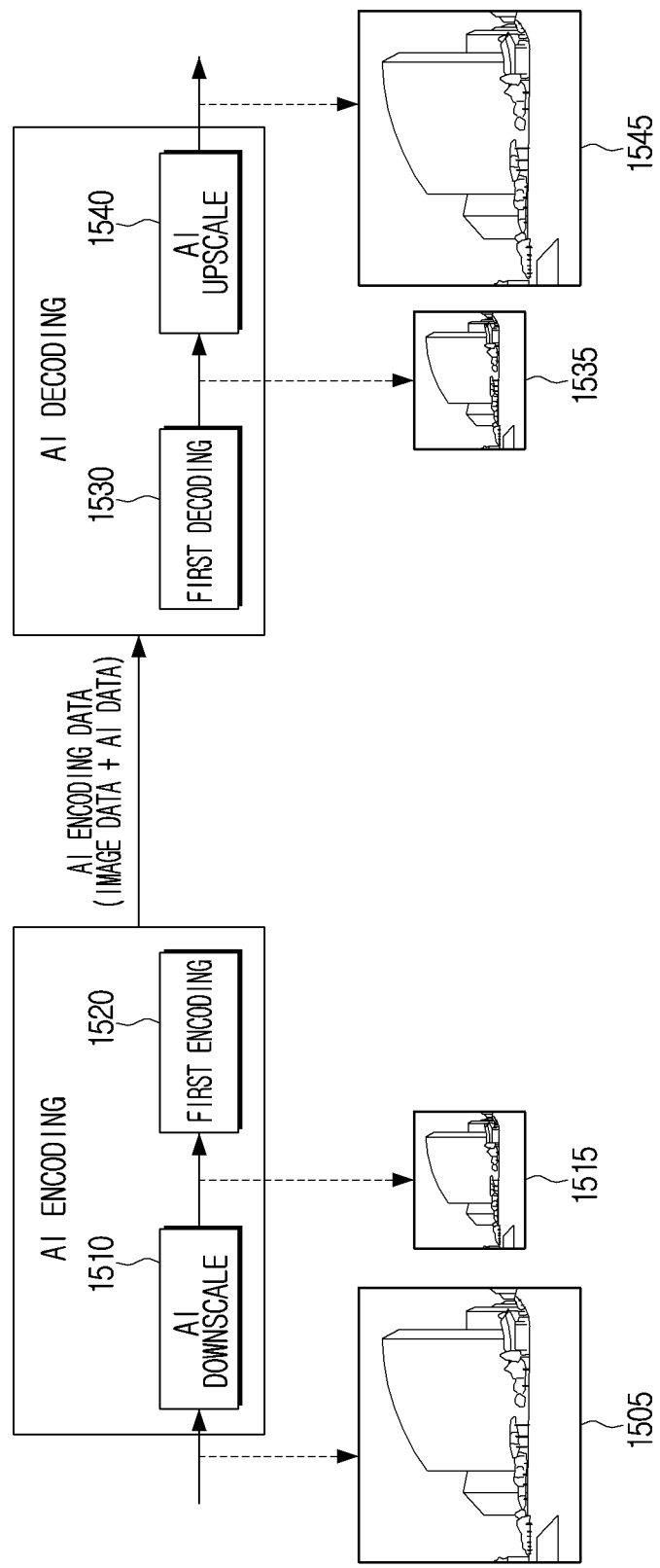
FIG. 15 is a diagram illustrating an example AI encoding process and an example AI decoding process according to an embodiment.

FIG. 15 is a diagram illustrating an example AI encoding process and an example AI decoding process according to an embodiment.

As described above, as the resolution of an image increases, information processing amount for encoding/decoding increases and a way to enhance encoding and decoding efficiency of an image is necessary.

As illustrated in FIG. 15, according to an embodiment, a first image 1515 may be obtained by AI-downscaling 1510 of an image 1505 having a high resolution. By performing first encoding 1520 and first decoding 1530 for the first image 1515 having a relatively smaller resolution, bitrate to be processed can be significantly reduced in comparison with performing first encoding 1520 and first decoding 1530 of the image 1505.

With reference to FIG. 15, in an embodiment, the first image 1515 is obtained by AI-downscaling 1510 of the image 1515 in the AI decoding process, and the first image 1515 is first encoded 1520. In the AI decoding process, the AI data obtained as a result of AI encoding and the AI encoding data including the image data is received, a second image 1535 is obtained through the first decoding 130, and a third image 1545 is obtained by AI-upscaling 1540 of the second image 1535.

Referring to the AI encoding process in greater detail, upon receiving the image 1505, the image 1505 is AI-downscaled 1510 to obtain a first image 1515 of a predetermined resolution or a predetermined image. AI-downscale 1510 is performed on an AI basis, where AI for AI-downscale 1510 should be trained jointly with AI for AI-upscaler 140 of second image 1535, since if AI for the AI-downscale 1510 and AI for the AI-upscale 1540 are separately trained, the difference between the image 1505 that is a target of the AI encoding and the third image 1545 reconstructed through the AI decoding is increased.

In an embodiment, in order to maintain the joint relation in the AI encoding process and the AI decoding process, AI data may be used. Therefore, the AI data obtained through the AI encoding process needs to include information indicating an upscale target, and in the AI decoding process, the second image 1535 needs to be AI-upscaled 1540 according to the upscale target identified based on the AI data.

The AI for AI-downscale 1510 and AI for AI-upscale 1540 may be implemented, for example, and without limitation, as DNN. As described below with reference to FIG. 23, since the first DNN and the second DNN are jointly trained through sharing of the loss information under a predetermined target, the AI encoding apparatus provides the target information used when the first DNN and the second DNN are jointly trained to the AI decoding apparatus, and the AI decoding apparatus may AI-upscale 1540 the second image 1535 with a targeting resolution based on the received target information.

When describing the first encoding 1520 and the first decoding 1530 (e.g., shown in FIG. 1) in greater detail, the first image 1515 which is AI-scaled from the image 1505 may have reduced information amount through the first encoding 1520. The first encoding 1520 may include generating prediction data by predicting the first image 1515, generating residual data corresponding to a difference between the first image 1515 and the prediction data, transforming the residual data, which is a spatial domain component, into a frequency domain component, quantizing the residual data transformed into the frequency domain component, entropy-encoding the quantized residual data, or the like. The first encoding process 1520 may be implemented through one of an image compression methods using frequency transformation such as, for example, and without limitation, MPEG-2, an H.264 AVC, MPEG-4, HEVC, VC-1, VP8, VP9, and AV1, or the like.

The second image 1535 corresponding to the first image 1515 may be reconstructed through the first decoding 1530 of the image data. The first decoding 1530 may include entropy-decoding the image data to generate quantized residual data, de-quantizing the quantized residual data, transforming the residual data of the frequency domain component into a spatial domain component, generating prediction data, and reconstructing the second image 1535 using the prediction data and the residual data, or the like. The first decoding 1530 may be implemented through an image reconstruction method corresponding to one of the image compression methods using frequency transformation such as, for example, and without limitation, MPEG-2, H.264, MPEG-4, HEVC, VC-1, VP8, VP9, AV1, or the like, used in the first encoding 1520.

The AI encoding data obtained through the AI encoding process may include the image data obtained as a result of the first encoding 1520 of the first image 1515 and the AI data related to the AI-downscale 1510 of the image 1505.

The image data may be transmitted in the form of a bitstream. The image data may include data obtained based on pixel values in the first image 1515, for example, residual data that is the difference between the first image 1515 and the prediction data of the first image 1515. In addition, the image data includes information used in the first encoding 1520 of the first image 1515. For example, the image data may include prediction mode information and the motion information used for the first encoding 1520 of the first image 1515, quantization parameter related information used in the first encoding 120, or the like. The image data may be generated according to a rule of an image compression method used in the first encoding 120, for example, a syntax, of an image compression method using a frequency transform such as, for example, and without limitation, MPEG-2 AVC, H.264 AVC, MPEG-4, HEVC, VC-1, VP8, VP9, AV1, or the like.

The AI data may be used for the AI-upscale 1540 based on the second DNN. As described above, the first DNN and the second DNN are jointly trained, and the AI data includes information that enables the correct AI-upscale 140 of the second image 1535 through the second DNN to be performed. In the AI decoding process, the second image 1535 may be AI-upscaled 1540 to a targeted resolution and/or quality based on the AI data.

The AI data may be transmitted in a bitstream format along with image data. Alternatively, according to an embodiment, the AI data may be transmitted in a frame or a packet, separate from image data. The image data and AI data obtained as a result of AI encoding may be transmitted through the same network or different networks.

Figure 16:
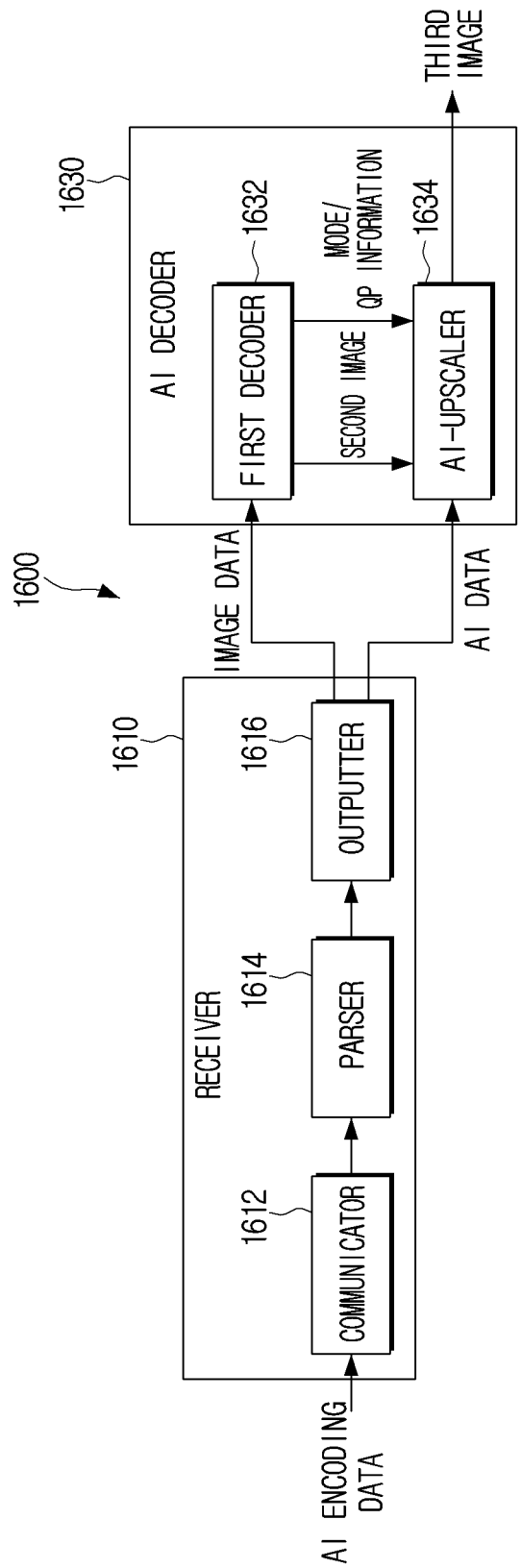
FIG. 16 is a block diagram illustrating an example configuration of an example AI decoding apparatus according to an embodiment.

FIG. 16 is a block diagram illustrating an example configuration of an example AI decoding apparatus 1600 according to an embodiment.

Referring to FIG. 16, an AI decoding apparatus 1600 according to an embodiment may include a receiver 1610 and an AI decoder 1630. The receiver 1610 may include a communicator (e.g., including communication circuitry) 1612, a parser (e.g., including processing circuitry and/or executable program elements) 1614, and an outputter (e.g., including output circuitry) 1616. The AI decoder 1630 may include a first decoder (e.g., including processing circuitry and/or executable program elements) 1632 and an AI-upscaler (e.g., including processing circuitry and/or executable program elements) 1634.

The receiver 1610 may include various receiving circuitry and receive and parse the AI encoding data obtained as a result of AI encoding, divide the image data and the AI data, and output the data to the AI decoder 1630.

For example, the communicator 1612 may include various communication circuitry and receives the AI decoding data obtained as a result of AI encoding through network. The AI encoding data obtained as a result of AI encoding includes image data and AI data. The image data and AI data may be received through the same network or different networks.

The parser 1614 may include various processing circuitry and/or executable program elements and parses the AI encoded data received through the communicator 1612 and divides the data into image data and AI data. For example, whether the data is image data or AI data is divided by reading a header of the data obtained from the communicator 1612. In one example, the parser 1614 divides the image data and the AI data through a header of the data received through the communicator 1612, transfers the divided image data to the outputter 1616, and the outputter 1616 (which may include various output circuitry) transfers the respective divided data to the first decoder 1632 and the AI-upscaler 1634. It may be determined that the image data included in the AI encoding data is image data obtained through a predetermined codec (for example, MPEG-2, H.264, MPEG-4, HEVC, VC-1, VP8, VP9, or AV1). In this example, the corresponding information can be transmitted to the first decoder 1632 through the outputter 1616 so that the image data can be processed with the identified codec.

In an embodiment, the AI encoding data parsed by the parser 1614 may be obtained from data storage medium including a magnetic media such as a hard disk, floppy disk, a magnetic tape, an optical recordable medium such as CD-ROM and DVD, magneto-optical medium such as a floptical disk, or the like.

The first decoder 1632 may include various processing circuitry and/or executable program elements and reconstructs the second image 1535 corresponding to the first image 1515 based on the image data. The second image 1535 obtained by the first decoder 1632 is provided to the AI-upscaler 1634. According to an embodiment, first decoding-related information such as prediction mode information, motion information, quantization parameter information, etc. included in the image data may be further provided to the AI-upscaler 1634.

The AI-upscaler 1634 receiving the AI data may include various processing circuitry and/or executable program elements and AI-upscales the second image 1535 based on the AI data. According to an embodiment, AI-upscale may be performed by further using information related to first encoding such as prediction mode information and quantization parameter information included in the image data, or the like.

The receiver 1610 and the AI decoder 1630 according to an embodiment are described as a separate apparatus, but can be implemented through a single processor. In this case, the receiver 1610 and the AI decoder 1630 may be implemented as a dedicated processor, and may be implemented through a combination of a general purpose processor such as, for example, and without limitation, an application processor (AP), a central processor (CPU), a graphics processor (GPU), and an S/W. Also, in the case of a dedicated processor, a dedicated processor can be implemented including a memory for implementing an embodiment, or a memory processor for using an external memory.

The receiver 1610 and the AI decoder 1630 may include a plurality of processors, may be implemented as the combination of dedicated processors, or implemented through the combination between a plurality of general-purpose processors such as AP, CPU, GPU and S/W. Similarly, the AI-upscaler 1634 and the first decoder 1632 may be implemented as different processors.

The AI data provided to the AI-upscaler 1634 includes information to AI-upscale the second image 1535. The upscale target should correspond to the downscale of the first DNN. Therefore, the AI data needs to include information for identifying the downscale target of the first DNN.

As an example of information included in the AI data, there are information on the difference between the resolution of the image 1505 and the resolution of the first image 1515, and information related to the first image 1515.

The difference information may, for example, be represented as information (for example, resolution transformation rate information) on the degree of resolution transformation of the first image 1515 relative to the image 1505. Since the resolution of the first image 1515 is known through the resolution of the reconstructed second image 1535, and the degree of resolution transformation can be confirmed through the known resolution, the difference information may be represented by only the resolution information of the image 1505. The resolution information may be expressed as a screen size in a horizontal/vertical direction, and may be expressed as a ratio (16:9, 4:3, or the like) and a size in one axis. In addition, the predetermined resolution information may be expressed in the form of an index or a flag.

The information related to the first image 1515 may include information on at least one of the bitrate of the image data obtained as a result of the first encoding of the first image 1515 and a codec type used for the first encoding of the first image 1515.

The AI-upscaler 1634 can determine an upscale target of the second image 1535 based on at least one of the difference information included in the AI data and the information related to the first image 1515. The upscale target may indicate, for example, whether to upscale the second image 1535 to which resolution. Once the upscale target has been determined, the AI-upscaler 1634 AI-upscales the second image 1535 via the second DNN to obtain a third image 1545 corresponding to the upscale target.

Prior to describing a method of AI-upscaling the second image 1535 to correspond to the upscale target by the AI-upscaler 1634, a process of AI-upscale through the second DNN will be described with reference to FIGS. 3 and 4.

Figure 17:
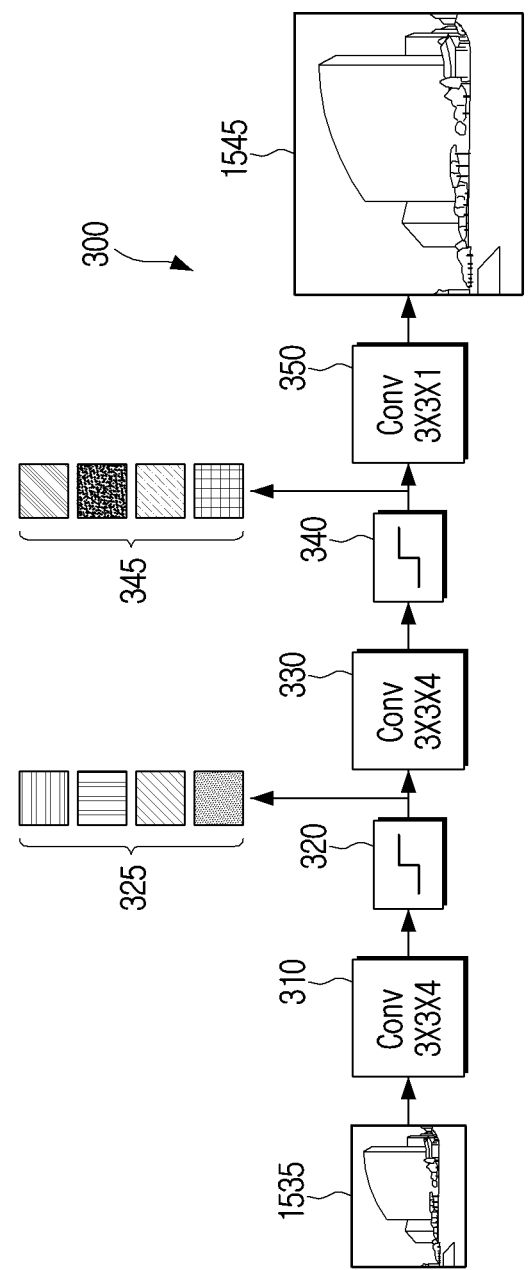
FIG. 17 is an diagram illustrating an example second deep neural network (DNN) for AI-upscaling according to an embodiment.
Figure 18:
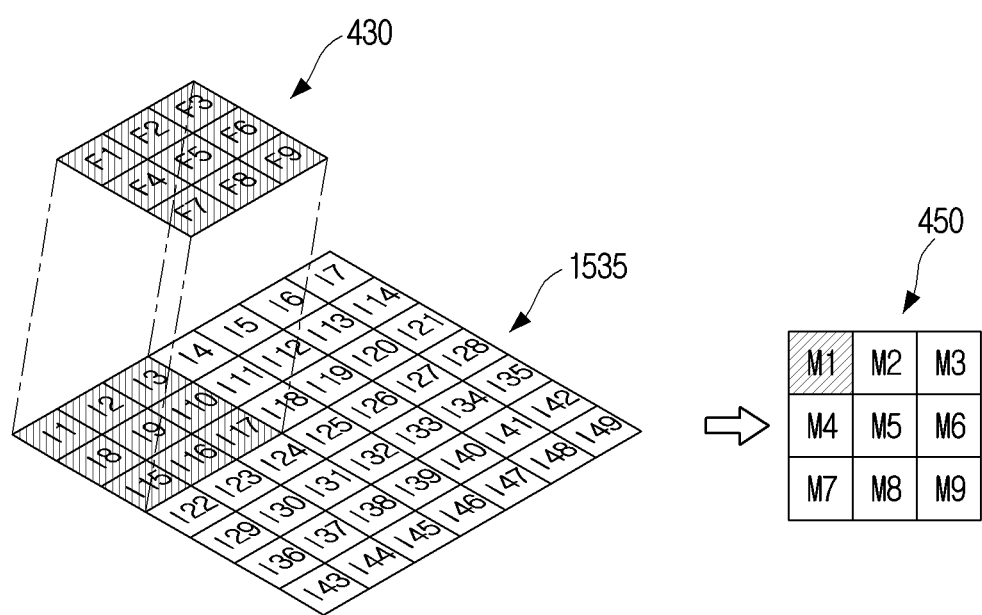
FIG. 18 is a diagram illustrating an example convolution operation by a convolution layer according to an embodiment.

FIG. 17 is a diagram illustrating a second DNN 300 for AI-upscaling of the second image 1535, and FIG. 18 illustrates an example convolution operation by a first convolution layer 310 illustrated in FIG. 17.

As shown in FIG. 17, the second image 1535 is input to a first convolutional layer 310. The 3×3×4 shown in the first convolutional layer 310 shown in FIG. 17 illustrates performing convolution processing on one input image using four filter kernels of the size of 3×3. As a result of convolution processing, four feature maps are generated by the four filter kernels. Each feature map represents the unique features of the second image 1535. For example, each feature map may indicate a vertical direction feature, a horizontal direction feature, or an edge feature of the second image 1535.

Referring to FIG. 18, a convolution operation in the first convolution layer 310 will be described in greater detail.

One feature map 450 may be generated through multiplication operation and adding operation between the parameters of the filter kernel 430 having a size of 3×3 used in the first convolutional layer 310 and the pixel values in the second image 1535 corresponding thereto. Since four filter kernels are used in the first convolutional layer 310, four feature maps can be generated through a convolution operation process using four filter kernels.

In FIG. 18, I1 to I49 displayed in the second image 1535 represent pixels of the second image 1535, and F1 to F9 displayed in the filter kernel 430 represent parameters of the filter kernel 430. M1 to M9 displayed in the feature map 450 represent samples of the feature map 450.

In FIG. 18, the second image 1535 includes 49 pixels, but this is merely an illustrative, non-limiting example, and when the second image 1535 has a resolution of 4K, for example, 3840×2160 pixels may be included.

In the convolution operation, multiplication operation between each of pixel values of I1, I2, I3, I8, I9, I10, I15, I16, I17 of the second image 1535 and each of F1, F2, F3, F4, F5, F6, F7, F8, and F9 of the filter kernel 430, respectively, may be performed, and a value of combining (for example, adding operation) of the result values of multiplication operation may be assigned as a value of M1 of the feature map 450. If the stride of the convolution operation is 2, multiplication operation of each of pixel values of I3, I4, I5, I10, I11, I12, I17, I18, and I19 of the second image 1535 and each of F1, F2, F3, F4, F5, F6, F7, F8, and F9 of the filter kernel 430 may be performed, and a value combining the result values of the multiplication may be assigned to the value of M2 of the feature map 450.

While the filter kernel 430 moves along the stride until arriving the last pixel of the second image 1535, convolution operation may be performed between the pixel values of the second image 1535 and the parameters of the filter kernel 430, and the feature map 450 having a predetermined size may be obtained.

According to an embodiment, through joint training of the first DNN and the second DNN, parameters of the second DNN, for example, parameters of a filter kernel used in convolutional layers of the second DNN (for example, the values of F1, F2, F3, F4, F5, F6, F7, F8, and F9 of the filter kernel 430) may be optimized. As described above, the AI-upscaler 1634 may determine an upscale target corresponding to the downscale target of the first DNN based on the AI data, and determine the parameters corresponding to the determined upscale target as the parameters of the filter kernel used in the convolutional layers of the second DNN.

The convolution layers included in the first DNN and the second DNN may perform processing according to the convolution operation process described with reference to FIG. 4, but the convolution operation process of FIG. 4 is only an example, and is not limited thereto.

Referring to FIG. 17, the feature maps output from the first convolutional layer 310 are input to the first activation layer 320. The first activation layer 320 may assign non-linear features with respect to each feature map. The first activation layer 320 may include, but is not limited to, a sigmoid function, a Tanh mathematical function, a ReLU function, or the like, but is not limited thereto.

Assigning non-linear features in the first activation layer 320 represents changing some sample values of the feature map and outputting the same, which tare the output of the first convolution layer 310. The changing is performed by applying the non-linear feature.

The first activation layer 320 determines whether to pass the sample values of the feature maps output from the first convolutional layer 310 to the second convolutional layer 330. For example, some of the sample values of the feature maps are activated by the first activation layer 320 and passed to the second convolutional layer 330, and some sample values are deactivated by the first activation layer 320 and not passed to the second convolutional layer 330. The intrinsic feature of the second image 1535 represented by the feature maps is highlighted by the first activation layer 320.

The feature maps 325 output from the first activation layer 320 are input to the second convolutional layer 330. One of the feature maps 325 illustrated in FIG. 3 is a result obtained by processing the feature map 450 in the first activation layer 320 relative to FIG. 4.

The 3×3×4 indicated in the second convolutional layer 330 illustrates convolution processing for the input feature maps 325 using four filter kernels of the size of 3×3. The output of the second convolutional layer 330 is input to the second activation layer 340. The second activation layer 340 may impart non-linear features to the input data.

The feature maps 345 output from the second activation layer 340 are input to a third convolutional layer 350. The 3×3×1 shown in the third convolutional layer 350 shown in FIG. 17 illustrates performing convolution processing to make one output image using one filter kernel of the size of 3×3. The third convolutional layer 350 generates one output using one filter kernel as a layer for outputting the final image. According to an example, the third convolutional layer 350 may output the third image 1545 via a convolution operation result.

The DNN configuration information indicative of the number of filter kernels in the first convolutional layer 310, the second convolutional layer 330 and the third convolutional layer 350 of the second DNN 300, the parameters of the filter kernel, etc., may be in plural as described below, but the plurality of DNN configuration information should be associated with a plurality of DNN configuration information of the first DNN. The association between the plurality of DNN configuration information of the second DNN and the plurality of DNN configuration information of the first DNN can be implemented through joint training of the first DNN and the second DNN.

Although FIG. 17 illustrates that the second DNN 300 includes three convolutional layers 310, 330, 350 and two activation layers 320, 340, but this is only one example, and depending on the embodiments, the number of convolutional layers and activation layers may vary in a wide manner. Further, according to an embodiment, the second DNN 300 may be implemented via RNN. In this example, the CNN structure of the second DNN 300 is changed to the RNN structure according to an embodiment.

In an example embodiment, the AI-upscaler 1634 can include at least one arithmetic logic unit (ALU) for operation of the convolution operation and activation layer described above. The ALU algorithm may be implemented with a processor. For a convolution operation, the ALU may include a multiplier that performs a multiplication operation between the sample values of the filter kernel and the sample values of the feature map output from the second image 1535 or the previous layer and an adder that adds the result values of the multiplication. For operation of the activation layer, the ALU may include a multiplier for multiplying the input sample value by a weight used in a predetermined sigmoid function, a Tanh function, or a ReLU function, and a comparator for comparing the multiplied result with a predetermined value to determine whether to deliver the input sample value to the next layer.

Hereinbelow, a method of AI-upscaling the second image 1535 by the AI-upscaler 1634 to correspond to the upscale target will be described.

In an embodiment, the AI-upscaler 1634 may store a plurality of DNN configuration information that may be set in the second DNN.

The DNN configuration information may include information on at least one of the number of convolutional layers included in the second DNN, the number of filter kernels for each convolutional layer, and the parameters of each filter kernel. The plurality of DNN configuration information may correspond to various upscale targets, respectively, and the second DNN may operate based on DNN configuration information corresponding to a specific upscale target. According to the DNN configuration information, the second DNN may have a different structure. For example, the second DNN may include three convolutional layers according to any DNN configuration information, and the second DNN may include four convolutional layers according to other DNN configuration information.

In an embodiment, the DNN configuration information may include only a parameter of a filter kernel used for second DNN. A structure of the second DNN may not change, and instead, only a parameter of an internal filter kernel may change according to DNN configuration information.

The AI-upscaler 1634 may obtain DNN configuration information for AI-upscaling of the second image 1535 among a plurality of DNN configuration information. Each of the plurality of DNN configuration information is for obtaining a third image 1545 of a predetermined resolution and/or predetermined quality and is trained jointly with the first DNN.

For example, any one of the plurality of DNN configuration information may include information to obtain the third image 1545 of 4K (4096*2160) having a resolution which is higher by two times than the second image 1535 of 2K (2048*1080), and another DNN configuration information may include information to obtain the third image 1545 of 8K (8192*4320) having a resolution which is higher by four times than the second image 1535 of 2K (2048*1080).

Each of the plurality of DNN configuration information is generated in association with the DNN configuration information of the first DNN of the AI encoding apparatus 600, and the AI-upscaler 1634 obtains one DNN configuration information among a plurality of DNN configuration information according to an enlargement ratio corresponding to the reduction ratio of the DNN configuration information of the first DNN. To this end, the AI-upscaler 1634 should check the information of the first DNN. In order for the AI-upscaler 1634 to check the information of the first DNN, the AI decoding apparatus 1600 according to an embodiment receives AI data including the information of the first DNN from the AI encoding apparatus 600.

In other words, the AI-upscaler 1634 may identify the information targeted by the DNN configuration information of the first DNN used to obtain the first image 1515 using information received from the AI encoding apparatus 600, and obtain the DNN configuration information of the second DNN which is jointly trained.

When the DNN configuration information or AI-upscaling of the second image 1535 is obtained among a plurality of DNN configuration information, input data may be processed based on the second DNN which operates according to the obtained DNN configuration information.

For example, if one DNN configuration information is obtained, for each of the first convolutional layer 310, the second convolutional layer 330, and the third convolutional layer 350 of the second DNN 300 shown in FIG. 17, the number of filter kernels included in each layer and the parameters of the filter kernel are set to values included in the obtained DNN configuration information.

For example, if the parameters of 3×3 filter kernels used in any one of convolution layer of the second DNN illustrated in FIG. 4 are set to {1, 1, 1, 1, 1, 1, 1, 1, 1}, and then DNN configuration information is changed, the parameters may be replaced with {2, 2, 2, 2, 2, 2, 2, 2, 2} included in the changed DNN configuration information.

The AI-upscaler 1634 may obtain DNN configuration information to upscale the second image 1535 among a plurality of DNN configuration information based on information included in the AI data. The AI data used for obtaining the DNN configuration information will be described in greater detail.

In an embodiment, the AI-upscaler 1634 may obtain DNN configuration information for upscaling the second image 1535 of the plurality of DNN configuration information based on the difference information included in the AI data. For example, based on the difference information, if it is identified that the resolution of the image 1505 (e.g., 4K (4096*2160)) is two times higher than the resolution of the first image 1515 (e.g., 2K (2048*1080)), the AI-upscaler 1634 may acquire DNN configuration information that may increase the resolution of the second image 1535 by two times.

In another embodiment, the AI-upscaler 1634 may obtain DNN configuration information for AI-upscaling of the second image 1535 of the plurality of DNN configuration information based on information related to the first image 1515 included in the AI data. The AI-upscaler 1634 can pre-determine a mapping relationship between image-related information and DNN configuration information, and obtain DNN configuration information mapped to information related to the first image 1515.

FIG. 19 is a diagram illustrating an example mapping relation between various image-related information and DNN configuration information.

Referring to an example of FIG. 19, it can be seen that the AI encoding/AI decoding process does not consider changes in resolution only. As illustrated in FIG. 19, selection of DNN configuration information can be made by taking into account both the resolution, such as SD, HD, full HD, bitrate such as 10 Mbps, 15 Mbps, 20 Mbps, and codec information such as AV1, H.264, HEVC, respectively. For this consideration, training in consideration of each of the elements in the AI training process must be performed jointly with the encoding and decoding process (see FIG. 23).

According to a content of training, when the plurality of DNN configuration information is provided based on image-related information including a codec type, a resolution of an image, or the like, as illustrated in FIG. 19, the DNN configuration information for AI-upscaling of the second image 1535 may be obtained based on the information on the first image 1515 received in the AI decoding process.

The AI-upscaler 1634 matches the image-related information illustrated in the left side and the DNN configuration information of the right side of FIG. 19 and the DNN configuration information according to image-related information may be used.

As illustrated in FIG. 19, if it is identified that the resolution of the first image 1515 is SD, bitrate of the image data obtained as the first encoding of the first image 1515 is 10 Mbps, and the first image 1515 is first encoded by the AV1 codec, the AI-upscaler 1634 may use A DNN configuration information among a plurality of DNN configuration information.

If it is identified that the resolution of the first image 1515 from the information related to the first image 1515 is HD, the bitrate of the image data obtained as the first encoding result is 15 Mbps, and the first image 1515 is first-encoded by the H.264 codec, the AI-upscaler 1634 may use B DNN configuration information among the plurality of DNN configuration information.

In addition, if it is identified that the resolution of the first image 1515 is Full HD, the bit rate of the image data obtained as a result of the first encoding of the first image 1515 is 20 Mbps, and the first image 1515 is first-encoded by the HEVC codec from the first image 1515 related information, the AI upscaler 1634 may use C DNN configuration information among the plurality of DNN configuration information, and if it is identified that the resolution of the first image 1515 is Full HD, the bitrate obtained as a result of the first encoding of the first image 1515 is 15 Mbps, and the first image 1515 is first-encoded by the HEVC codec, the AI-upscaler 1634 may use D DNN configuration information among the plurality of DNN configuration information. One of the C DNN configuration information and the D DNN configuration information is selected according to whether the bit rate of the image data obtained as a result of the first encoding of the first image 1515 is 20 Mbps or 15 Mbps. When the first image 1515 having the same resolution is first encoded by the same codec, the bit rates of the image data being different from each other may refer, for example, to the image quality of the restored image being different from each other. Accordingly, the first DNN and the second DNN may be jointly trained based on a predetermined image quality, and accordingly, the AI-upscaler 1634 may obtain the DNN configuration information according to the bit rate of the image data indicating the image quality of the second image 1535.

In another embodiment, the AI-upscaler 1634 may obtain DNN configuration information for AI-upscaling the second image 1535 of the plurality of DNN configuration information in consideration of the information (prediction mode information, motion information, quantization parameter information, etc.) provided from the first decoder 1632 and the first image 1515 related information included in the AI data. For example, the AI-upscaler 1634 may receive the quantization parameter information used in the first encoding process of the first image 1515 from the first decoder 1632, identify a bitrate of the image data obtained as a result of the encoding of the first image 1515 from the AI data, and obtain DNN configuration information corresponding to the quantization parameter and the bitrate. The same bit rate may have different image quality of the reconstructed image according to the complexity of the image, and the bitrate of each frame may be different in the first image 1515 as a value representing the entire first image 1515 in which the first encoded image 1515 is encoded. Therefore, considering the prediction mode information, the motion information, and/or the quantization parameter, which can be obtained for each frame from the first decoder 1632, the DNN configuration information suitable for the second image 1535 can be obtained in comparison to using only the AI data.

In addition, according to an embodiment, the AI data may include an identifier of the mutually agreed DNN configuration information. The identifier of the DNN configuration information is information for identifying a pair of jointly-trained DNN configuration information between the first DNN and the second DNN so that the second image 1535 is AI-upscaled to an upscale target corresponding to the downscale target of the first DNN. After obtaining the identifier of the DNN configuration information included in the AI data, the AI-upscaler 1634 may use the DNN configuration information corresponding to the identifier of the DNN configuration information to AI-upscale the second image 1535. For example, an identifier indicating each of the plurality of DNN configuration information configurable in the first DNN and an identifier indicating each of the plurality of DNN configuration information configurable in the second DNN may be predetermined. In this case, the same identifier may be specified for each pair of DNN configuration information that is configurable for each of the first DNN and the second DNN. The AI data may include an identifier of the DNN configuration information set in the first DNN for the AI-downscale of the image 1505. The AI-upscaler 1634, which receives the AI data, can AI-upscale the second image 1535 using the DNN configuration information indicated by the identifier included in the AI data of the plurality of DNN configuration information.

According to an embodiment, the AI data may include the DNN configuration information. The AI-upscaler 1634 may obtain the DNN configuration information included in the AI data and then AI-upscale the second image 1535 using the corresponding DNN configuration information.

According to an implementation, if the information of the DNN configuration information (e.g., the number of convolutional layers, the number of filter kernels for each convolutional layer, the parameters of each filter kernel, etc.) is stored in the form of a look-up table, the AI-upscaler 1634 may combine the selected portion of the lookup table values based on the information included in the AI data to obtain DNN configuration information and use the obtained DNN configuration information to AI-upscale the second image 1535.

According to an embodiment, when the DNN structure corresponding to the upscale target is determined, the AI-upscaler 1634 may obtain the DNN configuration information corresponding to the determined DNN structure, for example, parameters of the filter kernel.

The AI-upscaler 1634 obtains the DNN configuration information of the second DNN through the AI data including the information related to the first DNN, and AI-upscales the second image 1535 through the second DNN set with the obtained DNN configuration information, which can reduce the amount of memory usage and the amount of computation compared to the upscaling by directly analyzing the features of the second image 1535.

In an embodiment, when the second image 1535 includes a plurality of frames, the AI-upscaler 1634 may obtain DNN configuration information independently by frames of the predetermined number, or obtain the common DNN configuration information for an entire frame.

Figure 20:
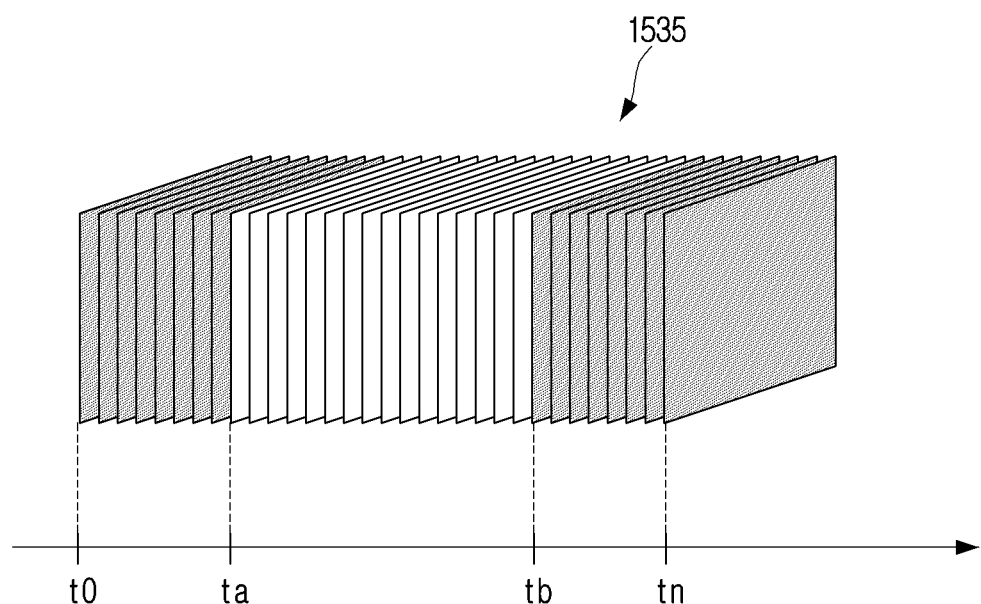
FIG. 20 is a diagram illustrating an example second image including a plurality of frames according to an embodiment.

FIG. 20 is a diagram illustrating the second image 1535 including a plurality of frames.

As illustrated in FIG. 20, the second image 1535 may include frames corresponding to t0 to tn.

In an example, the AI-upscaler 1634 may obtain the DNN configuration information of the second DNN bot via the AI data and AI-upscale the frames corresponding to t0 through tn based on the obtained DNN configuration information. That is, frames corresponding to t0 through tn may be AI-upscaled based on the common DNN configuration information.

In another example, the AI-upscaler 1634 may AI-upscale some frames, for example, frames corresponding to t0 to ta, among frames corresponding to t0 to tn with "A" DNN configuration information obtained from AI data, and AI-upscale the frames corresponding to ta+1 to tb with "B" DNN configuration obtained from the AI data. The AI-upscaler 1634 can AI-upscale the frames corresponding to tb+1 to tn with "C" DNN configuration information for each group including a predetermined number of frames. In other words, the AI-upscaler 1634 may independently obtain DNN configuration information for each group that includes a predetermined number of frames of the plurality of frames, and may AI-upscale the frames included in each of the groups as the DNN configuration information obtained independently.

In another embodiment, the AI upscaler 1634 may independently obtain DNN configuration information for each frame of the second image 1535. That is, when the second image 1535 includes three frames, the AI upscaler 1634 may AI-upscale the first frame with the DNN configuration information acquired with respect to the first frame, AI-upscale the second frame with the DNN configuration information obtained in relation to the second frame, and AI-upscale the third frame with the DNN configuration information acquired in relation to the third frame. The DNN configuration information may be independently obtained by each frame of the second image 1535 based on the information (prediction mode information, motion information, quantization parameter information, etc.) provided from the first decoder 1632 and related information of the first image 1515 included in the AI data, according to a way to obtain the DNN configuration information, since the mode information, the quantization parameter information, or the like, may be independently determined for each frame of the second image 1535.

In still another example, the AI data may include information indicating until which frame the DNN configuration information obtained based on the AI data is valid. For example, if information that the DNN configuration information is valid up to the ta frame is included in the AI data, the AI-upscaler 1634 may AI-upscale the t0 to ta frames with the DNN configuration information obtained based on the AI data. If the information that the DNN configuration information is valid until the tn frame is included in the other AI data, the AI-upscaler 1634 may AI-upscale the ta+1 to tn frames based on the DNN configuration information obtained based on the other AI data.

Figure 21:
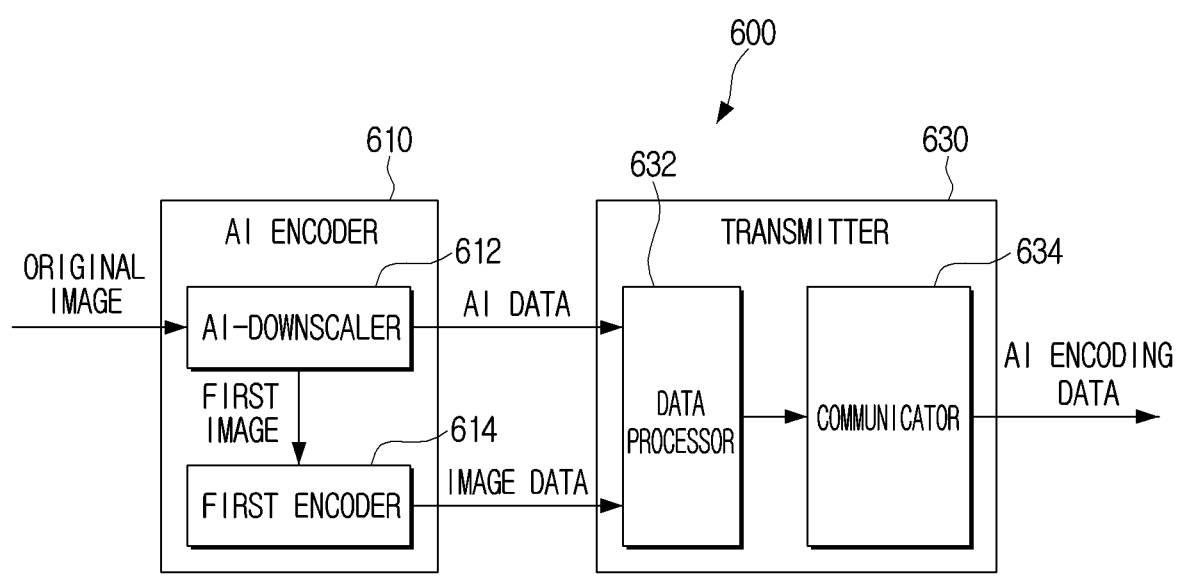
FIG. 21 is a block diagram illustrating an example configuration of the AI encoding apparatus according to an embodiment.

Referring to FIG. 21, the AI encoder 600 for AI encoding of the image 1505 will be described.

FIG. 21 is a block diagram illustrating an example configuration of the AI encoding apparatus 600 according to an embodiment.

Referring to FIG. 21, the AI encoding apparatus 600 may include an AI encoder (e.g., including processing circuitry and/or executable program elements) 610 and a transmitter (e.g., including transmitting circuitry) 630. The AI encoder 610 may include an AI-downscaler (e.g., including processing circuitry and/or executable program elements) 612 and a first encoder (e.g., including processing circuitry and/or executable program elements) 614. The transmitter 630 may include a data processor (e.g., including processing circuitry and/or executable program elements) 632 and a communicator (e.g., including communication circuitry) 634.

Figure 7:
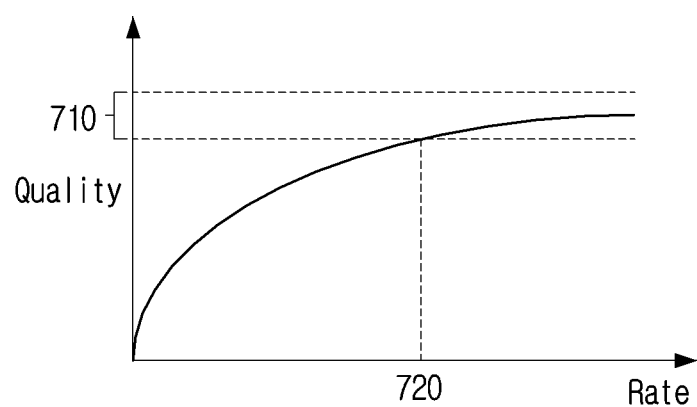
FIG. 7 is a graph illustrating an example learning method of a second artificial intelligence model according to an embodiment.

Although FIG. 7 illustrates the AI encoder 610 and the transmitter 630 as separate devices, the AI encoder 610 and the transmitter 630 can be implemented through a single processor. In this case, a dedicated processor may be implemented or the combination of a general-purpose processor such as AP, CPU, or GPU and S/W may be implemented. Also, in the case of a dedicated processor, a dedicated processor can be implemented including a memory for implementing an embodiment, or a memory processor for using an external memory.

The AI encoder 610 and the transmitter 630 may be comprised of a plurality of processors. In this case, a combination of dedicated processors may be implemented, or the combination of a plurality of general-purpose processor such as AP, CPU, or GPU and the S/W may be implemented. The AI-downscaler 612 and the first encoder 614 may also be implemented with different processors.

The AI encoder 610 may include various processing circuitry and/or executable program elements and performs AI-downscale of the image 1505 and the first encoding of the first image 1515 and transmits the AI data and the image data to the transmitter 630.

The image data includes data obtained as a result of the first encoding of the first image 1515. The image data may include data obtained based on pixel values in the first image 1515, for example, residual data that is the difference between the first image 1515 and the prediction data of the first image 1515. The image data includes information used in the first encoding process of the first image 1515. For example, the image data may include prediction mode information used to first encode the first image 1515, motion information, and quantization parameter related information used to first encode the first image 1515.

The AI data includes information that enables the AI-upscaler 1634 to AI-upscale the second image 1535 to the upscale target corresponding to the downscale target of the first DNN. In one example, the AI data may include difference information between the image 1505 and the first image 1515. The AI data may also include information related to the first image 1515. The information related to the first image 1515 may include information on at least one of a resolution of the first image 1515, a bitrate of the image data obtained as a result of the first encoding of the first image 1515, or a codec type used in the first encoding of the first image 1515.

In an embodiment, the AI data may include an identifier of the DNN configuration information that is mutually agreed-upon, so that the second image 1535 is AI-upscaled to the upscale target corresponding to the downscale of the first DNN.

In an embodiment, the AI data may include the DNN configuration information that can be set to the second DNN.

The AI-downscaler 612 may include various processing circuitry and/or executable program elements and obtain the first image 1515 which is AI-downscaled from the image 1515 through the first DNN. The AI-downscaler 612 may determine a downscale target of the image 1505 based on a predetermined criterion.

For acquisition of the first image 1515 that corresponds to the downscale target, the AI-downscaler 612 may store a plurality of DNN configuration information settable to the first DNN. The AI-downscaler 612 may obtain DNN configuration information corresponding to the downscale target among the plurality of DNN configuration information, and AI-downscale the image 1505 through the first DNN set with the obtained DNN configuration information.

Each of the plurality of DNN configuration information may be trained to obtain a predetermined resolution and/or a predetermined image of the first image 1515. For example, any one of the plurality of DNN configuration information may include information to acquire the first image 1515 having a resolution which is ½ times smaller than the image 1505, for example, the first image 1515 of 2K (2048*1080) which is ½ times smaller than the image 1505 of 4K (2096*2160), and the other DNN configuration information may include information on the first image 1515 having a resolution which is ¼ times lower than the image 1505, for example, the first image 1515 of 2K (2048*1080) which is ¼ times lower than the image 1505 of 8K (8192*4320).

According to an embodiment, if the information included in the DNN configuration information (e.g., the number of convolutional layers, the number of filter kernels for each convolutional layer, the parameters of each filter kernel, etc.) is stored in the form of a look-up table, the AI-downscaler 612 may combine the selected portion of the look-up table values according to the downscale target to obtain DNN configuration information and may AI-downscale the image 1505 using the obtained DNN configuration information.

According to an embodiment, the AI-downscaler 612 may determine the structure of DNN corresponding to the downscale target and obtain the DNN configuration information corresponding to the determined structure of DNN, for example, parameters of the filter kernel.

The plurality of DNN configuration information for AI-downscaling of the image 1505 may have an optimized value through joint training of the first DNN and the second DNN. Each DNN configuration information includes at least one of the number of convolutional layers included in the first DNN, the number of filter kernels by convolutional layers, or parameters of each filter kernel.

The AI-downscaler 612 may set the first DNN with the DNN configuration information determined for the AI-downscaling of the image 1505 to obtain a predetermined resolution and/or a predetermined image quality of the first image 1515 via the first DNN. When the DNN configuration information for the AI-downscaling of the image 1505 among the plurality of DNN configuration information is obtained, each layer in the first DNN can process the input data based on the information included in the DNN configuration information.

A method of determining the downscale target by the AI-downscaler 612 will be described below. The downscale target may indicate the first image 1515 having how much reduced resolution from the image 1505 needs to be obtained.

In an embodiment, the AI-downscaler 612 may determine the downscale target based on at least one of compression rate (for example, difference of resolution between the image 1505 and the first image 1515, target bitrate), compression quality (for example, bitrate type), compression history information, or a type of the image 1505.

In an example, the AI-downscaler 612 may determine the downscale target based on the preset compression rate or compression quality input from a user.

As another example, the AI-downscaler 612 may determine a downscale target using compression history information stored in the AI encoding apparatus 600. For example, according to the compression history information available to the AI encoding apparatus 600, a user's preferred encoding quality or compression rate may be determined, and the downscale target may be determined according to the encoding quality determined based on the compression history information. For example, the resolution, image quality, or the like, of the first image 1515 may be determined according to the encoding quality which has been most used according to the compression history information.

As a still another example, the AI-downscaler 612 may determine the downscale target based on the encoding quality (for example, average quality of encoding quality which has been used more than a predetermined threshold value) which has been used more than a predetermined threshold value according to the compression history information.

As a still another example, the AI-downscaler 612 may determine the downscale target based on the resolution, type (for example, a file format), or the like, of the image 1505.

In an embodiment, when the image 1505 includes a plurality of frames, the AI-downscaler 612 may independently determine the downscale target by frames of the predetermined number or determine common downscale targets for an entire frame.

In an example, the AI-downscaler 612 may divide the frames of the image 1505 into a predetermined number of groups, and independently determine the downscale target for each group. Same or different downscale targets may be determined for each group. The number of frames included in groups may be the same or different for each group.

In another example, the AI-downscaler 612 may independently determine the downscale target by frames of the image 1505. For each frame, same or different downscale targets may be determined.

Hereinbelow, an example structure of a first DNN 700 which is an example basis for AI-downscaling will be described.

Figure 22:
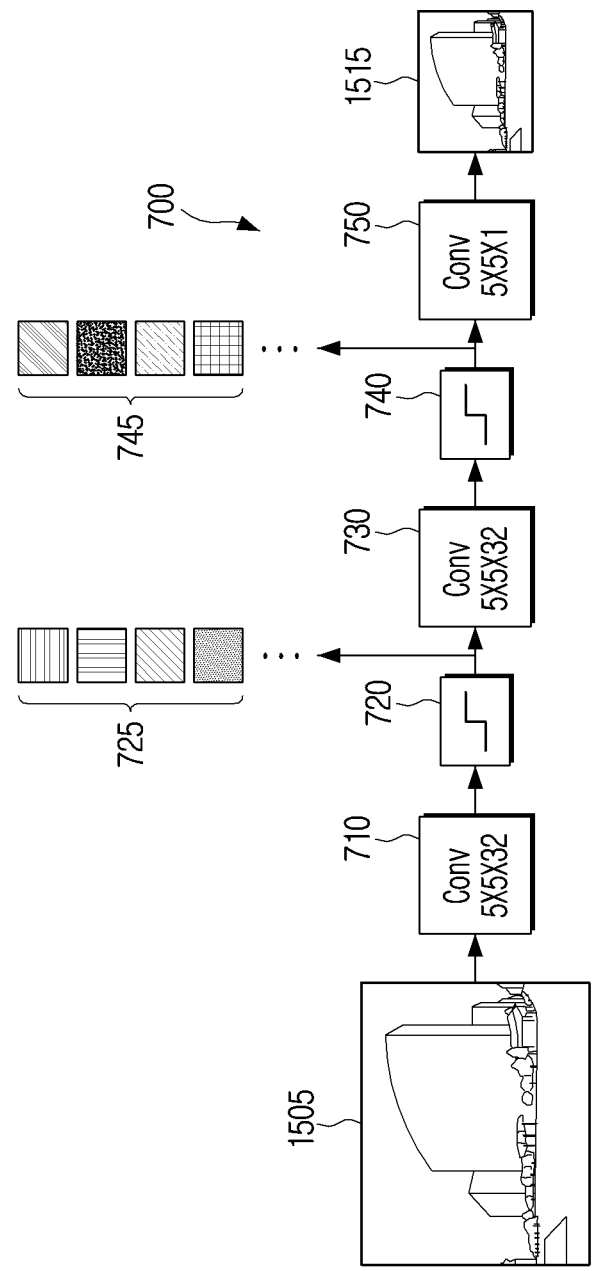
FIG. 22 is an diagram illustrating the first DNN for AI-downscaling of an image according to an embodiment.

FIG. 22 is a diagram illustrating the first example DNN 700 for AI-downscaling of an image according to an embodiment.

As shown in FIG. 22, the image 1505 is input to a first convolutional layer 710. The first convolutional layer 710 performs convolution processing on the image 1505 using 32 filter kernels of a size of 5×5. The 32 feature maps generated as a result of the convolution process are input to a first activation layer 720. The first activation layer 720 may assign non-linear feature to the 32 feature maps.

The first activation layer 720 determines whether to pass the sample values of the feature maps output from the first convolutional layer 710 to a second convolutional layer 730. For example, some of the sample values of the feature maps are activated by the first activation layer 720 and passed to the second convolutional layer 730, and some sample values are deactivated by the first activation layer 720 and not passed to the second convolutional layer 730. The information represented by the feature maps output from the first convolutional layer 710 is highlighted by the first activation layer 720.

An output 725 of the first activation layer 720 is input to the second convolutional layer 730. The second convolutional layer 730 performs convolution processing on the input data using 32 filter kernels of a size of 5×5. The 32 feature maps generated as a result of the convolution process are input to the second activation layer 740, and the second activation layer 740 may assign non-linear feature to the 32 feature maps.

The output 745 of the second activation layer 740 is input to a third convolutional layer 750. The third convolutional layer 750 performs convolution processing on the input data using one filter kernel having a size of 5×5. As a result of the convolution process, one image can be output from the third convolutional layer 750. The third convolutional layer 750 is a layer for outputting a final image and obtains one output using one filter kernel. According to an example, the third convolutional layer 750 may output the first image 1515 via a convolution operation result.

The DNN configuration information representing the number of filter kernels in the first convolutional layer 710, the second convolutional layer 730, and the third convolutional layer 750, the parameters of the filter kernel, etc., of the first DNN 700 may be plural, wherein the plurality of DNN configuration information should be in association with a plurality of DNN configuration information of the second DNN. The association between the plurality of DNN configuration information of the first DNN and the plurality of DNN configuration information of the second DNN can be implemented through joint-training of the first DNN and the second DNN.

FIG. 22 illustrates that the first DNN 700 includes three convolutional layers 710, 730, 750 and two activation layers 720, 740, but this is only one example, and in accordance with an embodiment, the number of convolutional layers and activation layers may vary widely. Further, according to an embodiment, the first DNN 700 may be implemented via the RNN. This case may refer, for example, to the CNN structure of the first DNN 700 being changed to the RNN according to an example.

In an example embodiment, AI-downscaler 612 may include at least one ALU for convolution operation and operation an activation layer. The ALU may be implemented with a processor. For convolution operation, the ALU may include a multiplier to perform the multiplication operation between the sample values of the filter kernel and the sample values of the feature map output from the image 1505 or the previous layer and an adder that adds the result values of the multiplication. In addition, for the operation of the activation layer, the ALU may include a multiplier for multiplying the input sample value by a weight used in a predetermined sigmoid function, a Tanh function, or a ReLU function, and a comparator for comparing the multiplied result with a predetermined value to determine whether to deliver the input sample value to the next layer.

Referring back to FIG. 22, the first encoder 614 which receives the first image 1515 from the AI-downscaler 612 may first-encode the first image 1515 to reduce the amount of information which the first image 1515 has. As a result of the first encoding by the first encoder 614, image data corresponding to the first image 1515 may be obtained.

The data processor 632 may include various processing circuitry and/or executable program elements and performs processing so that at least one of the AI data or the image data can be transmitted in a predetermined format. For example, if the AI data and the image data are to be transmitted in the form of a bitstream, the data processor 632 processes the AI data so that the AI data is represented in the form of a bitstream, and transmits the AI data and the image data in the form of one bitstream through the communicator 634. As another example, the data processor 632 processes the AI data so that the AI data is represented in the form of a bitstream, and transmits each of the bitstream corresponding to the AI data and the bitstream corresponding to the image data through the communicator 634. As another example, the data processor 632 processes the AI data so that the AI data is represented as a frame or a packet, and transmits image data in the form of a bitstream and AI data in the form of a frame or a packet through the communicator 634.

The transmitter 630 may include various circuitry and transmits the AI encoding data obtained as a result of AI encoding through network. The AI encoding data obtained as a result of AI encoding includes image data and AI data. The image data and AI data may be transmitted through the same network or different networks.

In an embodiment, the AI encoding data obtained as a result of processing by the data processor 632 may be stored in a data storage medium including a magnetic media such as a hard disk, floppy disk, a magnetic tape, an optical recordable medium such as CD-ROM and DVD, magneto-optical medium such as a floptical disk, or the like.

Hereinbelow, a method of joint-training of the first DNN 700 and the second DNN 300 will be described with reference to FIG. 23.

Figure 23:
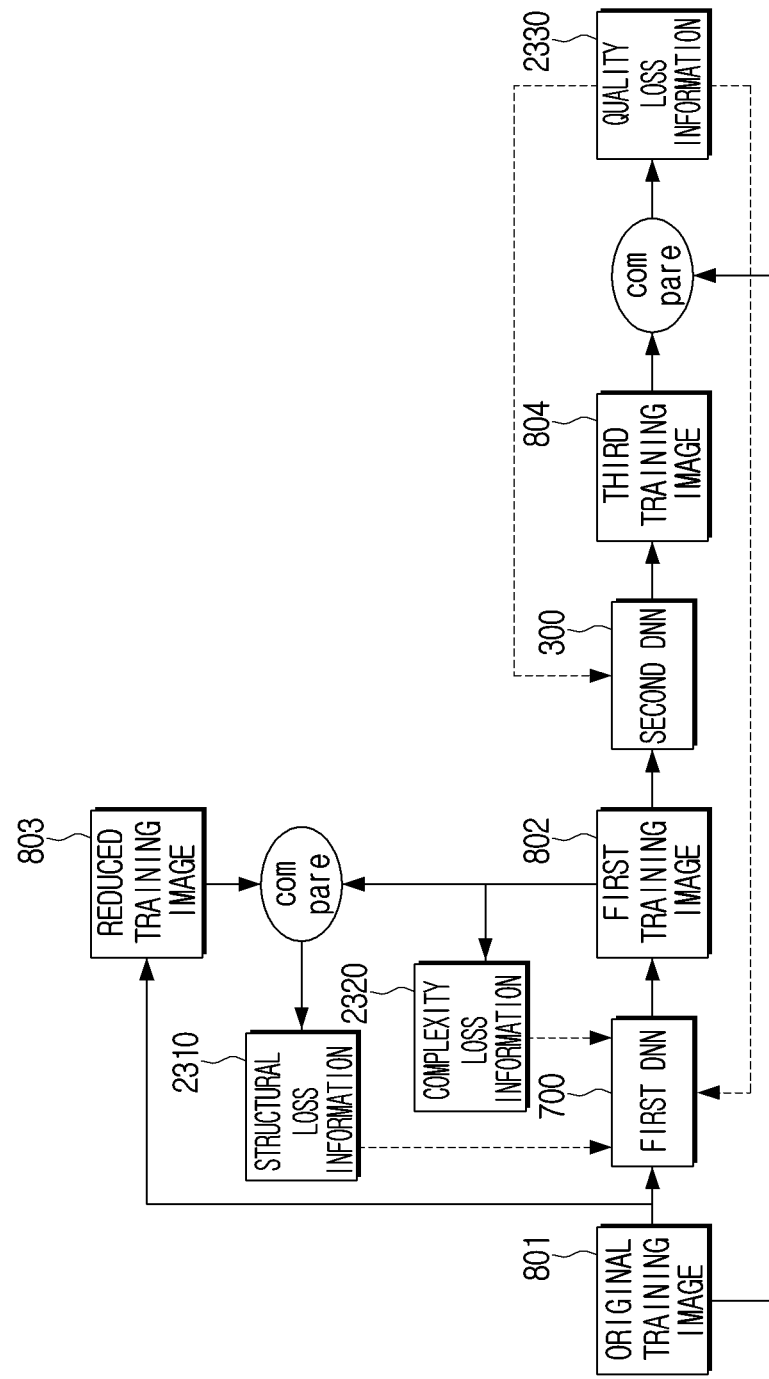
FIG. 23 is a diagram illustrating an example method for training the first DNN and the second DNN according to an embodiment.

FIG. 23 is a diagram illustrating an example method for training the first DNN 700 and the second DNN 300 according to an embodiment.

In an example embodiment, through the AI encoding process, the AI encoded image 1505 is reconstructed to the third image 1545 through the AI decoding process, and in order to maintain the similarity between the third image 1545 obtained as a result of the AI decoding and the image 1505, the relevance of AI encoding process and the AI decoding process is required. That is, the information lost in the AI encoding process must be reconstructed in the AI decoding process, which requires joint training of the first DNN 700 and the second DNN 300.

For accurate AI decoding, quality loss information 2330 which corresponds to a comparison result between a third training image 804 and an original training image 801 as illustrated in FIG. 9 needs to be reduced. The quality loss information 2330 is used for training of both of the first DNN 700 and the second DNN 300.

The training process illustrated in FIG. 23 will be described.

In FIG. 23, the original training image 801 is an image which is subject of the AI-downscaling, and the first training image 802 is an image which is AI-downscaled from the original training image 801. A third training image 804 is AI-upscaled image from the first training image 802.

The original training image 801 includes a still image or a moving image including a plurality of frames. In an example embodiment, the original training image 801 may include a luminance image extracted from a still image or a moving image including a plurality of frames. In an example embodiment, the original training image 801 may include a patch image extracted from a still image or a moving image consisting of a plurality of frames. When the original training image 801 includes a plurality of frames, the first training image 802, the second training image and the third training image 804 also include a plurality of frames. When a plurality of frames of the original training image 801 are sequentially input to the first DNN 700, a plurality of frames of the first training image 802, the second training image and the third training image 804 may be sequentially obtained through the first DNN 700 and the second DNN 300.

For joint-training of the first DNN 700 and the second DNN 300, the original training image 801 is input to the first DNN 700. The original training image 801 input to the first DNN 700 is AI-downscaled and output to the first training image 802, and the first training image 802 is input to the second DNN 300. The third training image 804 is output as a result of the AI-upscaling for the first training image 802.

Referring back to FIG. 23, the first training image 802 is input to the second DNN 300, and a second training image obtained through the first encoding and the first decoding process of the first training image 802 may be input to the second DNN 300, in accordance with an embodiment. Any one of MPEG-2, H.264, MPEG-4, HEVC, VC-1, VP8, VP9, and AV1 can be used to input the second training image into the second DNN. For example, in the first encoding of the first training image 802 and the first decoding of image data corresponding to the first training image 802, any one of MPEG-2, H.264, MPEG-4, HEVC, VC-1, VP8, VP9, and AV can be used.

Referring back to FIG. 23, apart from outputting the first training image 802 via the first DNN 700, a legacy-downscale reduced training image 803 is obtained from the original training image 801. The legacy downscale may include at least one of a bilinear scale, a bicubic scale, a lanzos scale, or a stair step scale.

In order to prevent and/or reduce the structural feature of the first image 1515 from being significantly deviated from the structural feature of the image 1505, the reduced training image 803 which preserves the structural feature of the original training image 801 is obtained.

Prior to the training, the first DNN 700 and the second DNN 300 may be set with the predetermined DNN configuration information. As the training is progressed, structural loss information 2310, complexity loss information 2320, and quality loss information 2330 may be determined.

The structural loss information 2310 may be determined based on a comparison result of the reduced training image 803 and the first training image 802. In one example, the structural loss information 2310 may correspond to a difference between the structural information of the reduced training image 803 and the structural information of the first training image 802. The structural information may include various features that can be extracted from images such as brightness, contrast, histogram, or the like, of the image. The structural loss information 2310 indicates to which extent that the structural information of the original training image 801 is maintained in the first training image 802. The smaller the structural loss information 2310, the more the structural information of the first training image 802 is similar to the structural information of the original training image 801.

The complexity loss information 2320 may be determined based on the spatial complexity of the first training image 802. In one example, as a spatial complexity, a total variance value of the first training image 802 may be used. The complexity loss information 2320 is related to a bit rate of image data obtained by first encoding the first training image 802. It is defined that the smaller complexity loss information 2320 the smaller the bit rate of the image.

The quality loss information 2330 may be determined based on a comparison result of the original training image 801 and the third training image 804. The quality loss information 2330 may include at least one of an L1-norm value, an L2-norm value, a Structural Similarity (SSIM) value, a peak signal-to-noise ratio-human vision system (PSNR-HVS) value, a multiscale SSIM (MS-SSIM) value, Variance Interpolation Factor (VIF) value, or an image Multimethod Assessment Fusion (VMAF) value for the difference between the original training image 801 and the third training image 804. The quality loss information 2330 indicates to which extent the third training image 804 is similar to the original training image 801. The smaller the quality loss information 2330, the more similar the third training image 804 to the original training image 801.

Referring to FIG. 23, the structural loss information 2310, the complexity loss information 2320, and the quality loss information 2330 are used for training of the first DNN 700, and the quality loss information 2330 is used for training of the second DNN 300. That is, the quality loss information 2330 is used for training of both the first DNN 700 and the second DNN 300.

The first DNN 700 may update the parameter so that the final loss information determined based on the structural loss information 2310, the complexity loss information 2320, and the quality loss information 2330 is reduced or minimized. The second DNN 300 may update the parameters such that the quality loss information 2330 is reduced or minimized.

The final loss information for training of the first DNN 700 and the second DNN 300 may be determined as Equation 3 below.

$$\text{Loss}DS = a * \text{structural loss information} + b * \text{complexity loss information} + c * \text{quality loss information}$$

$$\text{Loss}US = d * \text{quality loss information} \qquad \text{[Equation 3]}$$

In Equation 3, the LossDS represents the final loss information that should be reduced or minimized for training of the first DNN 700, and the LossUS represents the final loss information that should be reduced or minimized for training of the second DNN 300. Also, a, b, c, and d may correspond to the pre-determined weights.

The first DNN 700 updates the parameters in the direction in which the LossDS of Equation 1 is reduced, and the second DNN 300 updates the parameters in the direction in which the LossUS is reduced. When the parameters of the first DNN 700 are updated according to the LossDS derived from the training process, the first training image 802 obtained based on the updated parameters is different from the first training image 802 in the previous training process, so that the third training image 804 is also different from the third training image 804 in the previous training process. When the third training image 804 is different from the third training image 804 of the previous training process, the quality loss information 2330 is also newly determined, and accordingly, the second DNN 300 updates the parameters. When the quality loss information 2330 is newly determined, the LossDS is also newly determined, and thus, the first DNN 700 updates the parameters according to the newly determined LossDS. That is, parameter updating of the first DNN 700 causes parameter updating of the second DNN 300, and parameter updating of the second DNN 300 causes parameter updating of the first DNN 700. In other words, since the first DNN 700 and the second DNN 300 are jointly trained through sharing of the quality loss information 2330, the parameters of the first DNN 700 and the parameters of the second DNN 300 may be optimized with relevance to each other.

Referring to Equation 3, it is known that LossUS is determined according to the quality loss information 2330, but this is merely an illustrative example, and the LossUS may be determined based on at least one of the structural loss information 2310 or complexity loss information 2320, and the quality loss information 2330.

It has been described that the AI-upscaler 1634 of the AI decoding apparatus 1600 and the AI-downscaler 612 of the AI encoding apparatus 600 store a plurality of DNN configuration information. A method of training each of the plurality of DNN configuration information stored in the AI-upscaler 1634 and the AI-downscaler 612 will be described.

As described in connection with Equation 3, in the case of the first DNN 700, the parameters are updated in consideration of the degree of similarity between the structural information of the first training image 802 and the structural information of the original training image 801 (the structural loss information 2310), the bitrate (complexity loss information 2320) of the image data obtained by the first encoding result of the first training image 802, and the difference (quality loss information 2330) between the third training image 804 and the original training image 801.

The parameters of the first DNN 700 can be updated so that it is possible to obtain the first training image 802 which is similar to the structural information of the original training image 801 and the bitrate of the image obtained from the first encoding is similar to the original training image 801, and that the second DNN 300 for AI-upscaling the first training image 802 obtains the third training image 804 which is similar to the original training image 801.

By adjusting the weights of the a, b, and c of Equation 3, the direction in which the parameters of the first DNN 700 are optimized is different. For example, if the weight of b is determined to be high, the parameter of the first DNN 700 may be updated such that importance is imparted on the lower bitrate than the quality of the third training image 804. In addition, when the weight of c is determined to be high, the parameter of the first DNN 700 can be updated such that importance is imparted on increasing quality of the third training image 804 than higher bit rate or maintaining the structural information of the original training image 801.

In addition, the parameters of the first DNN 700 may be different depending on the type of codec which is used for first encoding of first training image 802, since depending on the type of the codec, the second training image to be input to the second DNN 300 may be different.

The parameters of the first DNN 700 and the parameters of the second DNN 300 can be jointly updated based on the weight a, the weight b, the weight c, and the type of codec for the first encoding of the first training image 802. Accordingly, the parameters of the first DNN 700 and the parameters of the second DNN 300 which are jointly optimized can be determined by determining the weight a, the weight b, and the weight c as predetermined values, determining the type of the codec to a predetermined type, and then training the first DNN 700 and the second DNN 300.

After changing the weight a, the weight b, the weight c, and the type of the codec, the parameters of the first DNN 700 and the parameters of the second DNN 300 that are optimized in connection with each other can be determined by training the first DNN 700 and the second DNN 300. In other words, when the first DNN 700 and the second DNN 300 are trained while changing the values of the weight a, weight b, weights c, and type of codec respectively, the plurality of DNN configuration information which are jointly trained may be the determined by the first DNN 700 and the second DNN 300.

As described above with reference to FIG. 19, the plurality of DNN configuration information of the first DNN 700 and the second DNN 300 may be mapped to the first image-related information. For setting up the mapping relationship, the first training image 802 outputted from the first DNN 700 may be first encoded with a specific codec according to a particular bit rate, and a second training image obtained by first decoding the bit stream obtained by the first decoding may be input to the second DNN 300. That is, after setting the environment such that the first training image 802 of a particular resolution is first encoded at a particular bitrate by a particular codec, by training the first DNN 700 and the second DNN 300, the resolution of the first training image 802, the type of codec used for the first encoding of the first training image 802, and the DNN configuration information pair mapped to the bitrate of the bitstream obtained as a result of the first encoding of the first training image 802 may be determined. By varying the resolution of the first training image 802, the type of codec used for the first encoding of the first training image 802, and the bitrate of the bitstream obtained according to the first encoding of the first training image 802, a mapping relationship between the plurality of DNN configuration information and the first image-related information of the first DNN 700 and the second DNN 300 may be determined.

Figure 24:
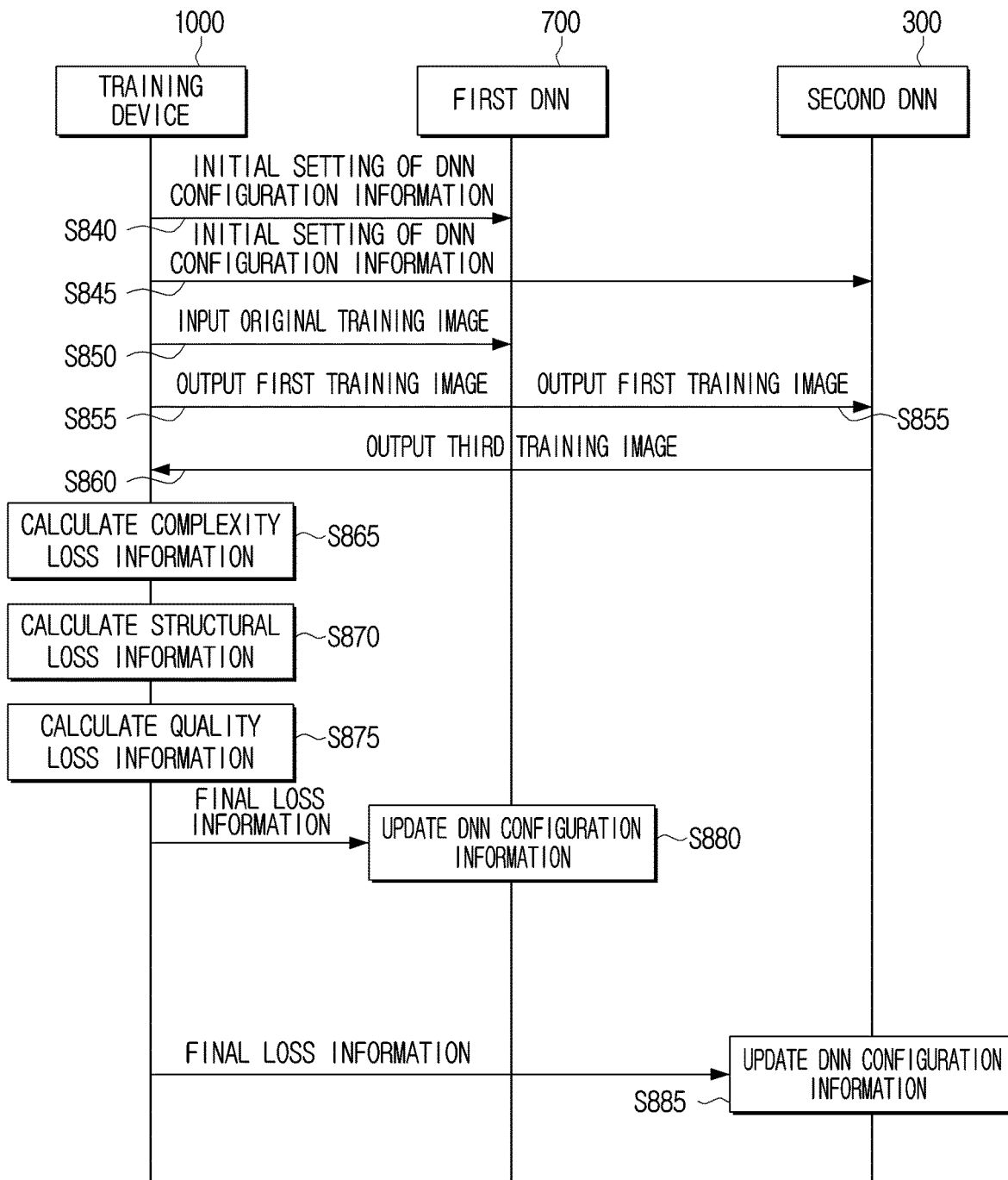
FIG. 24 is a signal flow diagram illustrating an example training process of the first DNN and the second DNN by a training device according to an embodiment.

FIG. 24 is a signal flow diagram illustrating an example training process of the first DNN 700 and the second DNN 300 by a training device 1000 according to an embodiment.

Referring to FIG. 23, training of the first DNN 700 and the second DNN 300 may be performed by the training apparatus 1000. A training device 1000 may include the first DNN 700 and the second DNN 300. The training device 1000 may be, for example, the AI encoding apparatus 600 or a separate server. The DNN configuration information of the second DNN 300 obtained by the training is stored in the AI decoding apparatus 1600.

Referring to FIG. 24, the training device 1000 initially sets the DNN configuration information of the first DNN 700 and the second DNN 300 in operations S840 and S845. Accordingly, the first DNN 700 and the second DNN 300 may operate according to predetermined DNN configuration information. The DNN configuration information may include information on at least one of the number of convolutional layers, the number of filter kernels for each convolutional layer, the size of the filter kernels for each convolutional layer, and the parameters of each filter kernel included in the first DNN 700 and the 2 DNN 300.

The training device 1000 inputs the original training image 801 to the first DNN 700 in operation S850. The original training image 801 may include at least one frame of a still image or a moving image.

The first DNN 700 processes the original training image 801 according to the initial set DNN configuration information, and outputs the first training image 802 that is AI-downscaled from the original training image 801 in operation S855. Although FIG. 10 illustrates that the first training image 802 outputted from the first DNN 700 directly input to the second DNN 300, the first training image 802 outputted from the first DNN 700 can be input to the second DNN 300 by the training device 1000. In addition, the training device 1000 may first encode and first decode the first training image 802 with a predetermined codec, and then input the second training image into the second DNN 300.

The second DNN 300 processes the first training image 802 or the second training image according to initially-set DNN setting information and outputs the AI-upscaled third training image 804 from the first training image 802 or the second training image in operation S860.

The training device 1000 calculates the complexity loss information 2320 based on the first training image in operation S865.

The training device 1000 calculates the structural loss information 2310 by comparing the reduced training image 803 and the first training image 802 in operation S870.

The training device 1000 calculates the quality loss information 2330 by comparing the original training image 801 and the third training image 804 in operation 5875.

The first DNN 700 updates the initially-set DNN configuration information through a back propagation process based on the final loss information in operation S880. The training device 1000 may calculate final loss information for training of the first DNN 700 based on the complexity loss information 2320, the structural loss information 2310, and the quality loss information 2330.

The second DNN 300 updates the initially-set DNN configuration information through the back propagation process based on the quality loss information or final loss information in operation S885. The training device 1000 may calculate the final loss information for training the second DNN 300 based on the quality loss information 2330.

Then, the training device 1000, the first DNN 700, and the second DNN 300 update the DNN configuration information by repeating the steps of S850 to S885 until the final loss information is minimized and/or reduced. During each repeat process, the first DNN 700 and the second DNN 300 operate according to the DNN configuration information updated in the previous process.

In Table 1 below, an effect of a case of AI encoding and AI decoding of an image 1505 and of a case of encoding and decoding the image 1505 with HEVC are illustrated according to an embodiment.

TABLE 1

| Contents | Resolution | Number of frames | Information amount (Bitrate) (Mbps) | | Subjective image quality score (VMAF) | |
| --- | --- | --- | --- | --- | --- | --- |
| | | | HEVC | AI encoding/AI decoding | HEVC | AI encoding/AI decoding |
| Contents-01 | 8K | 300 | 46.3 | 21.4 | 94.80 | 93.54 |
| Contents-02 | (7680 × 4320) | frames | 46.3 | 21.6 | 98.05 | 98.98 |
| Contents-03 | | | 46.3 | 22.7 | 96.08 | 96.00 |
| Contents-04 | | | 46.1 | 22.1 | 86.26 | 92.00 |
| Contents-05 | | | 45.4 | 22.7 | 93.42 | 92.98 |
| Contents-06 | | | 46.3 | 23.0 | 95.99 | 95.61 |
| | | Average | 46.11 | 22.25 | 94.10 | 94.85 |

As shown in Table 1, it can be seen that the bit rate is reduced by 50% or more, even though the subjective image quality of the AI encoding and AI decoding of the contents including 300 frames of 8K resolution is higher than the subjective image quality of the encoding and decoding by HEVC.

Figure 25:
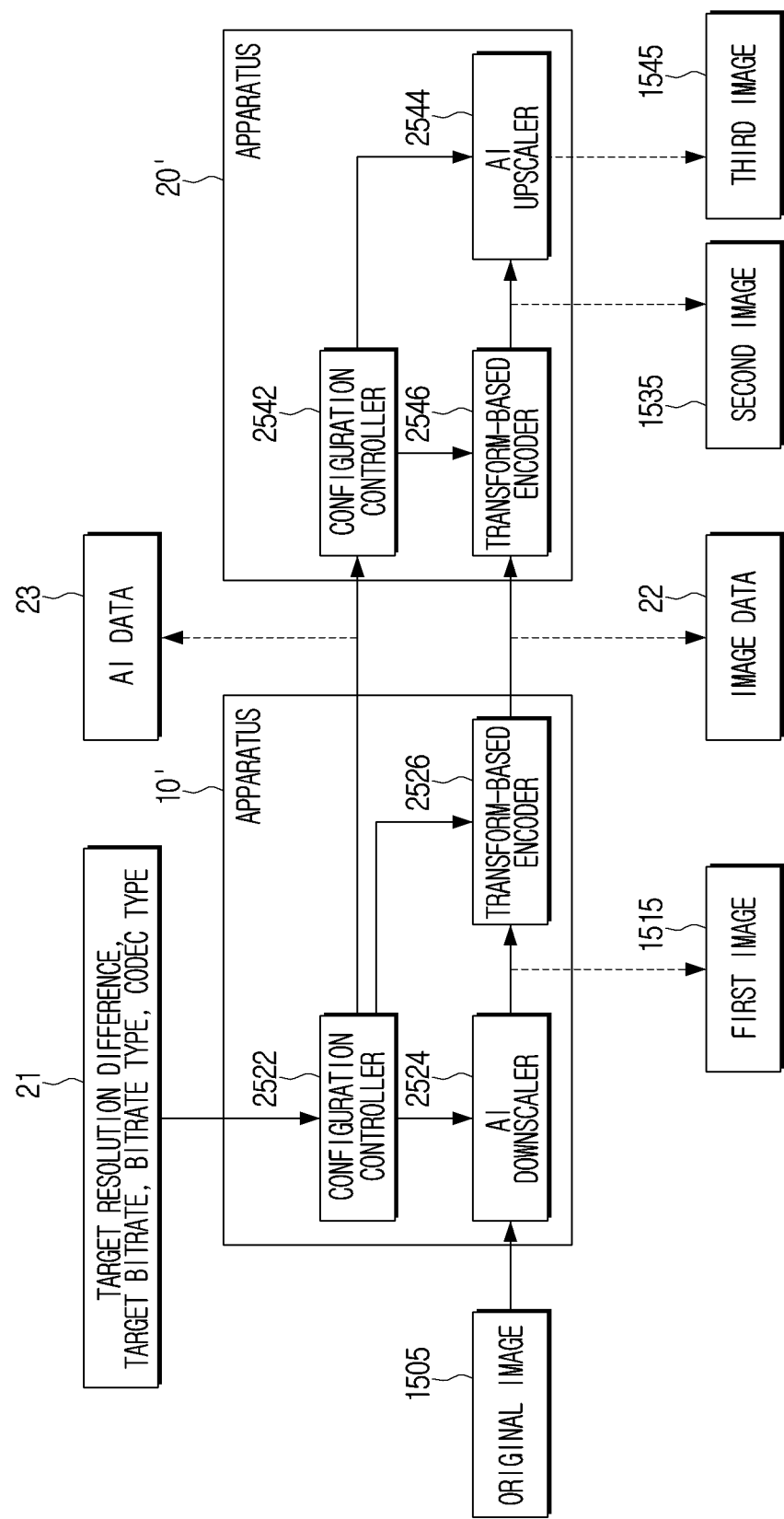
FIG. 25 is a block diagram illustrating an example apparatus for AI-downscaling and an apparatus for AI-upscaling according to an embodiment.

FIG. 25 is diagram illustrating an apparatus 10' for AI-downscaling of the image 1505 and an apparatus 20' for AI-upscaling of the second image 1535 according to an embodiment.

An apparatus 10' receives the image 1505, and provides the image data 22 and the AI data 23 to an apparatus 20' using the AI-downscaler 2524 and a transform-based encoder 2526. In an example embodiment, the image data 22 corresponds to the image data of FIG. 15, and AI data 23 corresponds to the AI data of FIG. 15. Further, in an example embodiment, the transform-based encoder 2526 corresponds to the first encoder 614 of FIG. 21, and an AI-downscaler 2524 corresponds to the AI-downscaler 612 of FIG. 21.

The apparatus 20' receives the AI data 23 and the image data 22, and obtains the third image 1545 using the transform-based decoder 2546 and the AI-upscaler 2544. In an example embodiment, the transform-based decoder 2546 corresponds to the first decoder 1632 of FIG. 16, and the AI-upscaler 2544 corresponds to the AI-upscaler 1634 of FIG. 16.

In an example embodiment, the apparatus 10' includes a computer program including a CPU, memory, and instructions. The computer program is stored in a memory. In an example embodiment, upon execution of a computer program by the CPU, the apparatus 10' performs the functions described in connection with FIG. 25. In an example embodiment, the functionality described in connection with FIG. 25 is performed by a dedicated hardware chip and/or CPU.

In an example embodiment, the apparatus 20' includes a computer program including a CPU, memory, and instructions. The computer program is stored in a memory. In an example embodiment, upon execution of a computer program by the CPU, the apparatus 20' performs the functions described in connection with FIG. 25. In an example embodiment, the functionality described in connection with FIG. 25 is performed by a dedicated hardware chip and/or CPU.

In FIG. 25, a configuration controller 2522 receives one or more input values 21. In an example embodiment, the one or more input values 21 may include at least one of a target resolution difference for the AI-downscaler 2524 and the AI-upscaler 2544, a bitrate of the image data 22, a bitrate type of the image data 22 (e.g., a variable bitrate type, a constant bitrate type, or an average bitrate type, etc.) or a codec type for the transform-based encoder 2526. The one or more input values 21 may be pre-stored in the apparatus 10' or may include a value received from the user.

The configuration controller 2522 controls the operation of the AI-downscaler 2524 and the transform-based encoder 2526 based on the received input value 21. In an example embodiment, the configuration controller 2522 obtains DNN configuration information for the AI-downscaler 2524 according to the received input value 21, and sets the AI-downscaler 2524 with the obtained DNN configuration information. In an example embodiment, the configuration controller 2522 may pass the received input value 21 to the AI-downscaler 2524, and the AI-downscaler 2524 may obtain DNN configuration information for AI-downscaling the image 1505 based on the received input value 21. In an example embodiment, the configuration controller 2522 may provide additional information along with the input value 21, e.g., color format (luminance component, chrominance component, red component, green component or blue component, etc.) information to which the AI-downscaling is applied, tone mapping information of high dynamic range (HDR), etc. to the AI-downscaler 2524, and the AI-downscaler 2524 may obtain DNN provisioning information in consideration of the input value 21 and the additional information. In an example embodiment, the configuration controller 2522 passes at least a portion of the received input value 21 to the transform-based encoder 2526 to cause the transform-based encoder 2526 to first encode the first image 1515 with a particular value of bitrate, a particular type of bitrate, and a particular codec.

The AI-downscaler 2524 receives the image 1505 and performs the operations described in connection with at least one of FIG. 15, 21, 22, 23, or 24 to obtain the first image 1515.

In an example embodiment, the AI data 23 is provided to apparatus 20'. The AI data 23 may include at least one of resolution difference information between the image 1505 and the first image 1515 or information related to the first image 1515. The resolution difference information may be determined based on a target resolution difference of the input value 21, and the information related to the first image 1515 may be determined based on at least one of a target bitrate, a bitrate type, and a codec type. In an example embodiment, the AI data 23 may include parameters used in the AI-upscaling process. The AI metric data may be provided from AI-downscaler 2524 to the apparatus 20'.

The first image 1505 is processed by the transform-based encoder 2526 to obtain the image data 22, and the image data 22 is transmitted to the apparatus 20'. The transform-based encoder 2526 may process the first image 2515 according to MPEG-2, H.264 AVC, MPEG-4, HEVC, VC-1, VP8, VP9, or AV1.

The configuration controller 2542 controls the operation of the AI-upscaler 2544 based on the AI data 23. In an example embodiment, the configuration controller 2542 obtains DNN configuration information for the AI-upscaler 2544 according to the received AI data 23 and sets the AI-upscaler 2544 with the obtained DNN configuration information. In an example embodiment, the configuration controller 2542 passes the received AI data 23 to the AI-upscaler 2544, and the AI-upscaler 2544 can obtain DNN configuration information for AI-upscaling the second image 1535 based on the AI data 23. In an example embodiment, the configuration controller 2542 may provide additional information along with the AI data 23, for example, a color format (luminance component, chrominance component, red component, green component or blue component, etc.) information to which the AI-upscaling is applied, tone mapping information of the HDR, etc. to the AI-upscaler 2544, and the AI-upcalser 2544 may obtain DNN configuration information in consideration of the AI data 23 and the additional information. In an example embodiment, the AI-upscaler 2544 may receive the AI data 23 from the configuration controller 2542, receive at least one of prediction mode information, motion information, and quantization parameter information from the transform-based decoder 2546, and obtain DNN configuration information based on the AI data 23 and at least one of prediction mode information, motion information, and quantization parameter information.

The transform-based decoder 2546 processes the image data 22 to reconstruct the second image 1535. The transform-based decoder 2546 may process the image data 22 according to MPEG-2, H.264 AVC, MPEG-4, HEVC, VC-1, VP8, VP9, or AV1.

The AI-upscale 2544 may obtain a third image 1545 by AI-upscaling the second image 1535 provided from the transform-based decoder 2546 based on the set DNN setting information.

The AI-downscaler 2524 includes the first DNN, and the AI-upscaler 2544 may include the second DNN, wherein the DNN configuration information for the first DNN and the second DNN is trained according to the training method described in connection with FIGS. 23 and 24.

Various embodiments can be applied to all electronic apparatuses capable of image processing, such as a server, as well as an image processing device such as a set-top box. In addition, the various embodiments described above may be performed through an embedded server provided in an electronic apparatus, or an external server of an image processing device.

The methods according to various embodiments may be implemented as a format of software or application installable to a related art electronic apparatus.

The methods according to various embodiments may be implemented by software upgrade of a related art electronic apparatus, or hardware upgrade only.

Meanwhile, various embodiments of the disclosure may be implemented in software, including instructions stored on machine-readable storage media readable by a machine (e.g., a computer). An apparatus may call instructions from the storage medium, and execute the called instruction, including an image processing apparatus (for example, image processing apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium.

According to an embodiment, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

According to various example embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While various embodiments have been illustrated and described with reference to various example embodiments, the disclosure is not limited to specific embodiments or the drawings, and it will be understood by those of ordinary skill in the art that various changes in form and details may be made therein without departing from the spirit and scope of the disclosure, including the appended claims and their equivalents.

What is claimed is:

1. An electronic device comprising:
 a communication interface comprising communication circuitry; and
 a processor configured to:
  control the communication interface to receive, from an external device which encodes an image downscaled by a downscaling operation using a trained first artificial intelligence (AI) model controlled based onto an image quality predicted by a trained second AI model and transmits encoded image data of the encoded image, a data packet generated by the external device and comprising encoded image data and quality information on the encoded image, the quality information comprising bit rate information and resolution information and being based on the predicted image quality, wherein the predicted image quality is obtained using the trained second AI model based on a state of a network through which the data packet is transmitted;

decode the encoded image data based on the bit rate information; and obtain an output image by upscaling the decoded image data based on the resolution information and the trained second AI model, wherein the trained second AI model is trained based on the trained first AI model.

2. The device of claim 1, wherein the processor is further configured to transmit, through the communication interface, state information of the state of the network such that the external device predicts the quality of the image based on the state information.

3. The device of claim 2, wherein the processor is configured to:

decode the encoded image data based on the bitrate information and the trained second AI model.

4. The device of claim 3, wherein the trained second AI model includes at least one neural network layer, and wherein a parameter of the at least one neural network layer is trained based on a parameter of one or more layers included in the trained first AI model.

5. The device of claim 2, wherein at least one of resolution information or bitrate information of a first frame included in the encoded image data is obtained based on a predicted quality indicator of a second frame included in the encoded image data received before the first frame.

6. The device of claim 1, wherein one of resolution or bitrate of at least one frame included in the encoded image data is different from at least one of a resolution or bitrate of another frame included in the encoded image data.

7. The device of claim 1, wherein the encoded image data is processed based on the predicted quality information of the image, and wherein the predicted quality information of the image is determined based on resolution information and bitrate information corresponding to one of a plurality of quality indicators corresponding to different combinations of resolution information and bitrate information related to the image.

8. The device of claim 7, wherein the predicted quality information of the image is determined based on state information of the network and resolution information and bitrate information corresponding to the one of the plurality of quality indicators.

9. A control method of an electronic device, the method comprising:

receiving, from an external device which encodes an image downscaled by a downscaling operation using a trained first artificial intelligence (AI) model controlled based on an image quality predicted by a trained second AI model and transmits encoded image data of the encoded image, a data packet generated by the external device and comprising encoded image data and quality information on the encoded image, the quality information comprising bit rate information and resolution information and being based on the predicted image quality, wherein the predicted image quality is obtained using the trained second AI model based on a state of a network through which the data packet is transmitted;

decoding the encoded image data based on the bit rate information; and obtaining an output image by upscaling the decoded image data based on the resolution information and the trained second AI model, wherein the trained second AI model is trained based on the trained first AI model.

10. The control method of claim 9, further comprising transmitting state information of the state of the network between the electronic device and the external device such that the external device predicts the quality of the image based on the state information.

11. The control method of claim 10, wherein the decoding of the encoded image data is based on the bitrate information and the trained second AI model.

12. The control method of claim 11, wherein the trained second AI model includes at least one neural network layer, and wherein a parameter of the at least one neural network layer is trained based on a parameter of one or more layers included in the trained first AI model.

13. The control method of claim 10, wherein at least one of resolution information or bitrate information of a first frame included in the encoded image data is obtained based on a predicted quality indicator of a second frame included in the encoded image data received before the first frame.

14. The control method of claim 9, wherein one of resolution or bitrate of at least one frame included in the encoded image data is different from at least one of a resolution or bitrate of another frame included in the encoded image data.

15. The control method of claim 9, wherein the encoded image data is processed based on the predicted quality information of the image, and wherein the predicted quality information of the image is determined based on resolution information and bitrate information corresponding to one of a plurality of quality indicators corresponding to different combinations of resolution information and bitrate information related to the image.

16. The control method of claim 15, wherein the predicted quality information of the image is determined based on state information of the network and resolution information and bitrate information corresponding to the one of the plurality of quality indicators.

* * * * *